(12) United States Patent
Lin et al.

(10) Patent No.: US 11,480,760 B2
(45) Date of Patent: Oct. 25, 2022

(54) LENS ASSEMBLY

(71) Applicants: Sintai Optical (Shenzhen) Co., Ltd., ShenZhen (CN); Asia Optical Co., Inc., Taichung (TW)

(72) Inventors: Guo-Quan Lin, ShenZhen (CN); Hsi-Ling Chang, Taichung (TW); Bo-Yan Chen, Taichung (TW); Ming-Huang Tseng, Taichung (TW); Guo-Yang Wu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 313 days.

(21) Appl. No.: 16/834,099

(22) Filed: Mar. 30, 2020

(65) Prior Publication Data

US 2020/0333562 A1   Oct. 22, 2020

(30) Foreign Application Priority Data

Aug. 30, 2019  (CN) .......................... 201910817171.6

(51) Int. Cl.

| | |
|---|---|
| *G02B 9/62* | (2006.01) |
| *G02B 7/02* | (2021.01) |
| *G02B 13/00* | (2006.01) |
| *G02B 13/18* | (2006.01) |
| *H04N 5/225* | (2006.01) |
| *G02B 9/60* | (2006.01) |

(52) U.S. Cl.
CPC .............. *G02B 9/62* (2013.01); *G02B 7/021* (2013.01); *G02B 9/60* (2013.01); *G02B 13/0045* (2013.01); *G02B 13/18* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 2007/0008625 A1 | 1/2007 | Park et al. | |
| 2007/0047938 A1* | 3/2007 | Suzuki | G02B 9/34 |
| | | | 396/89 |
| 2015/0042862 A1* | 2/2015 | Huang | G02B 13/18 |
| | | | 359/713 |

(Continued)

FOREIGN PATENT DOCUMENTS

| | | |
|---|---|---|
| CN | 101276041 A | 10/2008 |
| CN | 103543514 A | 1/2014 |

(Continued)

*Primary Examiner* — Darryl J Collins
(74) *Attorney, Agent, or Firm* — McClure, Qualey & Rodack, LLP

(57) ABSTRACT

A lens assembly includes a lens body, a first lens, a second lens, a third lens and a fourth lens, wherein the lens body includes a lens barrel, and the first lens, the second lens, the third lens and the fourth lens are fixed in the lens body in order from an object side to an image side along an optical axis. The first lens is closest to the object side and includes an object side surface, the object side surface is protruded along the optical axis, the first lens further includes a first portion close to the object side and a second portion close to the image side, and a diameter of the first portion is smaller than a diameter of the second portion so that a step is formed between the first portion and the second portion.

20 Claims, 30 Drawing Sheets

(56) References Cited

U.S. PATENT DOCUMENTS

| | | | |
|---|---|---|---|
| 2016/0341928 A1* | 11/2016 | Liu | G02B 9/62 |
| 2017/0090154 A1* | 3/2017 | Hsieh | G02B 13/14 |
| 2018/0120542 A1* | 5/2018 | Chang | G02B 9/34 |
| 2018/0284394 A1 | 10/2018 | Chen et al. | |
| 2019/0049737 A1 | 2/2019 | Terai et al. | |
| 2019/0056570 A1* | 2/2019 | Yeh | G02B 13/0045 |
| 2019/0094497 A1* | 3/2019 | Huang | G02B 9/62 |

FOREIGN PATENT DOCUMENTS

| | | |
|---|---|---|
| CN | 104166222 A | 11/2014 |
| CN | 104503064 A | 4/2015 |
| CN | 105739065 A | 7/2016 |
| CN | 108802969 A | 11/2018 |
| CN | 208399783 U | 1/2019 |
| JP | 2007219079 A | 8/2007 |
| JP | 2010191417 A | 9/2010 |
| JP | 2015034940 A | 2/2015 |
| JP | 2015111174 A | 6/2015 |
| TW | 201837522 A | 10/2018 |
| TW | 201910843 A | 3/2019 |

* cited by examiner

LENS ASSEMBLY

BACKGROUND OF THE INVENTION

Field of the Invention

The invention relates to an optical area, and more particularly to a lens.

Description of the Related Art

Many electronic devices (e.g. mobile phone or tablet) are currently provided with front camera lens. FIG. 1 is a schematic diagram of a prior lens assembly 100. FIG. 2 is a partially sectional view of the prior lens assembly 100. As shown in FIGS. 1-2, the lens assembly 100 includes a lens body 101 and a plurality of lenses disposed in the lens body 101, wherein the lens closest to an object side of the lens assembly 100 is a first lens 102. The first lens 102 is entirely surrounded by the lens body 101. The lens body 101 has an end surface directed at the object side, and the first lens 102 has an effective-diameter region in which a top point is lower than the end surface of the lens body 101 directed at the object side. In the lens assembly 100, the first lens 102 occupies much space in the lens body 101 and has a limited view angle, and the lens device 100 is somewhat thick because the first lens 102 is entirely surrounded by the lens body 101.

BRIEF SUMMARY OF THE INVENTION

The invention provides a lens assembly to solve the above problems. The lens assembly of the invention is provided with characteristics of a decreased total lens length, a decreased volume, a decreased thickness, and an increased view angle, and still has a good optical performance.

A lens assembly in accordance with an embodiment of the invention includes a lens body and a plurality of lenses. The lens body includes a lens barrel. The plurality of lenses includes a first lens, a second lens, a third lens and a fourth lens, wherein the first lens is closest to the object side. The first lens, the second lens, the third lens and the fourth lens are fixed in the lens body in order from the object side to an image side along an optical axis. The first lens includes an object side surface and an image side surface, the object side surface is protruded along the optical axis, the first lens in a cross section is higher at a middle than at both sides so that the first lens is protruded at the middle towards the object side to form a pillar. The first lens further includes a first portion close to the object side and a second portion close to the image side, and a diameter of the first portion is smaller than a diameter of the second portion so that a step is formed between the first portion and the second portion. The lens assembly further includes a lens minor diameter portion close to the object side and a lens major diameter portion close to the image side, the lens minor diameter portion is different to the lens major diameter portion in diameter, and the lens assembly satisfies: $0<A/B<0.3$, where A is a maximal outer diameter of the first portion of the first lens, and B is a maximal outer diameter of the lens major diameter portion of the lens assembly.

In another embodiment, the first lens further includes an optical effective diameter portion and an edge portion for the first lens to be supported and fixed, and the lens assembly satisfies: $0.19 \leq A/B \leq 0.28$, where A is the maximal outer diameter of the first portion of the first lens, and B is the maximal outer diameter of the lens major diameter portion of the lens assembly.

In yet another embodiment, the lens barrel includes a major diameter portion close to the image side and a minor diameter portion close to the object side, a stepped surface is formed between the major diameter portion and the minor diameter portion, the lens minor diameter portion is formed by the minor diameter portion of the lens barrel, and the lens major diameter portion is formed by the major diameter portion of the lens barrel.

In another embodiment, the edge portion of the first lens is fixed in the major diameter portion of the lens barrel, and the optical effective diameter portion is inside the minor diameter portion of the lens barrel.

In yet another embodiment, the lens assembly further includes a cover connected to an object end of the lens barrel, wherein the cover has an opening and forms a stop structure in front of the object side surface of the first lens.

In another embodiment, the object side surface of the first lens is flushed or is lower than an object side surface of the cover, the lens barrel and the cover are integrally formed as a continuous-unity piece, and the opening of the cover is in a shape of circle, polygon, non-circle, polygon with sides arranged symmetrically to the optical axis, bottle or oak barrel.

In yet another embodiment, the lens barrel includes an end surface facing the object side, the end surface is provided with a first lens fixing hole, the edge portion is fixed in the lens barrel, and a part of the optical effective diameter portion is projected from the first lens fixing hole.

In another embodiment, the lens minor diameter portion is formed by the part of the optical effective diameter portion of the first lens, the lens major diameter portion is formed by the lens barrel, and an edge of the object side surface of the first lens is provided with a stop structure of the lens assembly.

In yet another embodiment, the lens assembly further satisfies at least one of following conditions: $0<A \leq 2.2$ mm; $h \geq 0.8$ mm; $0.8>h/H \geq 0.22$; and $0<S1/S2<0.25$, where h is a thickness of the lens minor diameter portion along the optical axis, H is a thickness of the lens assembly along the optical axis, S1 is an area of a cross section of the lens minor diameter portion, and S2 is an area of a cross section of the lens major diameter portion.

In another embodiment, the lens minor diameter portion is in a shape of circle, polygon, non-circle, polygon with sides arranged symmetrically to the optical axis, bottle or oak barrel. The lens major diameter portion is in a shape of circle, polygon, non-circle, polygon with sides arranged symmetrically to the optical axis, bottle or oak barrel.

In yet another embodiment, the object side surface of the first lens is convex surface, f1 is a focal length of the first lens, L1D is an optical effective diameter of the object side surface of the first lens, L1T is a distance from the object side surface of the first lens to the image side surface of the first lens along the optical axis, EFL is an effective focal length of the lens assembly, TTL is a distance from the object side surface of the first lens to an imaging plane along the optical axis, ALT is a sum of thicknesses of the lenses along the optical axis, C is a maximal outer diameter of the lens minor diameter portion, and the lens assembly further satisfies at least one of the following conditions: $0<f1/L1T<5$; $0.8<L1D/L1T<1.7$; $1<EFL/L1T<4$; $1.9<EFL/L1D<2.6$; $2$ mm$<(L1D+L1T)<5$ mm; $3<(EFL+TTL)/L1T<9$; $1.5<ALT/L1T<3.5$; $0<C/B \leq 0.38$.

In another embodiment, the lens assembly further includes a fifth lens with positive refractive power, wherein the fifth lens is disposed between the first lens and the second lens, the object side surface of the first lens is convex surface, the second lens includes an object side surface and an image side surface, the fifth lens includes an object side surface and an image side surface, the image side surface of the fifth lens is convex surface.

In yet another embodiment, the lens assembly further satisfies: 0.29 mm<L1T−L5T−L2T<0.89 mm, wherein L1T is a distance from the object side surface of the first lens to the image side surface of the first lens along the optical axis, L2T is a distance from the object side surface of the second lens to the image side surface of the second lens along the optical axis, L5T is a distance from the object side surface of the fifth lens to the image side surface of the fifth lens along the optical axis.

In another embodiment, the object side surface of the first lens is convex surface, the third lens includes an object side surface and an image side surface, the fourth lens includes an object side surface and an image side surface, the third lens is with positive refractive power, the image side surface of the third lens is convex surface, and the image side surface of the fourth lens is concave surface.

In yet another embodiment, the lens assembly includes a lens body and a plurality of lenses. The lens body includes a lens barrel. The plurality of lenses includes a first lens, a second lens, a third lens and a fourth lens, all of which are fixed in the lens body in order from an object side to an image side along an optical axis. The first lens is with positive refractive power and includes an object side surface and an image side surface. The second lens is with negative refractive power. The third lens is with refractive power. The fourth lens is with negative refractive power. The lens assembly satisfies: 2.5 mm$^2$<G1×f1<8 mm$^2$, where f1 is a focal length of the first lens, and G1 is a distance along the optical axis from a central point of the object side surface of the first lens to an edge of an effective diameter of the image side surface of the first lens. The lens assembly further includes a lens minor diameter portion close to the object side and a lens major diameter portion close to the image side, and the lens minor diameter portion is different to the lens major diameter portion in diameter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
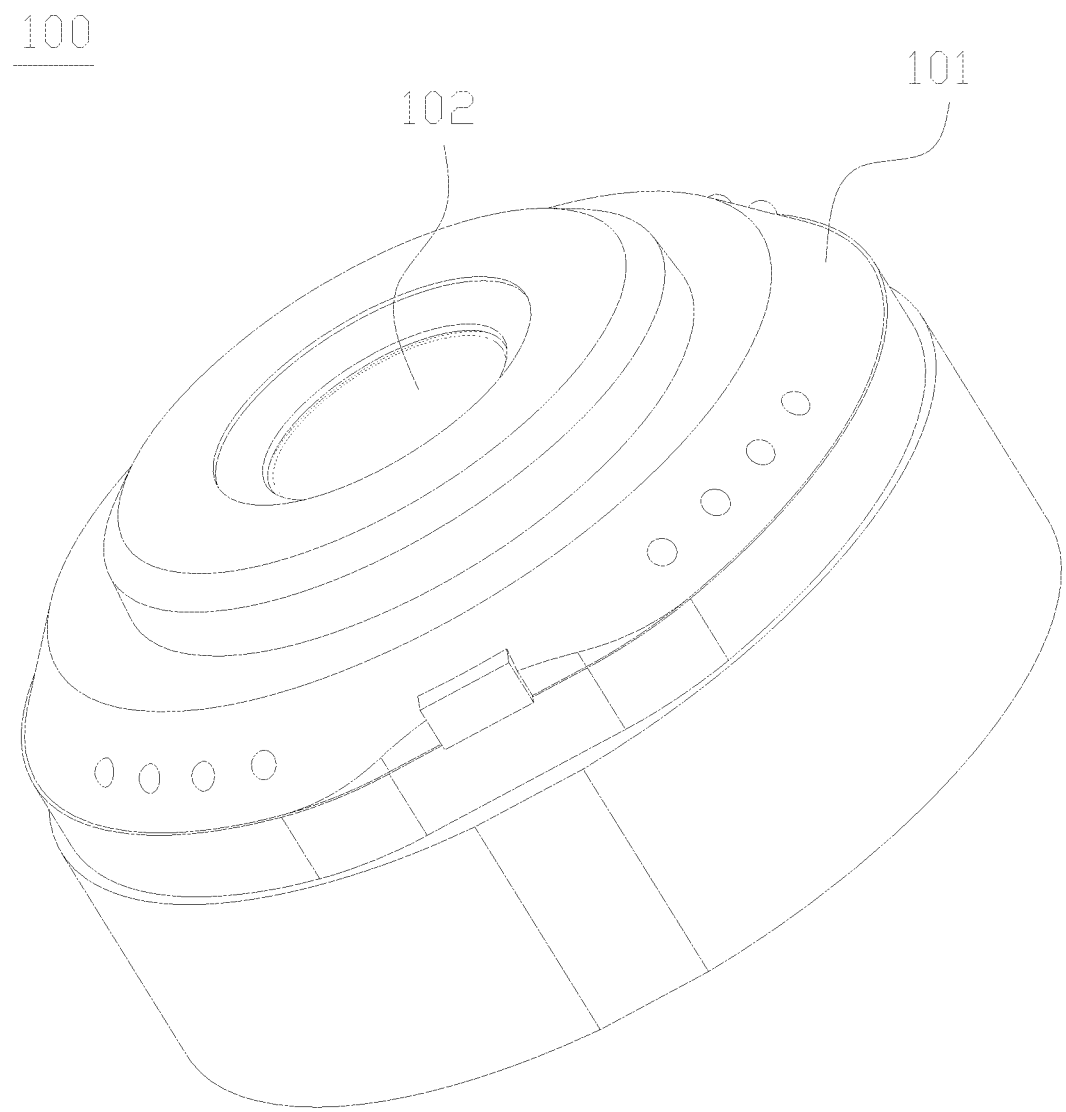
FIG. 1 is a schematic diagram of a prior lens assembly.
Figure 2:
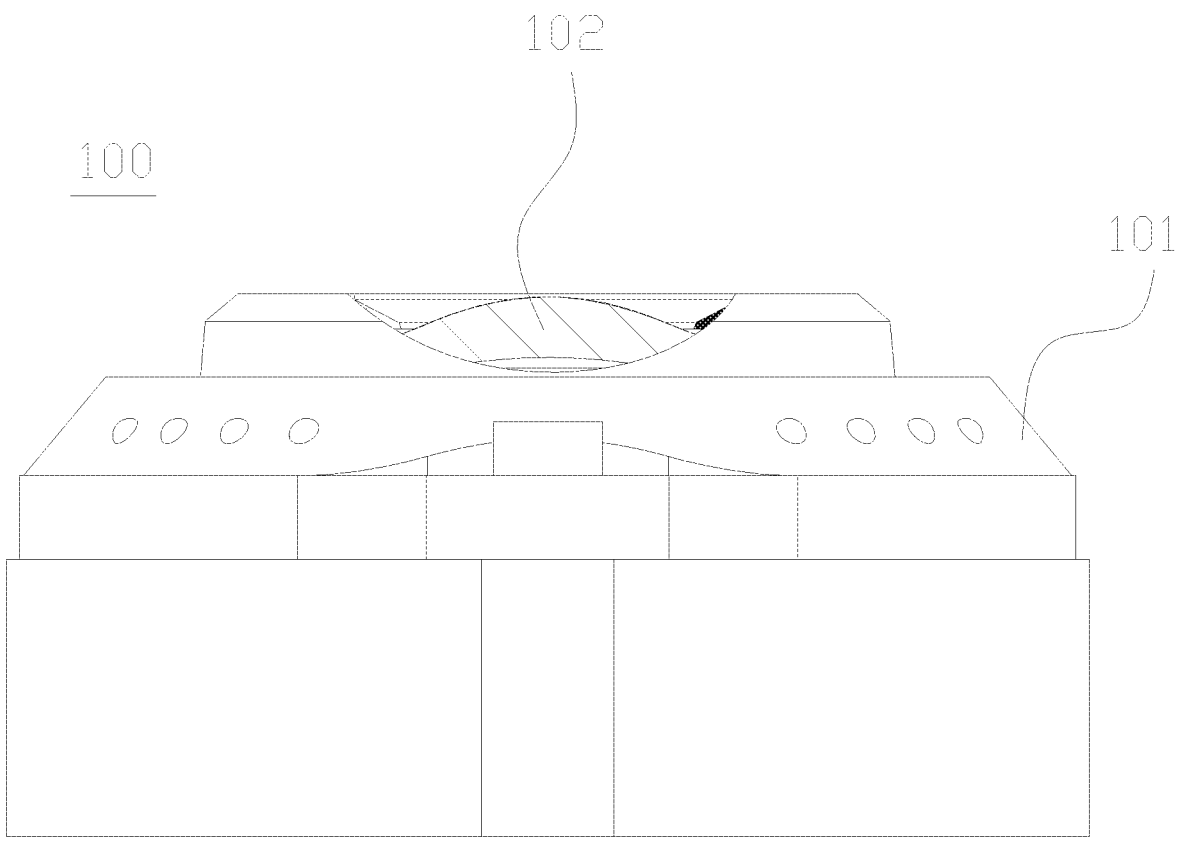
FIG. 2 is a partially sectional view of the prior lens assembly.
Figure 3:
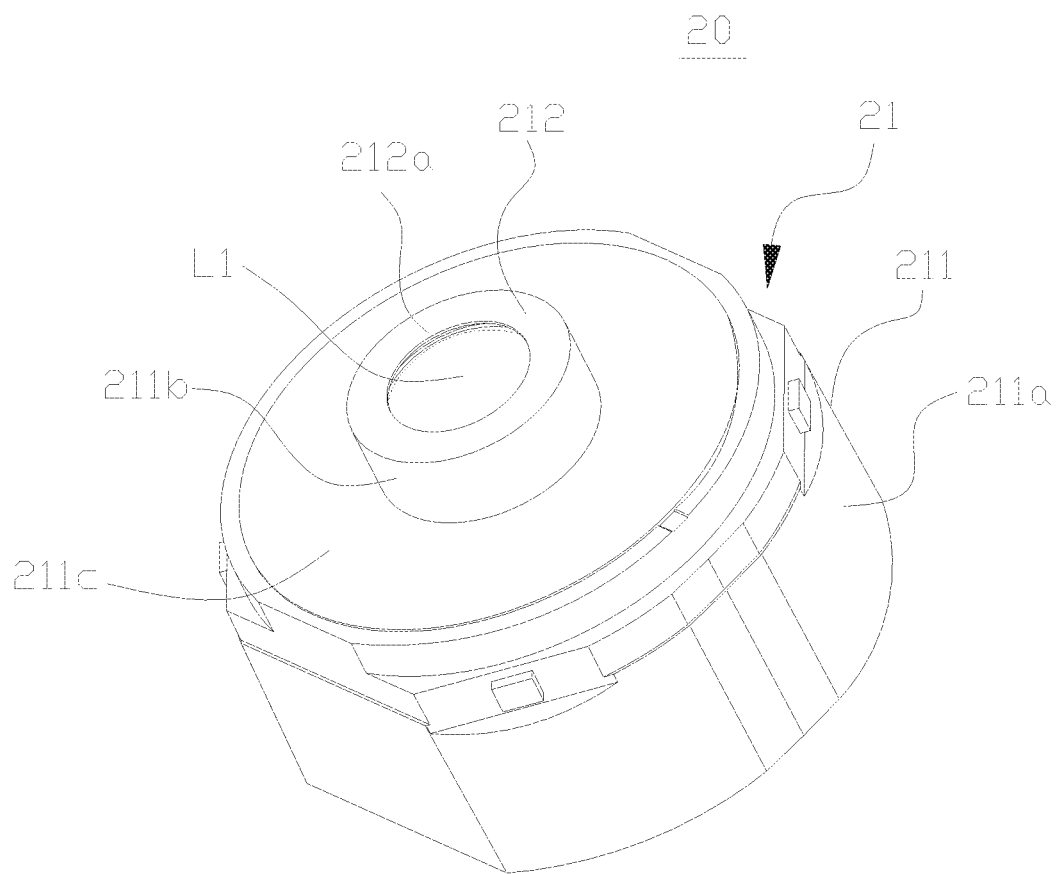
FIG. 3 is a schematic diagram of a lens assembly in accordance with a first embodiment of the invention.
Figure 4A:
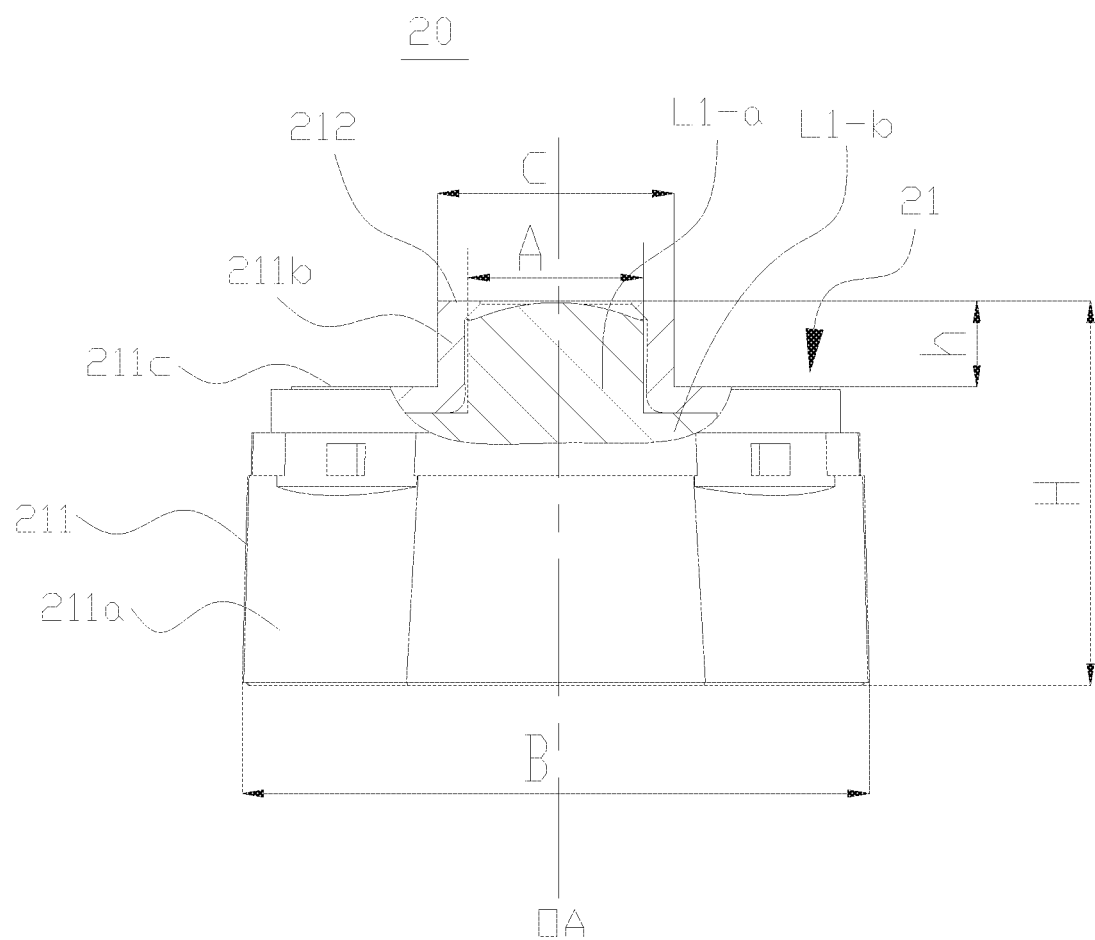
FIG. 4A is a partially sectional view of the lens assembly of the first embodiment of the invention.

FIG. 3 is a schematic diagram of a lens assembly 20 in accordance with a first embodiment of the invention. FIG. 4A is a partially sectional view of the lens assembly 20 in accordance with the first embodiment the invention. As shown in FIGS. 3 and 4A, in the first embodiment of the invention, the lens assembly 20 includes a lens body 21 and a plurality of lenses fixed in the lens body 21 in order from an object side to an image side along an optical axis OA. A first lens L1 is closest to the object side and has the greatest thickness among the lenses, wherein the thickness of a lens is defined as a distance from an object side surface of the lens to an image side surface of the lens along the optical axis. The thickness of the first lens L1 is at least 1.4 times of thickness of other lenses. The thickness of the first lens L1 is defined as a distance from an object side surface of the first lens L1 to an image side surface of the first lens L1 along the optical axis, and thickness of other lenses are defined as a distance from an object side surface of other lenses to an image side surface of other lenses along the optical axis.

ALT is a sum of thicknesses of all the lenses along the optical axis, that is, is a sum of distances from object side surfaces of each lenses to image side surfaces of each lenses along the optical axis OA. If "the thickness of the first lens L1 is at least 1.4 times of thickness of other lenses" or "1.5<ALT/L1T<3.5" is satisfied, then a total lens length of the lens assembly 20 can be shortened. Further, the lens assembly 20 is able to have increased pixels, increased resolution and a good optical performance when the first lens L1 is protruded from an object side surface of the lens body 21. The lens assembly 20 is particularly applicable to a front lens assembly of a mobile phone with full screen display (with high occupancy of screen).

Figure 4B:
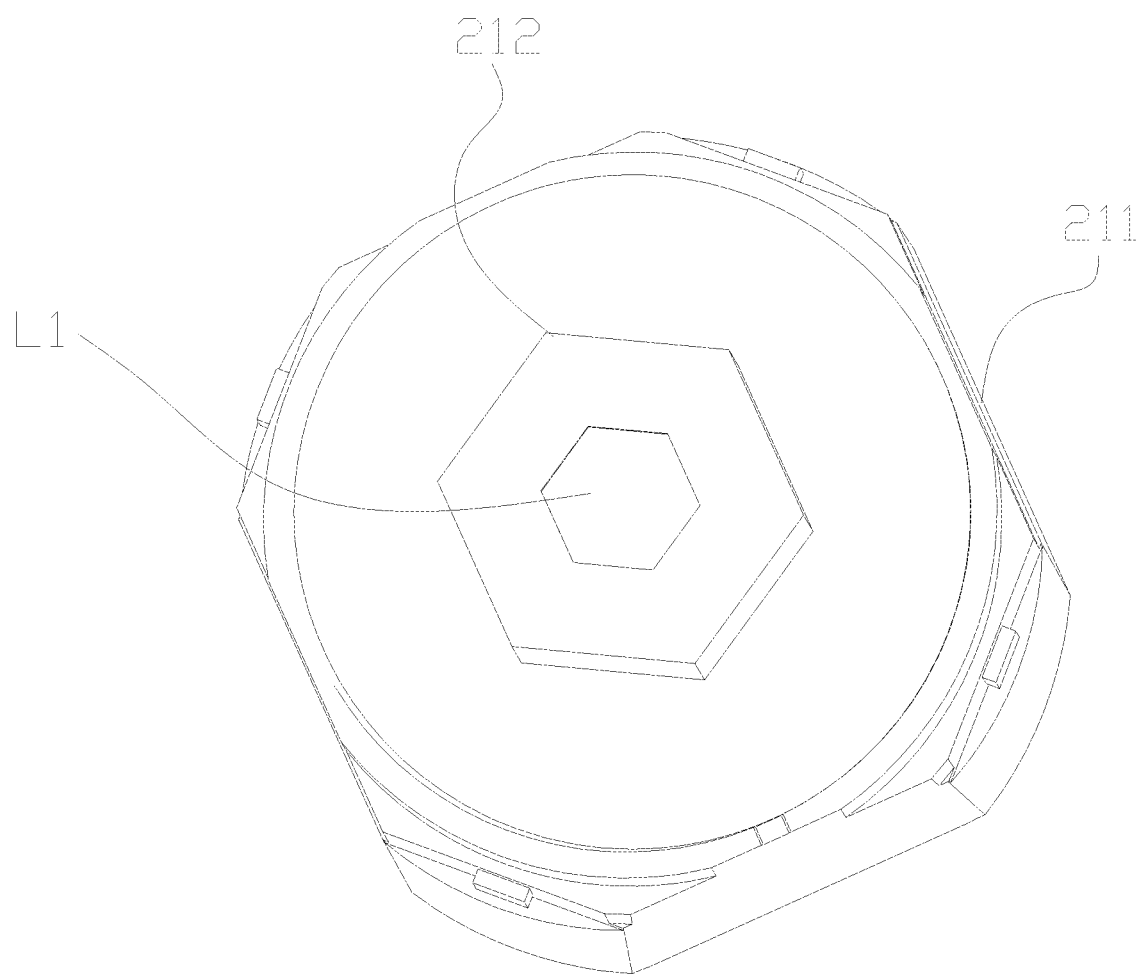
FIG. 4B is another schematic diagram of the lens assembly of the first embodiment of the invention.

The lens body 21 includes a lens barrel 211 and a cover 212 connected to an object side end of the lens barrel 211. The cover 212 is ring-shaped and is provided with an opening 212a, and the opening 212a is in the shape of circle. The lens barrel 211 and the cover 212 can be integrally formed as a continuous-unity piece. As shown in FIG. 4B, the opening 212a can be in the shape of polygon. However, the invention is not limited thereto. The opening 212a can be in the shape of non-circle, polygon with sides arranged symmetrically to the optical axis, bottle or oak barrel.

The lens barrel 211 can be in the shape of cylinder or others as shown in drawings (e.g. polygon). The lens barrel 211 includes a major diameter portion 211a close to the image side and a minor diameter portion 211b close to the object side, and the major diameter portion 211a and the minor diameter portion 211b are connected to each other. A stepped surface 211c is formed between the major diameter portion 211a and the minor diameter portion 211b, and the stepped surface 211c is a surface facing the object side. In other words, the major diameter portion 211a and the minor diameter portion 211b has the stepped surface 211c formed therebetween to form a step as a whole. A cross section of the major diameter portion 211a and the minor diameter portion 211b along the optical axis is substantially in the shape of "L", and a stepped structure is formed by the minor diameter portion 211b, the stepped surface 211c and the major diameter portion 211a in order from the object side to the image side. Therefore, the stepped surface 211c can be named "step" or "stair surface" or "mismatch discrepancy".

The first lens L1 is disposed in the lens barrel 211, close to the object side end of the lens barrel 211 and is fixed in the lens barrel 211 by interference fitting or glue. In the first embodiment, a cross section of the first lens L1 along the optical axis is in the shape of "凸". That is, the first lens L1 in a cross section is higher at the middle than at both sides, or the first lens is protruded at the middle towards the object side to form a pillar with respect to the sides thereof, and a step is formed between the middle portion and the both side portions. The first lens L1 includes a first portion close to the object side and a second portion close to the image side, and a maximal outer diameter of the first portion is significantly smaller than a maximal outer diameter of the second portion so that the step is formed between the first portion and the second portion. Preferably, the maximal outer diameter of the second portion is at least 1.3 times of the maximal outer diameter of the first portion. The first lens L1 includes an optical effective diameter portion L1-a and an edge portion L1-b for the first lens L1 to be supported and fixed. A part of the optical effective diameter portion L1-a is in the first portion, and another part of the optical effective diameter portion L1-a is in the second portion. The edge portion L1-b is in the second portion and is fixed in the major diameter portion 211a of the lens barrel 211. An object side portion of the optical effective diameter portion L1-a is in the minor diameter portion 211b. The above-described cross section of the first lens L1 can be in other shapes, e.g. in shape of non-circle, polygon with sides arranged symmetrically to the optical axis, bottle, oak barrel or upper portion of wine bottle.

An object side surface of the first lens L1 is protruded along the optical axis OA and is flushed with or is slightly lower than an object side surface of the cover 212. A diameter of the opening 212a of the cover 212 is slightly smaller than or equals an outer diameter of the first lens L1 so as to form a stop structure in front of the object side surface of the first lens L1.

In the first embodiment, the lens assembly 20 includes two portions with different diameter, which are a lens minor diameter portion close to the object side and a lens major diameter portion close to the image side. The lens minor diameter portion is formed by the minor diameter portion 211b of the lens barrel 211, and the lens major diameter portion is formed by the major diameter portion 211a of the lens barrel 211. The lens minor diameter portion is in the shape of circle or polygon, and the lens major diameter portion is in the shape of circle or polygon. However, the invention is not limited thereto. The lens minor diameter portion and the lens major diameter portion can also be in the shape of non-circle, polygon with sides arranged symmetrically to the optical axis, bottle or oak barrel.

In the first embodiment, the lens assembly 20 satisfies at least one of the following conditions:

$$0 < A/B < 0.3 \tag{1}$$

$$0 < A \leq 2.2 \text{ mm} \tag{2}$$

$$h \geq 0.8 \text{ mm} \tag{3}$$

$$0.8 > h/H \geq 0.22 \tag{4}$$

$$0 < S1/S2 < 0.25 \tag{5}$$

wherein A is the maximal outer diameter of the first portion of the first lens L1, B is the maximal outer diameter of the lens major diameter portion (in the first embodiment, B is an outer diameter of the major diameter portion 211a of the lens body 21), h is a thickness of the lens minor diameter portion (in the first embodiment, h is a thickness of the minor diameter portion 211b of the lens body 21 along the optical axis OA and also a distance from an object side end surface of the minor diameter portion to the stepped surface 211c along the optical axis OA), H is a thickness of the lens assembly 20 along the optical axis OA (that is, a distance from the object side end surface of the minor diameter portion to an image side end surface of the major diameter portion along the optical axis OA), S1 is an area of a cross section of the lens minor diameter portion, and S2 is an area of a cross section of the lens major diameter portion.

Preferably, $0 < S1/S2 \leq 0.19$ and $0.19 \leq A/B \leq 0.28$.

In the first embodiment, the lens assembly 20 further satisfies the following conditions:

$$0 < C/B \leq 0.38 \tag{6}$$

wherein C is the maximal outer diameter of the minor diameter portion 211b, which is close to the object side, of the first barrel 211, that is, a maximal outer diameter of the lens minor diameter portion. In other words, a numeral value of C is a sum of the maximal outer diameter A of the first portion of the first lens L1 and a thickness of a wall of the cover 212.

When the above conditions are satisfied, the effective diameter of the first lens L1 can be small, and the lens assembly 20 can have increased pixels and increased resolution.

Figure 5:
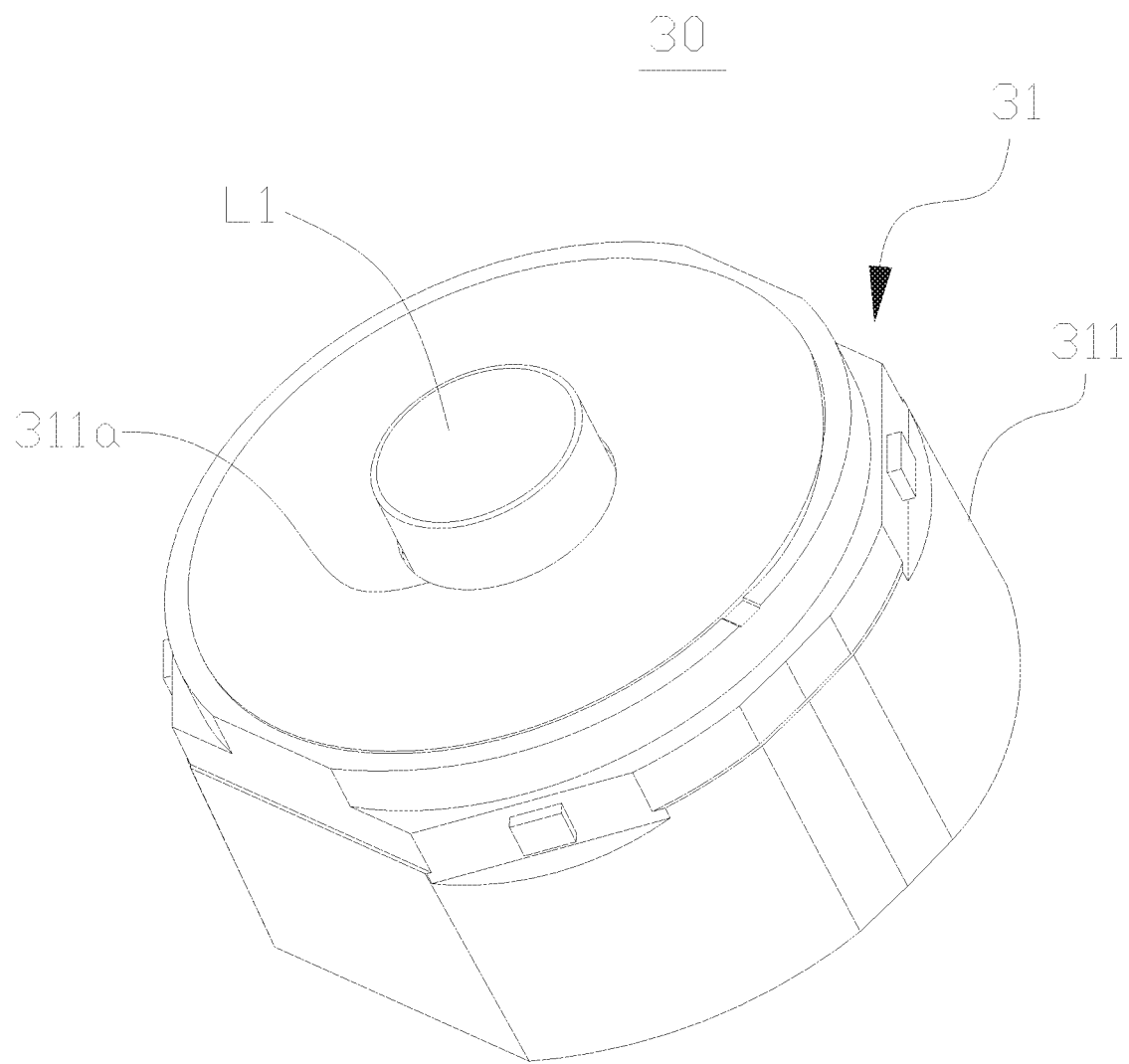
FIG. 5 is a schematic diagram of a lens assembly in accordance with a second embodiment of the invention.
Figure 6:
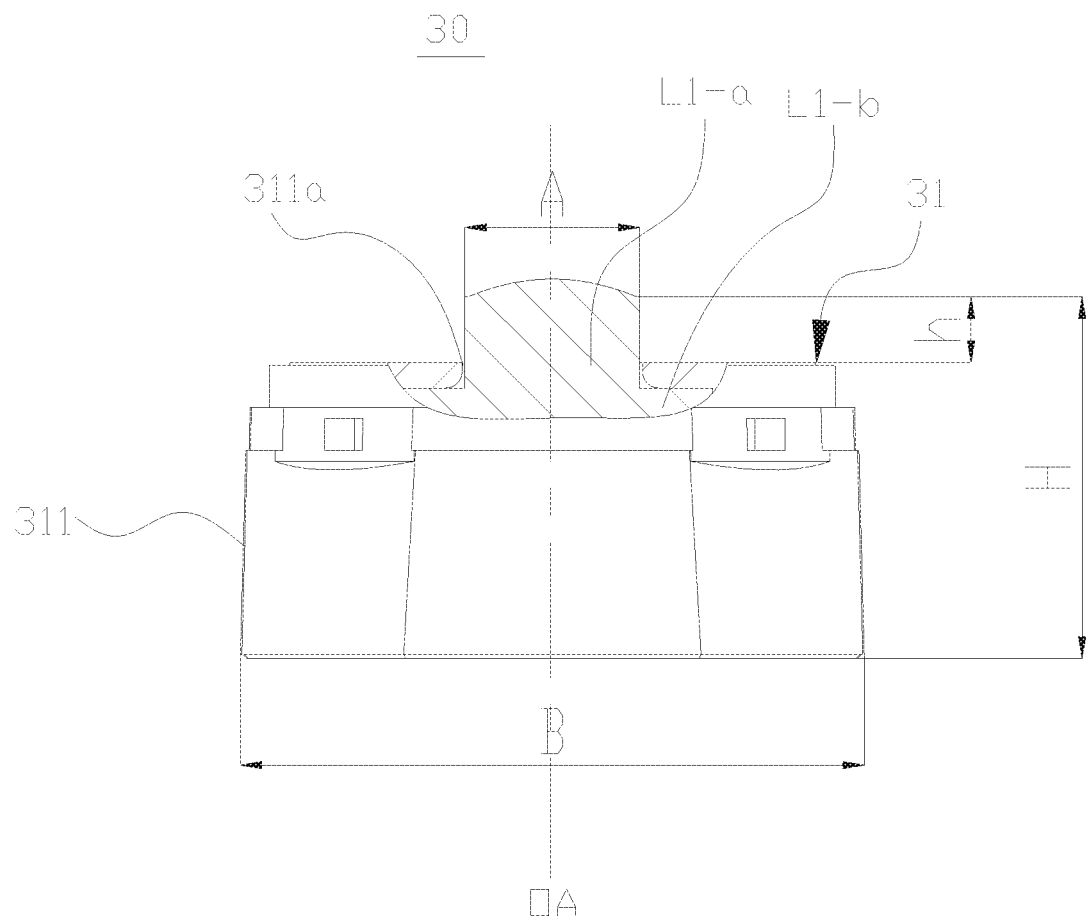
FIG. 6 is a partially sectional view of the lens assembly of the second embodiment of the invention.

FIG. 5 is a schematic diagram of a lens assembly 30 in accordance with a second embodiment of the invention. FIG. 6 is a partially sectional view of the lens assembly 30 in accordance with the second embodiment of the invention. In the second embodiment, the descriptions similar to those of the first embodiment are omitted. As shown in FIGS. 5 and 6, in the second embodiment of the invention, the lens assembly 30 includes a lens body 31 and a plurality of lenses fixed in the lens body 31 in order from an object side to an image side along an optical axis OA. A first lens L1 is closest to the object side.

The lens body 31 includes a lens barrel 311, and the lens barrel 311 is in the shape of cylinder. An object side end surface of the lens barrel 311 is provided with a first lens fixing hole 311a. The first lens L1 is fixed in the lens barrel 311 and is protruded from the first lens fixing hole 311a. An object side surface of the first lens L1 is protruded along the optical axis OA, that is, a part of the object side surface of the first lens L1 is protruded from the object side end surface of the lens barrel 311. In the second embodiment, a cross section of the first lens L1 along the optical axis OA is in the shape of " 凸 ". The first lens L1 includes an optical effective diameter portion L1-a and an edge portion L1-b for the first lens L to be supported and fixed. The edge portion L1-b is fixed in the lens barrel 311, an image side portion of the optical effective diameter portion L1-a is in the lens barrel 311, and an object side portion of the optical effective diameter portion L1-a is protruded through the first lens fixing hole 311a. It is understood that the first lens fixing hole 311a is in the shape of circle, but it is not limited thereto. The first lens fixing hole 311a can be in other shapes, e.g. in shape of polygon, non-circle, polygon with sides arranged symmetrically to the optical axis, bottle, oak barrel, or upper portion of wine bottle.

In the second embodiment, an edge of the object side surface of the first lens L1 is provided with a stop structure of the lens assembly 30. Preferably, the edge of the object side surface of the first lens L1 that is protruded from the lens barrel 311 is printed, blackened or matte for forming a light shielding structure thereon, so as to reduce the interference induced by incident light.

In the second embodiment, the lens assembly 30 also includes two portions with different diameter, that is, a lens minor diameter portion close to the object side and a lens major diameter portion close to the image side. The lens minor diameter portion is formed by a first portion of the first lens L1 with a minor diameter and close to the object side, and the lens major diameter portion is formed by the lens barrel 311. The lens minor diameter portion is in the shape of circle or polygon, and the lens major diameter portion is in the shape of circle or polygon. However, the invention is not limited thereto. The lens minor diameter portion and the lens major diameter portion can also be in the shape of non-circle, polygon with sides arranged symmetrically to the optical axis, bottle or oak barrel.

In the second embodiment, the lens assembly 30 satisfies at least one of the following conditions:

$$0<A/B<0.3 \tag{1}$$

$$0<A\leq1.385 \text{ mm} \tag{2}$$

$$h\geq0.8 \text{ mm} \tag{3}$$

$$0.8>h/H\geq0.22 \tag{4}$$

$$0<S1/S2<0.25 \tag{5}$$

wherein A is a maximal outer diameter of the first portion of the first lens L1, B is a maximal outer diameter of the lens major diameter portion (in the second embodiment, B is an outer diameter of the lens barrel 311), h is a thickness of the lens minor diameter portion (in the second embodiment, h is a thickness of part of the first lens L1 protruded from the lens barrel 311 along the optical axis OA and also a distance from the object side surface of the first lens L1 to the first lens fixing hole 311a along the optical axis OA). H is a thickness of the lens assembly 20 along the optical axis OA (that is, a distance from the object side surface of the first lens L1 to an image side end surface of the lens barrel 311 along the optical axis OA), S1 is an area of a cross section of the lens minor diameter portion, and S2 is an area of a cross section of the lens major diameter portion.

Preferably, $0<S1/S2\leq0.19$ and $0.19\leq A/B\leq0.28$.

In a condition that the lens assembly 30 satisfies the above conditions, the lens assembly 30 can be provided with increased view angle, the first lens L1 with small effective diameter, increased pixels and increased resolution.

In above-described embodiments, a length at which the first lens L1 is protruded from the lens minor diameter portion is greater than or equals 0.8 mm, and the outer diameter of the lens minor diameter portion is smaller than 2.2 mm. For achieving the above-described dimension and required optical performance, a number of embodiments are described below.

In following embodiments, a cross section of the first lens L1 is in the shape of " 凸 ". That is, the cross section of the first lens L1 along the optical axis is higher at middle than at both sides. Therefore, the first lens L1 has a middle portion protruded towards an object side to form a pillar with respect to the side portions, and a step is formed between the middle portion and the side portions. However, in optical systems as shown in FIGS. 7, 9, 11, 13, 15, 17 and 19, only an optical effective diameter portion of the first lens L1 is shown, and an edge portion of the first lens L1 is not shown for brief descriptions. The cross section of the first lens LI can be in other shapes, e.g. in shape of non-circle, polygon with sides arranged symmetrically to the optical axis, bottle, oak barrel, or upper portion of wine bottle.

Figure 7:
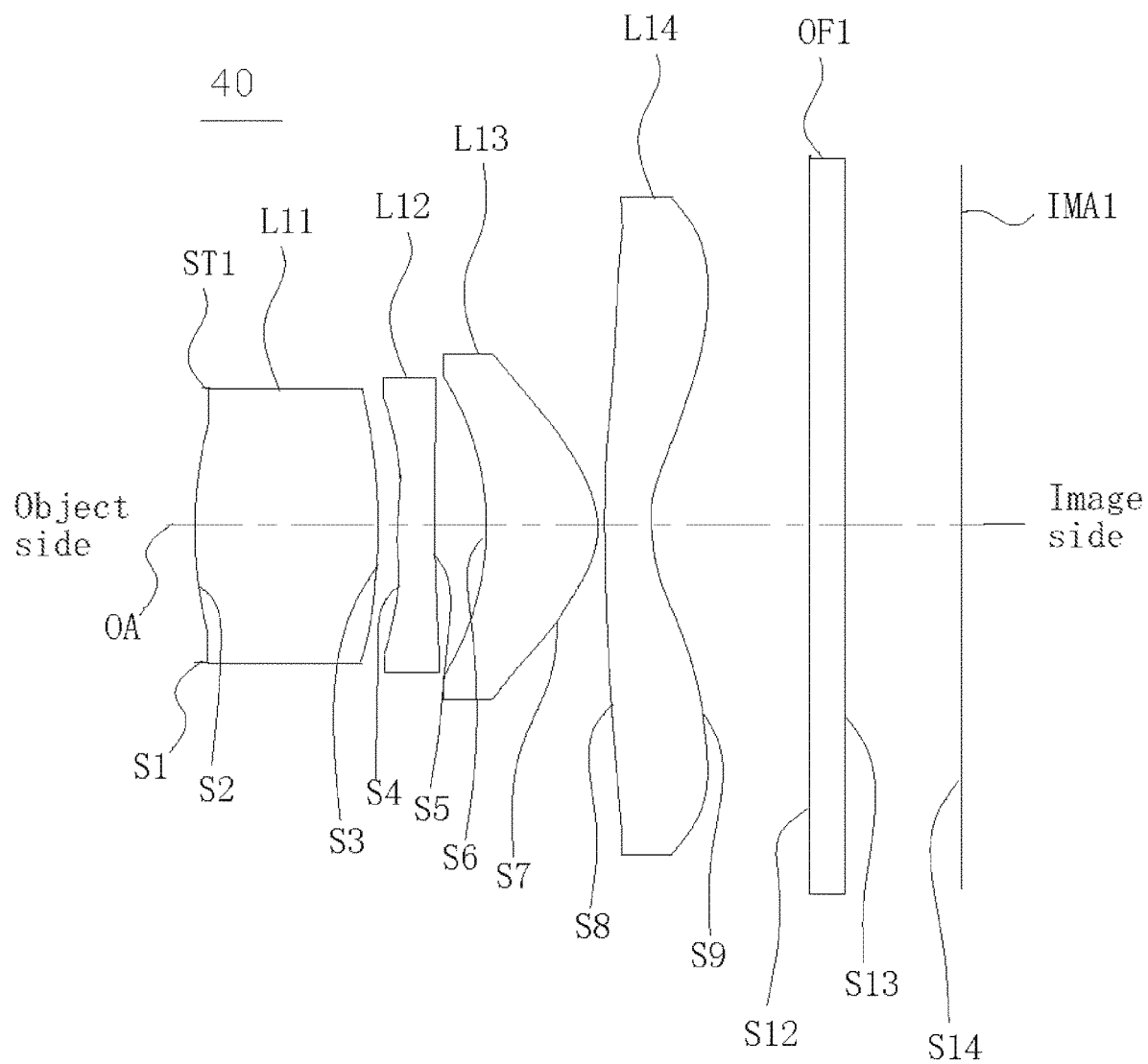
FIG. 7 is a lens layout diagram of a lens assembly in accordance with a third embodiment of the invention.

FIG. 7 is a lens layout diagram of a lens assembly in accordance with a third embodiment of the invention. As shown in FIG. 7, a lens assembly 40 in order from an object side to an image side along an optical axis OA includes a stop ST1, a first lens L11, a second lens L12, a third lens L13, a fourth lens L14, an optical filter OF1 and a imaging plane IMA1.

The first lens L11 is with positive refractive power. The first lens L11 is a biconvex lens, an object side surface S2 thereof is a convex surface, and an image side surface S3 thereof is a convex surface. The first lens L11 is made of glass.

The second lens L12 is with negative refractive power. The second lens L12 is a meniscus lens, an object side surface S4 thereof is a convex surface, and an image side surface S5 thereof is a concave surface. The second lens L12 is made of plastic.

The third lens L13 is with positive refractive power. The third lens L13 is a meniscus lens, an object side surface S6 thereof is a concave surface, and an image side surface S7 thereof is a convex surface. The third lens L13 is made of plastic.

The fourth lens L14 is with negative refractive power. The fourth lens L14 is a biconcave lens, an object side surface S8 thereof is a concave surface and has an inflection point, and an image side surface S9 thereof is a concave surface and has an inflection point. The fourth lens L14 is made of plastic.

An object side surface S12 and an image side surface S13 of the optical filter OF1 are flat surfaces.

At least one of the first lens L11, the second lens L12, the third lens L13 and the fourth lens L14 has an aspherical surface. The sag value z of the aspherical surface is expressed by the following equation:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

wherein c is the curvature of the surface, h is the distance between the optical axis and a point on the lens surface in a direction vertical to the optical axis, k is the conic coefficient, and A to G are the aspheric coefficients.

The lens assembly 40 satisfies at least one of the following conditions:

$0.8 < L1D/L1T < 1.7$ (7)

$0 < f1/L1T < 5$ (8)

$1 < EFL/L1T < 4$ (9)

$1.9 < EFL/L1D < 2.6$ (10)

$2 \text{ mm} < (L1D + L1T) < 5 \text{ mm}$ (11)

$3 < (EFL + TTL)/L1T < 9$ (12)

$1.5 < ALT/L1T < 3.5$ (13)

$2.5 \text{ mm}^2 < G1 \times f1 < 8 \text{ mm}^2$ (14)

wherein L1D is an optical effective diameter of the object side surface S2 of the first lens L11, L1T is a thickness of the first lens L1 along the optical axis (that is, a distance from the object side surface S2 to image side surface S3 along the optical axis OA), f1 is a focal length of the first lens L11, EFL is an effective focal length of the lens assembly 40, TTL is a total lens length of the lens assembly 40 (that is, a distance from the object side surface S2 of the first lens L11 to the imaging plane IMA1 along the optical axis OA), ALT is a sum of thicknesses of the lenses (that is, a sum of distances from object side surfaces of the lenses to image side surfaces of the lenses along the optical axis OA), and G1 is a length at which the first lens L11 is protruded (that is, a distance from a central point of the object side surface S2 to an edge of an effective diameter of the image side surface S3).

When the lens assembly 40 satisfies at least one of the above conditions, both of the outer diameter of the lens minor diameter portion and the optical effective diameter of the first lens L11 are smaller than 2.2 mm, and the lens assembly 40 still has a good optical performance. The condition (14): 2.5 mm² < G1×f1 < 8 mm² shows a relation between the length at which the first lens is protruded and the focal length. The length G1 is relevant to the effect of the arrangement that the cross section of the first lens along the optical axis is in the shape of "凸" and the step is formed between the first portion and the second portion. That is, the numeral value of the length G1 has effects on the length at which the object side surface of the first lens is protruded along the optical axis, on the cross section along the optical axis that is higher at the middle than at both sides, on the pillar formed by protrusion of the first lens at the middle toward the object side, and on the step between the first portion and the second portion. Moreover, the focal length f1 of the first lens is relevant to focusing effect in the optical path and imaging quality of the entire optical system. If the condition (14) is satisfied, it is ensured that the first lens L11 has the optical effective diameter that is smaller than 2.2 mm, the length at which the first lens is protruded from the lens minor diameter portion is greater than or equals 0.8 mm, and the lens assembly 40 still has a good optical performance. Also, it is relevant to the condition (1): $0 < A/B < 0.3$, the condition (2): $0 < A \leq 2.2$ mm and the condition (3): $h \geq 0.8$ mm. Since A is the maximal outer diameter of the first portion of the first lens, the conditions (14), (1), (2) and (3) are provided for the same purpose, which are provided to ensure that the optical effective diameter of the first lens L11 is smaller than 2.2 mm, the length at which the first lens is protruded from the lens minor diameter portion is greater than or equals 0.8 mm, and the lens assembly 40 still has a good optical performance.

It is understood that the cross section of the first lens L11 is not limited to be in the shape of circle. It can be in other shapes, e.g. in shape of non-circle, polygon, polygon with sides arranged symmetrically to the optical axis, bottle, or oak barrel.

Table 1 shows the parameters of each lens of the lens assembly 40 of FIG. 7. In Table 1, the effective focal length EFL of the lens assembly 40 is about 2.55 mm, the aperture value of the lens assembly 40 is 2.0, the total length TTL of the lens assembly 40 is about 3.92 mm, the view angle of the lens assembly 40 is about 78 degrees, the optical effective diameter L1D of the object side surface S2 of the first lens L11 is about 1.28 mm, the thickness L1T of the first lens L11 along the optical axis is about 1.10 mm, the sum of thicknesses of the lenses ALT is about 2.55 mm, the focal length of the first lens L11 is about 2.94 mm, the focal length of the second lens L12 is about −5.43 mm, the focal length of the third lens L13 is about 0.87 mm, the focal length of the fourth lens L14 is about −0.93 mm, the length G1 at which the first lens L11 is protruded is about 1 mm, and the maximal outer diameter B of the lens major diameter portion is about 6.6 mm.

TABLE 1

| Surface Number | Radius of Curvature (mm) | Distance (mm) | Nd | Vd | Remark |
| --- | --- | --- | --- | --- | --- |
| S0 | — | 380 | | | The object side |
| S1 | ∞ | 0 | 0 | 0 | |
| S2 | 2.395789 | 1.099093 | 1.723243 | 55.000000 | The first lens |
| S3 | −15.11394 | 0.1466824 | | | |
| S4 | 15.89627 | 0.2031851 | 1.671339 | 19.242888 | The second lens |
| S5 | 2.951734 | 0.3091874 | | | |
| S6 | −3.14703 | 0.677517 | 1.544100 | 56.093602 | The third lens |

TABLE 1-continued

| Surface Number | Radius of Curvature (mm) | Distance (mm) | Nd | Vd | Remark |
|---|---|---|---|---|---|
| S7 | −0.4425573 | 0.05009316 | | | |
| S3 | −15.31265 | 0.2715172 | 1.544100 | 56.093602 | The fourth lens |
| S9 | 0.5275424 | 0.948713 | | | |
| S12 | ∞ | 0.21 | 1.516 | 64.198 | The optical filter |
| S13 | ∞ | 0 | | | |
| S14 | ∞ | | | | The imaging plane |

Table 2 shows that the optical specifications of the aspheric surface of each lens of the lens assembly 40 of FIG. 7, wherein k is a conic constant, and A-G are aspheric coefficients.

TABLE 2

| Surface Number | k | A | B | C | D | E | F | G |
|---|---|---|---|---|---|---|---|---|
| S2 | −0.8265235 | −0.076480731 | −0.32822215 | 0.84909631 | −3.2088697 | −1.0724374 | 25.584683 | −47.733062 |
| S3 | 0 | −0.30365276 | 0.66020486 | 0.39749496 | −2.1357564 | 4.3791009 | −5.2152193 | −3.5301719 |
| S4 | 0 | −1.0646305 | 0.98326261 | 1.1627381 | 0.15548757 | −4.8826474 | 5.2153741 | −1.8150946 |
| S5 | −96.12744 | −0.48765217 | 0.83999113 | −0.51850091 | 0.23253309 | 0.20111814 | −0.48772554 | 0.14134485 |
| S6 | −2.085516 | −0.5609521 | 1.425397 | −1.7469322 | −1.05955 | 3.9968825 | −2.3741103 | 0.077138272 |
| S7 | −3.675063 | −0.524977 | 0.90589061 | −0.81313636 | 0.1581577 | −0.059580182 | 0.38104437 | −0.19076064 |
| S8 | 0 | 0.32938708 | −0.46760249 | 0.31815217 | −0.11708384 | 0.023121008 | −0.0021602085 | 6.0956333e−005 |
| S9 | −7.311842 | −0.018053159 | −0.014851247 | −0.0074488696 | 0.011966994 | −0.0047720707 | 0.00079357859 | −4.8672085e−005 |

In the third embodiment, the cross section of the first lens L11 is in the shape of circle, and the optical effective diameter L1D of the object side surface S2 of the first lens L11 equals the maximal outer diameter A of the first portion of the first lens L11. By calculation, it is obtained that A/B=1.28/6.6=0.1939 that satisfies the condition (1). From Tables 1 and 2, it can be obtained that L1D/L1T=1.28/1.10=1.16, f1/L1T=2.94/1.10=2.67, EFL/L1T=2.55/1.10=2.32, EFL/L1D=2.55/1.28=1.99, L1D+L1T=1.28+1.10=2.38 mm, (EFL+TTL)/L1T=(2.55+3.92)/1.10=5.88, ALT/L1T=2.25/1.10=2.05, G1×f1=1×2.94=2.94 mm². It is found that the lens assembly 40 can meet the requirements of the conditions (7)-(14).

Figure 8A:
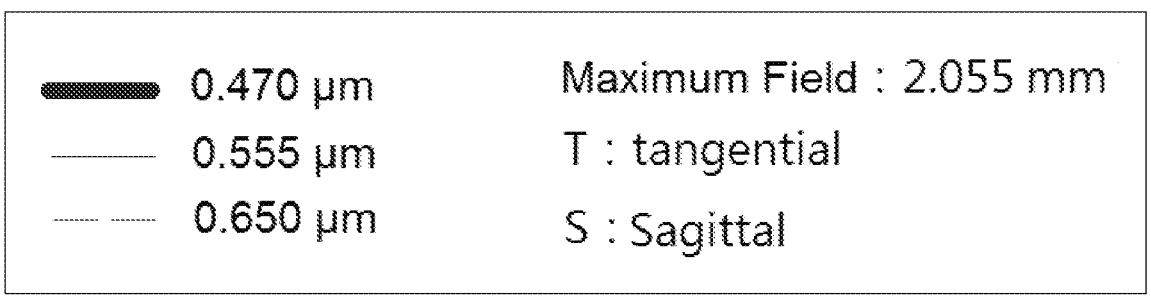
FIG. 8A is a field curvature diagram of the lens assembly of FIG. 7.
Figure 8A:
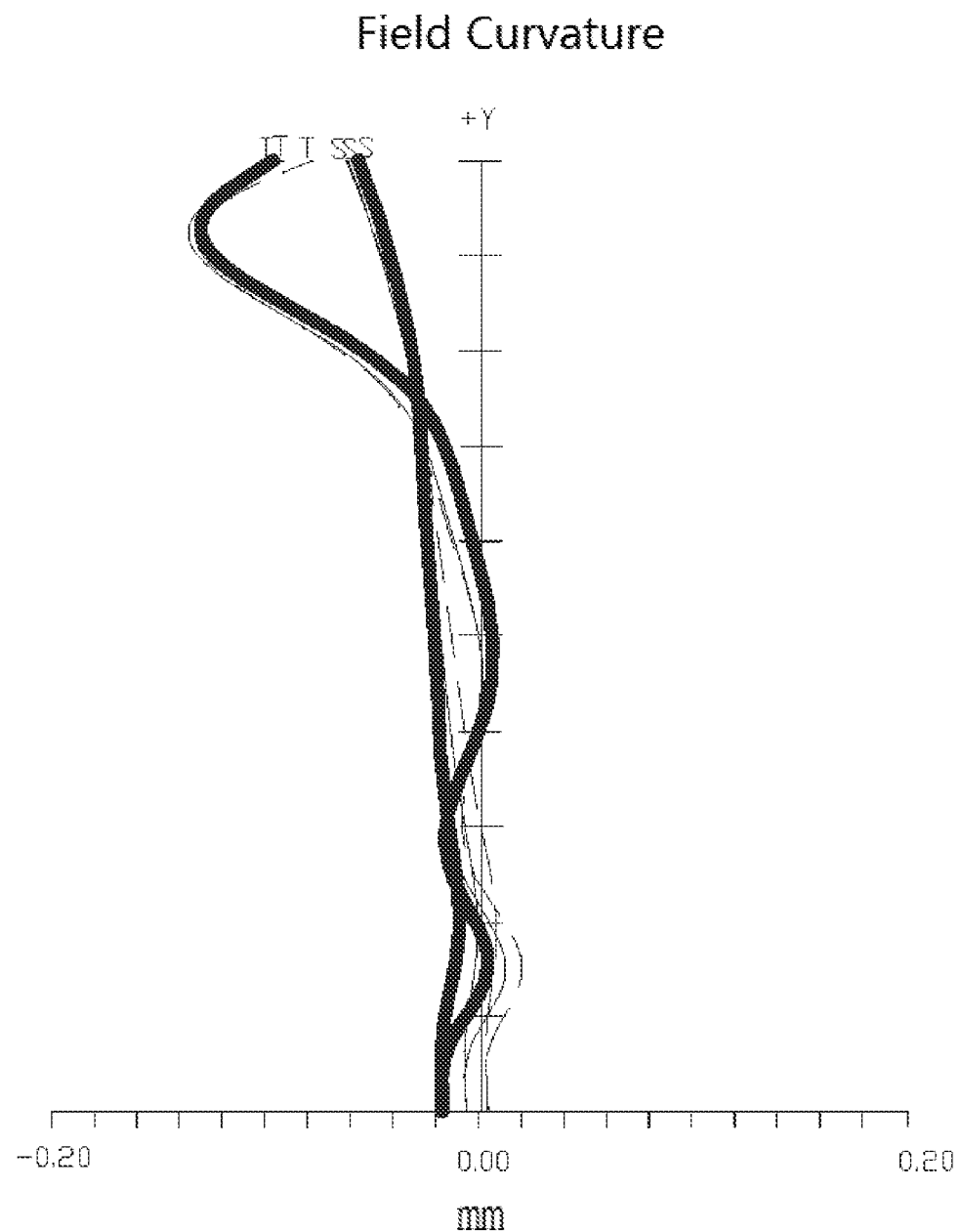
Figure 8B:
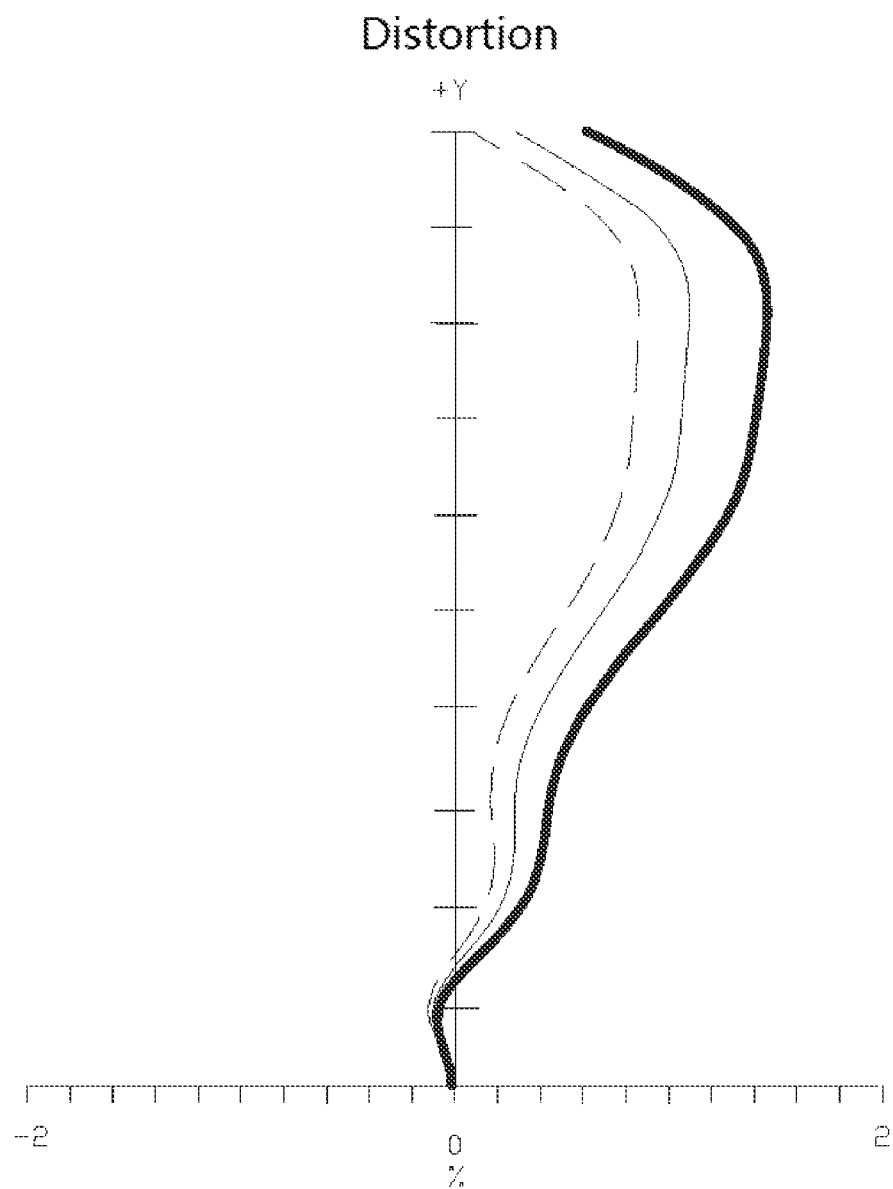
FIG. 8B is a distortion diagram of the lens assembly of FIG. 7.

It can be seen from FIGS. 8A-8B that the lens assembly 40 also meets the requirements of optical performance. FIG. 8A is a field curvature diagram of the lens assembly 40 of FIG. 7. FIG. 8B is a distortion diagram of the lens assembly 40 of FIG. 7. It can be seen from FIG. 8A that the field curvature of the lens assembly 40 ranges from −0.14 mm to 0.02 mm. It can be seen from FIG. 8B that the distortion of the lens assembly 40 ranges from −0.2% to 1.6%. Moreover, according to the experiments, a modulation transfer function of the lens assembly 40 ranges from 0.17 to 1.0. It is obvious that the field curvature and the distortion of the lens assembly 40 can be corrected effectively, and the resolution the lens assembly 40 can meet the requirements. Therefore, the lens assembly 40 is capable of good optical performance.

Figure 9:
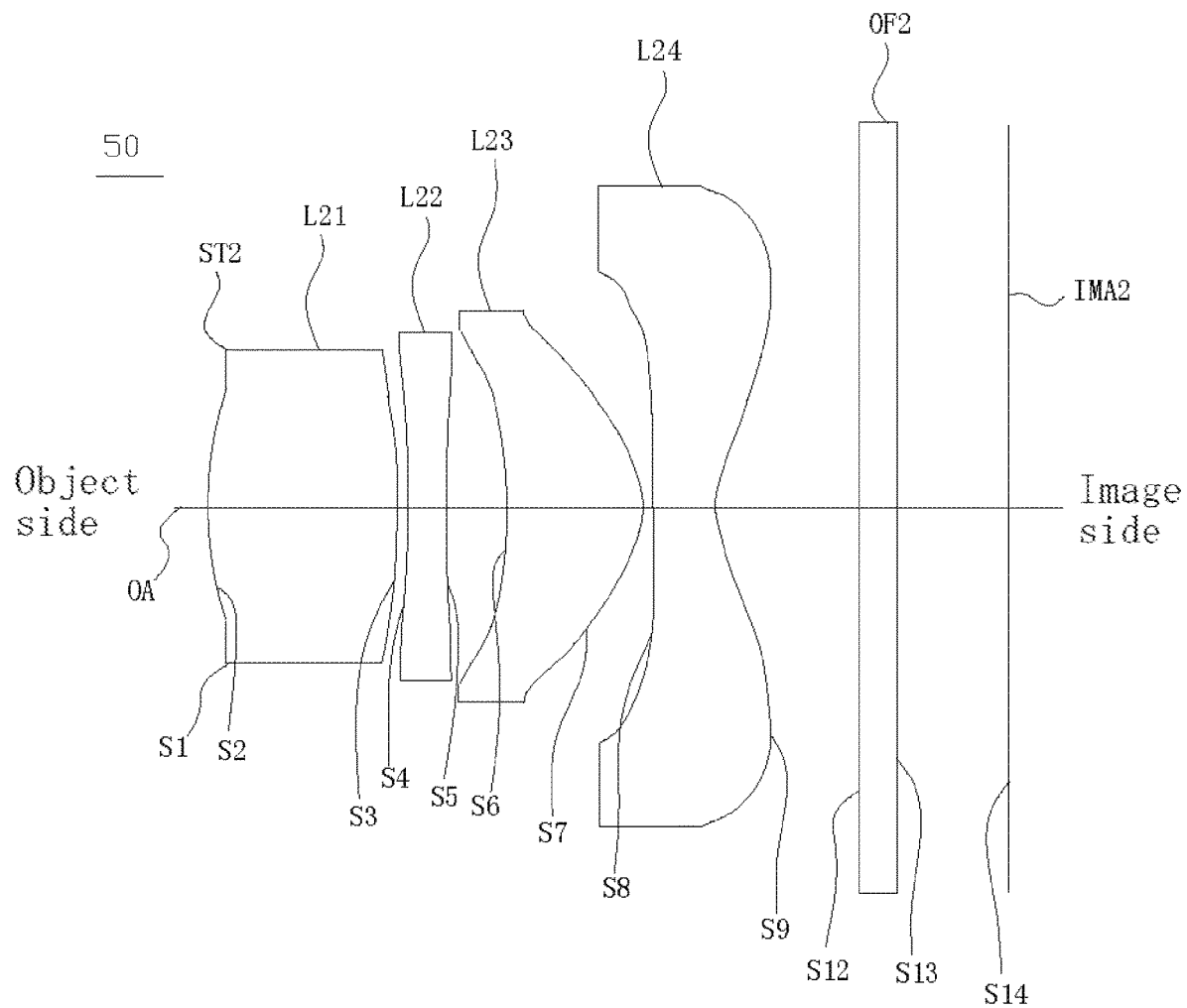
FIG. 9 is a lens layout diagram of a lens assembly in accordance with a fourth embodiment of the invention.

FIG. 9 is a lens layout diagram of a lens assembly in accordance with a fourth embodiment of the invention. As shown in FIG. 9, a lens assembly 50 in order from an object side to an image side along an optical axis OA includes a stop ST2, a first lens L21, a second lens L22, a third lens L23, a fourth lens L24, an optical filter OF2 and a imaging plane IMA2.

The first lens L21 is with positive refractive power. The first lens L21 is a biconvex lens, an object side surface S2 thereof is a convex surface, and an image side surface S3 thereof is a convex surface. The first lens L21 is made of glass.

The second lens L22 is with negative refractive power. The second lens L22 is a meniscus lens, an object side surface S4 thereof is a convex surface, and an image side surface S5 thereof is a concave surface. The second lens L22 is made of plastic.

The third lens L23 is with positive refractive power. The third lens L23 is a meniscus lens, an object side surface S6 thereof is a concave surface, and an image side surface S7 thereof is a convex surface. The third lens L23 is made of plastic.

The fourth lens L24 is with negative refractive power. The fourth lens L24 is a biconcave lens, an object side surface S8 thereof is a concave surface and has an inflection point, and an image side surface S9 thereof is a concave surface and has an inflection point. The fourth lens L24 is made of plastic.

An object side surface S12 and an image side surface S13 of the optical filter OF2 are flat surfaces.

It is understood that the cross section of the first lens L21 is not limited to be in the shape of circle. It can be in other shapes, e.g. in shape of non-circle, polygon, polygon with sides arranged symmetrically to the optical axis, bottle, or oak barrel.

At least one of the first lens L21, the second lens L22, the third lens L23 and the fourth lens L24 has an aspherical surface. The definition of aspheric surface sag z of each aspheric surface in table 3 is the same as that of in Table 1, and is not described here again.

When the lens assembly 50 satisfies at least one of the conditions (7)-(14), both of the outer diameter of the lens minor diameter portion and the optical effective diameter of the first lens L21 are smaller than 2.2 mm, and the lens assembly 50 still has a good optical performance.

Table 3 shows the parameters of each lens in the lens assembly 50 of FIG. 9. In Table 3, the effective focal length EFL of the lens assembly 50 is about 2.63 mm, the aperture value of the lens assembly 50 is 2.0, the total length TL of the lens assembly 50 is about 3.95 mm, the view angle of the lens assembly 50 is about 75 degrees, the optical effective diameter L1D of the object side surface S2 of the first lens L21 is about 1.32 mm, the thickness L1T of the first lens L21 along the optical axis is about 1.09 mm, the sum of thicknesses of the lenses ALT is about 2.44 mm, the focal length of the first lens L21 is about 3.08 mm, the focal length of the second lens L22 is about −9.04 mm, the focal length of the third lens L23 is about 0.99 mm, the focal length of the fourth lens L24 is about −0.96 mm, the length G1 at which the first lens L21 is protruded is about 1 mm, and the maximal outer diameter B of the lens major diameter portion is about 6.6 mm.

TABLE 3

| Surface Number | Radius of Curvature (mm) | Distance (mm) | Nd | Vd | Remark |
| --- | --- | --- | --- | --- | --- |
| S0 | — | 380 | | | The object side |
| S1 | ∞ | 0 | 0 | 0 | The stop |
| S2 | 2.151353 | 1.085616 | 1.595614 | 67.290000 | The first lens |
| S3 | −10.04272 | 0.06934866 | | | |
| S4 | 10.00047 | 0.2099994 | 1.671339 | 19.242888 | The second lens |
| S5 | 3.744856 | 0.3472886 | | | |
| S6 | −3.105664 | 0.7829128 | 1.544100 | 56.093602 | The third lens |
| S7 | −0.4994744 | 0.06123566 | | | |
| S8 | −9.950512 | 0.3617391 | 1.544100 | 56.093602 | The fourth lens |
| S9 | 0.5565225 | 0.8226998 | | | |
| S12 | ∞ | 0.21 | 1.516 | 64.198 | The optical filter |
| S13 | ∞ | 0 | | | |
| S14 | | | | | The imaging plane |

Table 4 shows that the optical specifications of the aspheric surface of each lens of the lens assembly 50 of FIG. 9, wherein k is a conic constant, and A-G are aspheric coefficients.

Figure 10A:
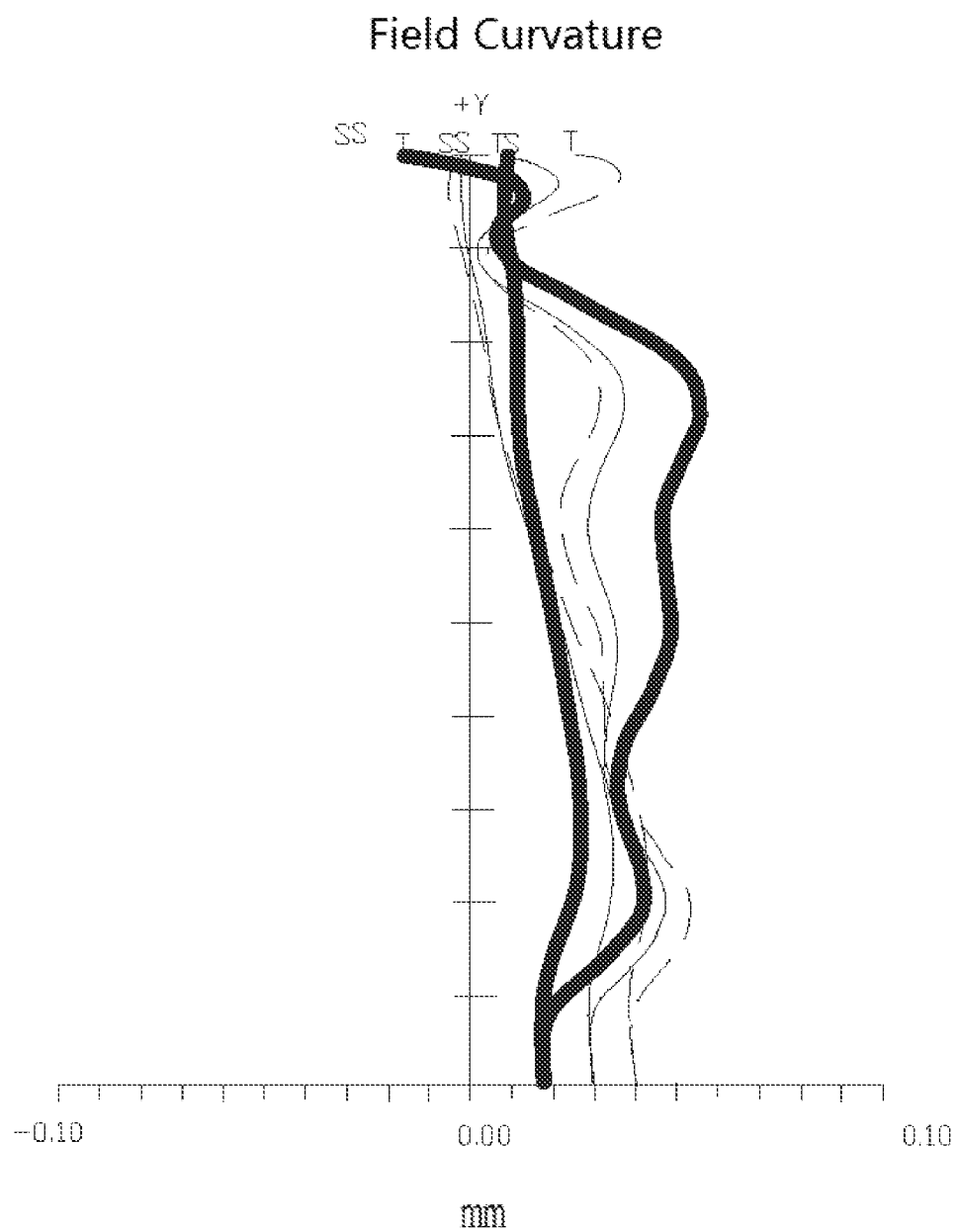
FIG. 10A is a field curvature diagram of the lens assembly of FIG. 9.
Figure 10B:
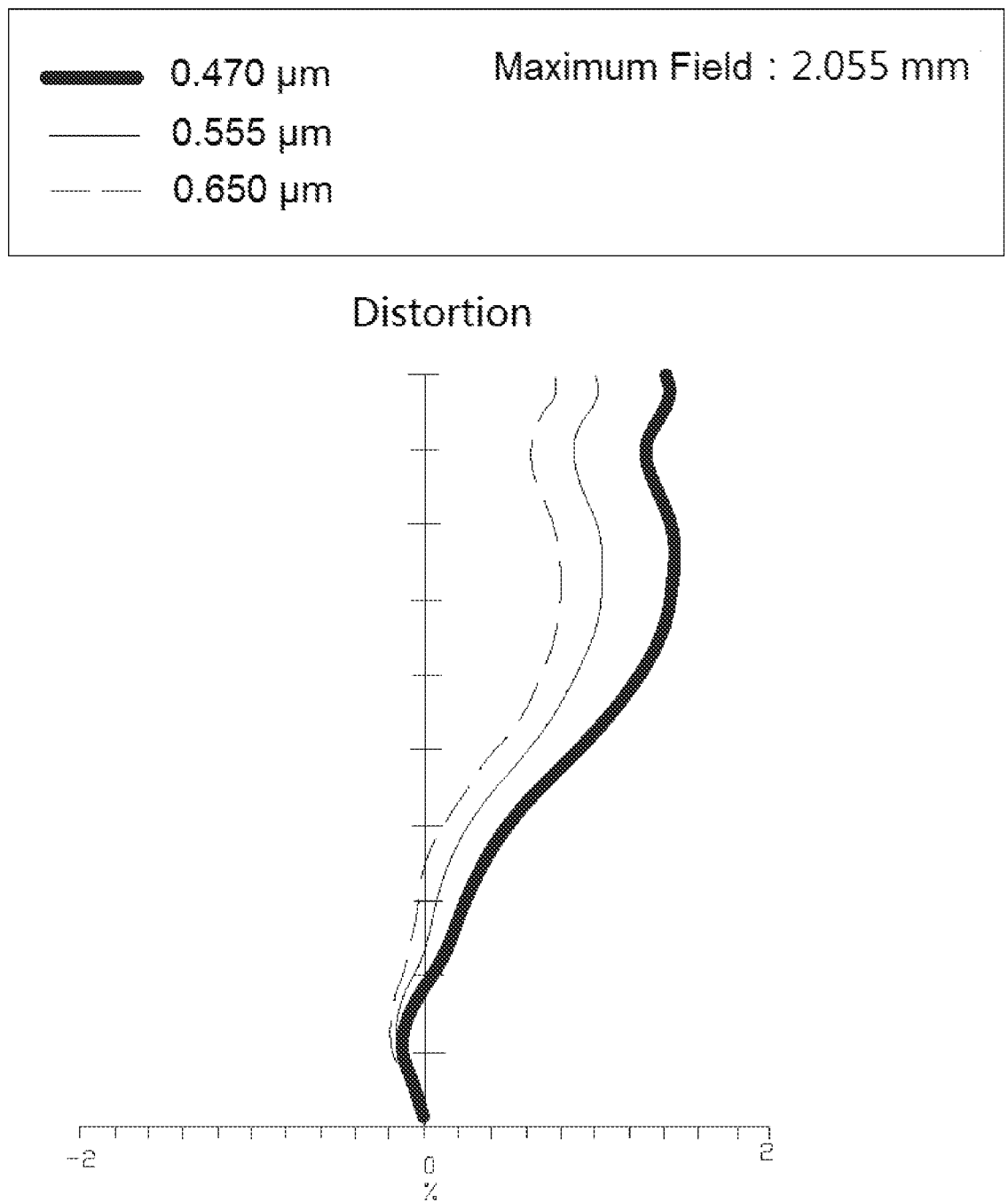
FIG. 10B is a distortion diagram of the lens assembly of FIG. 9.

It can be seen from FIGS. 10A-10B that the lens assembly 50 also meets the requirements of optical performance. FIG. 10A is a field curvature diagram of the lens assembly 50 of FIG. 9. FIG. 10B is a distortion diagram of the lens assembly 50 of FIG. 9. It can be seen from FIG. 10A that the field curvature of the lens assembly 50 ranges from −0.02 mm to 0.06 mm. It can be seen from FIG. 10B that the distortion of the lens assembly 50 ranges from −0.5% to 1.8%. Moreover, according to the experiments, a modulation transfer function of the lens assembly 50 ranges from 0.36 to 1.0. It is obvious that the field curvature and the distortion of the lens assembly 50 can be corrected effectively, and the resolution the lens assembly 50 can meet the requirements. Therefore, the lens assembly 50 is capable of good optical performance.

Figure 11:
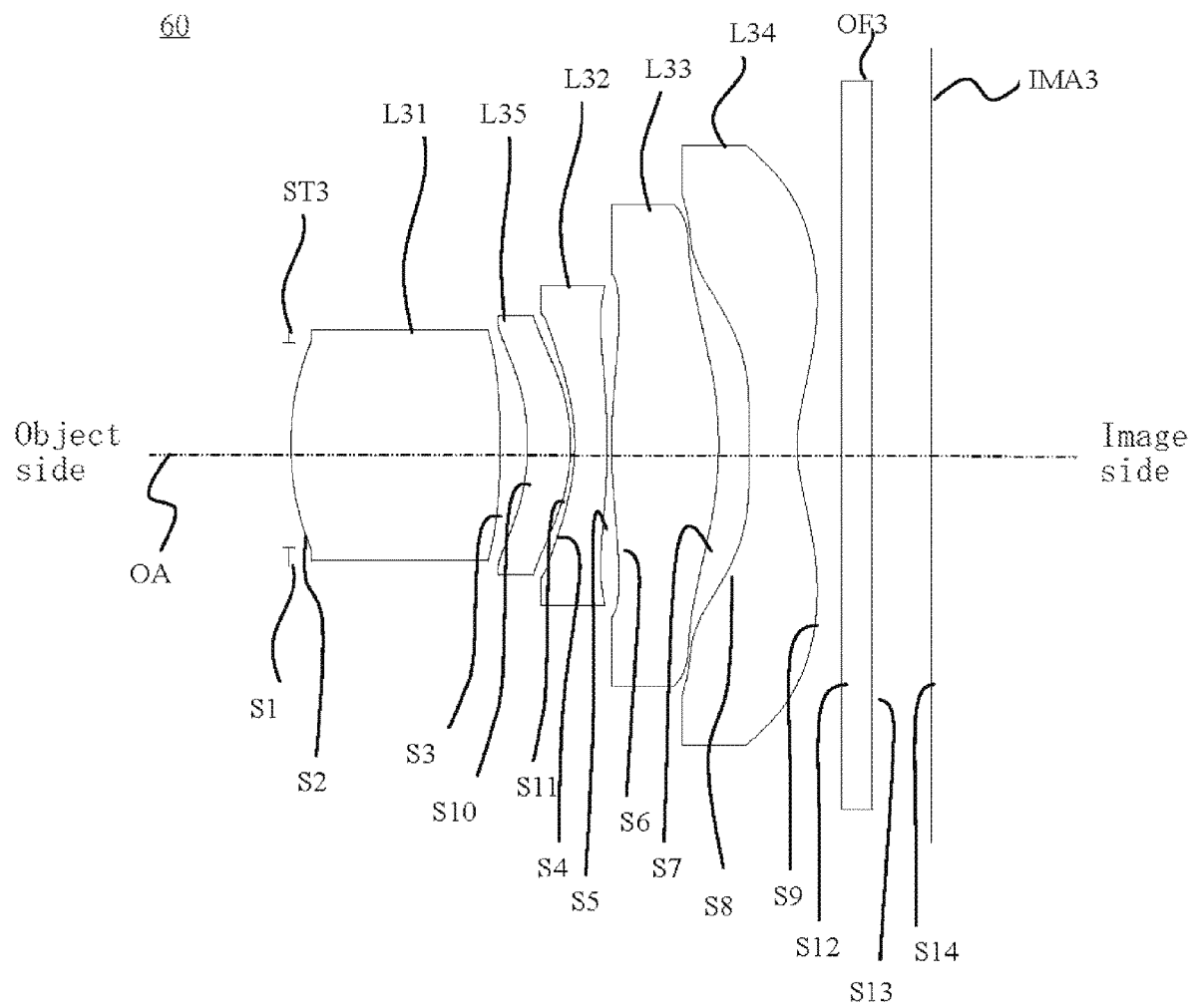
FIG. 11 is a lens layout diagram of a lens assembly in accordance with a fifth embodiment of the invention.

FIG. 11 is a lens layout diagram of a lens assembly in accordance with a fifth embodiment of the invention. As shown in FIG. 11, a lens assembly 60 in order from an object side to an image side along an optical axis OA includes a stop ST3, a first lens L31, a fifth lens L35, a second lens L32, a third lens L33, a fourth lens L34, an optical filter OF3 and a imaging plane IMA3.

TABLE 4

| Surface Number | k | A | B | C | D | E | F | G |
| --- | --- | --- | --- | --- | --- | --- | --- | --- |
| S2 | 3.585153 | −0.0082674741 | −0.63313826 | 3.0658812 | −7.1637746 | 3.2577539 | 12.753306 | −15.019725 |
| S3 | 0 | −0.37873358 | 0.094464203 | 1.7264902 | −2.9660109 | 3.2170769 | −3.3021074 | 1.567156 |
| S4 | 0 | −0.5436161 | −0.24695251 | 2.7394577 | −1.6739885 | −3.1995841 | 4.4482083 | −1.6564547 |
| S5 | 4.973783 | −0.23486351 | −0.051571929 | 0.43247553 | −0.28497092 | 0.11731589 | −0.21071147 | 0.1061357 |
| S6 | −14.28093 | −0.18830596 | 0.57538838 | −1.2296907 | 0.1700718 | 1.3393194 | −1.0167851 | 0.2161351 |
| S7 | −3.425811 | −0.24626585 | 0.28435979 | −0.22817717 | 0.013270186 | −0.15904531 | 0.29673748 | −0.10187665 |
| S8 | 0 | 0.19476712 | −0.46675882 | 0.39445335 | −0.16461338 | 0.0015191655 | 0.031857365 | −0.010321493 |
| S9 | −6.241368 | −0.058190616 | −0.004922603 | 0.0039892144 | 0.0035275618 | −0.0042246484 | 0.0014884371 | −0.00018829638 |

In the fourth embodiment, the cross section of the first lens L21 is in the shape of circle, and the optical effective diameter L1D of the object side surface S2 of the first lens L21 equals the maximal outer diameter A of the first portion of the first lens L21. By calculation, it is obtained that A/B=1.32/6.6=0.2 that satisfies the condition (1). From Tables 3 and 4, it can be obtained that L1D/L1T=1.32/1.09=1.21, f1/L1T=3.08/1.09=2.83, EFL/L1T=2.63/1.09=2.41, EFL/L1D=2.63/1.32=1.99, L1D+L1T=1.32+1.09=2.41 mm, (EFL+TTL)/L1T=(2.63+3.95)/1.09=6.04, ALT/L1T=2.44/1.09=2.24, G1×f1=1×3.08=3.08 mm². It is found that the lens assembly 50 can meet the requirements of the conditions (7)-(14).

The first lens L31 is with positive refractive power. The first lens L31 is a biconvex lens, an object side surface S2 thereof is a convex surface, and an image side surface S3 thereof is a convex surface. The first lens L31 is made of glass.

The fifth lens L35 is with positive refractive power. The fifth lens L35 is a meniscus lens, an object side surface S10 thereof is a concave surface, and an image side surface S11 thereof is a convex surface. The fifth lens L35 is made of plastic.

The second lens L32 is with negative refractive power. The second lens L32 is a meniscus lens, an object side surface S4 thereof is a concave surface, and an image side surface S5 thereof is a convex surface. The second lens L32 is made of plastic.

The third lens L33 is with positive refractive power. The third lens L33 is a biconvex lens, an object side surface S6 thereof is a convex surface, and an image side surface S7 thereof is a convex surface. The third lens L33 is made of plastic.

The fourth lens L34 is with negative refractive power. The fourth lens L34 is a meniscus lens, an object side surface S8 thereof is a convex surface and has an inflection point, and an image side surface S9 thereof is a concave surface and has an inflection point. The fourth lens L34 is made of plastic.

An object side surface S12 and an image side surface S13 of the optical filter OF3 are flat surfaces.

It is understood that the cross section of the first lens L31 is not limited to be in the shape of circle. It can be in other shapes, e.g. in shape of non-circle, polygon, polygon with sides arranged symmetrically to the optical axis, bottle, or oak barrel.

At least one of the first lens L31, the fifth lens L35, the second lens L32, the third lens L33 and the fourth lens L34 has an aspherical surface. The definition of aspheric surface sag z of each aspheric surface in table 5 is the same as that of in Table 1, and is not described here again.

When the lens assembly 60 satisfies at least one of the conditions (7)-(14), it is ensured that both of the outer diameter of the lens minor diameter portion and the optical effective diameter of the first lens L31 are smaller than 2.2 mm, the length at which the first lens L31 is protruded from the lens minor diameter portion or the lens barrel is greater than or equals 0.8 mm, and the lens assembly 60 still has good optical performance.

eter C of the minor diameter portion 211b of the lens barrel 211 is about 2.2 mm, and the thickness of the wall of the cover 212 is 0.25 mm.

TABLE 5

| Surface Number | Radius of Curvature (mm) | Distance (mm) | Nd | Vd | Remark |
| --- | --- | --- | --- | --- | --- |
| S0 | — | 500 | | | The object side |
| S1 | ∞ | 0.015 | | | The stop |
| S2 | 1.847 | 1.410 | 1.60 | 66.9 | The first lens |
| S3 | −5.438 | 0.183 | | | |
| S10 | −1.601 | 0.288 | 1.54 | 56.1 | The fifth lens |
| S11 | −1.451 | 0.030 | | | |
| S4 | −1.444 | 0.220 | 1.67 | 19.2 | The second lens |
| S5 | −5.129 | 0.030 | | | |
| S6 | 3.141 | 0.720 | 1.67 | 19.2 | The third lens |
| S7 | −2.513 | 0.203 | | | |
| S8 | 16.615 | 0.323 | 1.67 | 19.2 | The fourth lens |
| S9 | 1.134 | 0.300 | | | |
| S12 | ∞ | 0.210 | 1.516 | 64.198 | The optical filter |
| S13 | ∞ | 0.395 | | | |
| S14 | | 0.000 | | | The imaging plane |

Table 6 shows that the optical specifications of the aspheric surface of each lens in the lens assembly 60 shown in FIG. 11, wherein k is a conic constant, and A-G are aspheric coefficients.

TABLE 6

| Surface Number | k | A | B | c | D | E | F | G |
| --- | --- | --- | --- | --- | --- | --- | --- | --- |
| S2 | −5.79E+00 | 6.64E−02 | 2.84E−01 | 1.64E+00 | 3.29E+00 | 9.73E−01 | −1.09E+01 | 7.78E−02 |
| S3 | 0.00E+00 | −3.90E−03 | −2.56E−02 | −1.13E+00 | 5.94E+00 | −1.12E+01 | −1.09E+01 | 2.08E+01 |
| S10 | 0.00E+00 | −6.91E−02 | 1.14E−01 | 1.07E−01 | −7.53E−02 | 9.14E−01 | 3.43E+00 | −2.36E+01 |
| S11 | 5.41E−01 | −2.08E−02 | 5.98E−01 | 1.71E−02 | −5.75E−02 | 4.91E−02 | 1.56E+00 | −1.82E+00 |
| S4 | −1.04E+01 | −1.77E−01 | 1.16E−01 | 5.89E−01 | −1.02E+00 | −5.46E−01 | 3.28E+00 | −3.03E+00 |
| S5 | 1.86E+01 | 5.89E−03 | −1.91E−02 | 7.89E−02 | −2.72E−02 | −1.01E−02 | 8.18E−02 | −7.71E−02 |
| S6 | −3.46E+01 | −1.59E−01 | 3.25E−01 | −3.64E−01 | 1.40E−01 | 7.32E−02 | −6.72E−02 | −5.54E−02 |
| S7 | −3.62E+01 | −1.57E−02 | 2.05E−01 | −1.19E−01 | 2.85E−02 | 3.82E−03 | −2.05E−03 | −3.51E−04 |
| S8 | 0.00E+00 | −5.45E−01 | 5.11E−01 | −3.44E−01 | 1.45E−01 | −3.52E−03 | −1.86E−00 | 4.38E−03 |
| S9 | −8.36E+00 | 2.09E−02 | 1.66E−01 | −9.74E−02 | 3.70E−02 | −8.09E−03 | 7.65E−04 | 1.22E−05 |

Table 5 shows the parameters of each lens of the lens assembly 60 of FIG. 11. In Table 5, the effective focal length EFL of the lens assembly 60 is about 3.175 mm, the aperture value of the lens assembly 60 is 2.25, the total length TTL of the lens assembly 60 is about 4.327 mm, the view angle of the lens assembly 60 is about 76.7 degrees, the optical effective diameter L1D of the object side surface S2 of the first lens L31 is about 1.436 mm, the thickness L1T of the first lens L31 along the optical axis is about 1.41 mm, the sum of thicknesses of the lenses ALT is about 2.96 mm, the focal length of the first lens L31 is about 2.48 mm, the focal length of the fifth lens L35 is about 17.17 mm, the focal length of the second lens L32 is about −3.07 mm, the focal length of the third lens L33 is about 2.20 mm, the focal length of the fourth lens L34 is about −1.83 mm, the length G1 at which the first lens L31 is protruded is about 1.324 mm, the maximal outer diameter B of the lens major diameter portion is about 5.9 mm, the maximal outer diam- In the fifth embodiment, the cross section of the first lens L31 is in the shape of circle, and the optical effective diameter L1D of the object side surface S2 of the first lens L31 equals the maximal outer diameter A of the first portion of the first lens L31. By calculation, it is obtained that A/B=1.436/5.9=0.2434 satisfying the condition (1), and C/B=2.2/5.9=0.3728 satisfying the condition (6). From Tables 5 and 6, it can be obtained that L1D/L1T=1.436/1.41=1.018, f1/L1T=2.48/1.41=1.76, EFL/L1T=3.175/1.41=2.25, EFL/L1D=3.175/1.436=2.21, L1D+L1T=1.436+1.41=2.846 mm, (EFL+TTL)/L1T=(3.175+4.327)/1.41=5.32, ALT/L1T=2.96/1.41=2.10, G1×f1=1.32×2.48=3.27 mm². It is found that the lens assembly 60 can meet the requirements of the conditions (7)-(14).

Figure 12A:
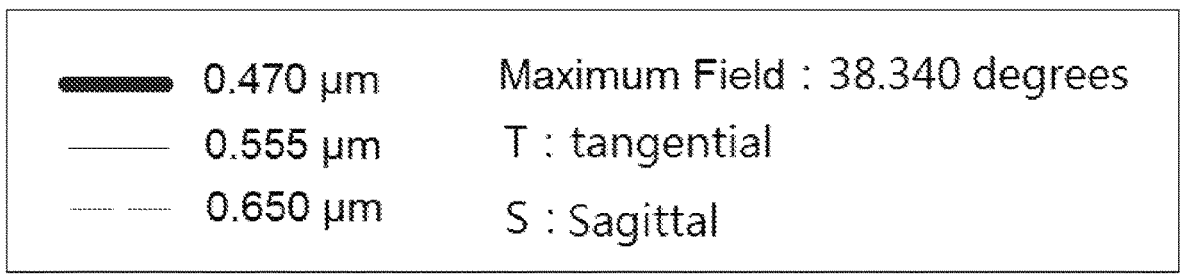
FIG. 12A is a field curvature diagram of the lens assembly of FIG. 11.
Figure 12A:
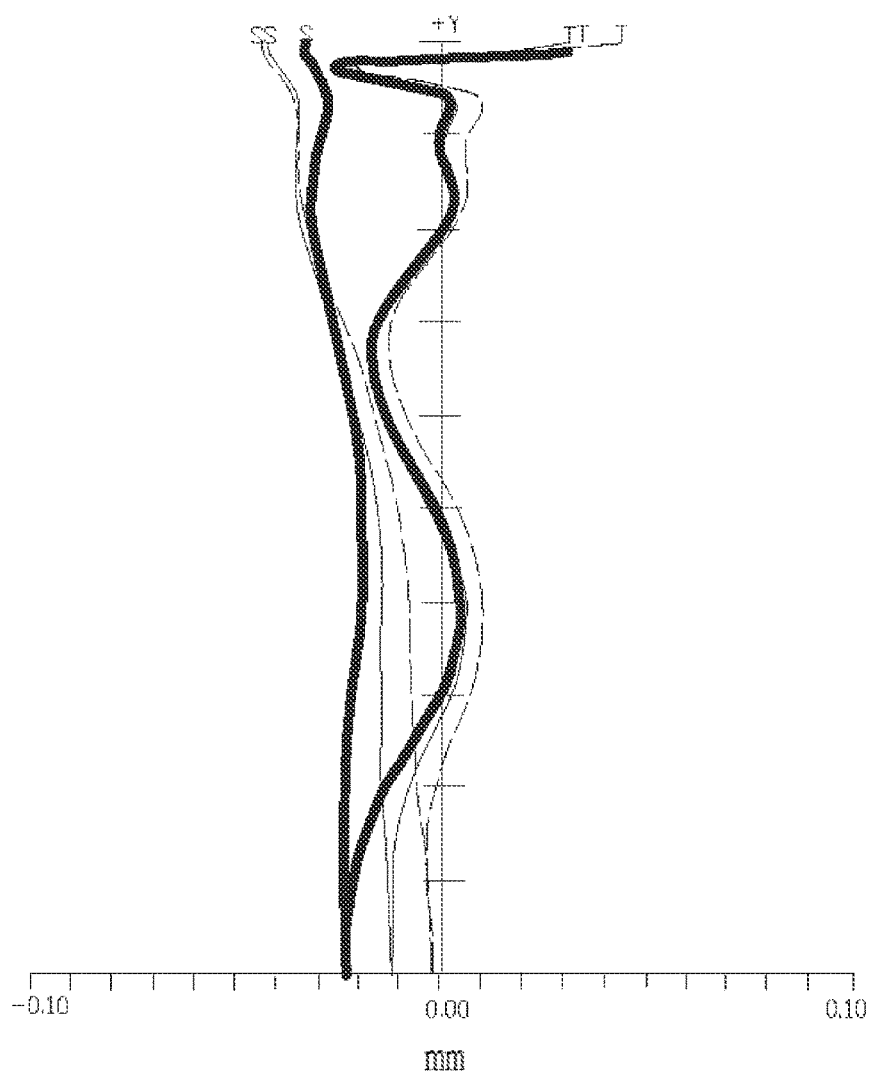
Figure 12B:
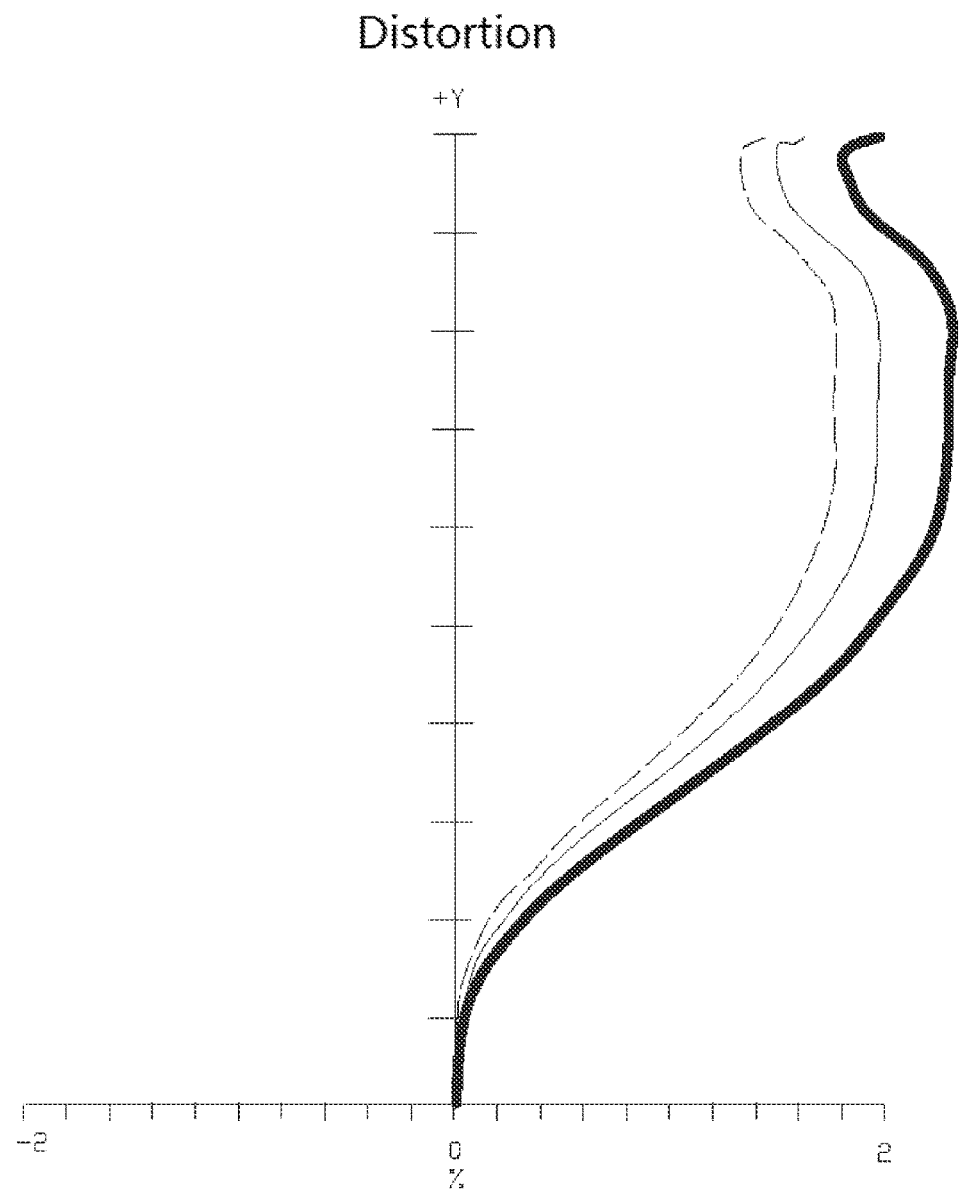
FIG. 12B is a distortion diagram of the lens assembly of FIG. 11.

It can be seen from FIGS. 12A-12B that the lens assembly 60 also meets the requirements of optical performance. FIG. 12A is a field curvature diagram of the lens assembly 60 of FIG. 11. FIG. 12B is a distortion diagram of the lens assembly 60 of FIG. 11. It can be seen from FIG. 12A that the field curvature of the lens assembly 60 ranges from −0.05 mm to 0.05 mm. It can be seen from FIG. 12B that the distortion of the lens assembly 60 ranges from 0% to 2.2%. Moreover, according to the result of experiment, a modulation transfer function of the lens assembly 60 ranges from 0.17 to 1.0. It is obvious that the field curvature and the distortion of the lens assembly 60 can be corrected effectively, and the resolution the lens assembly 60 can meet the requirements. Therefore, the lens assembly 60 is capable of good optical performance.

Figure 13:
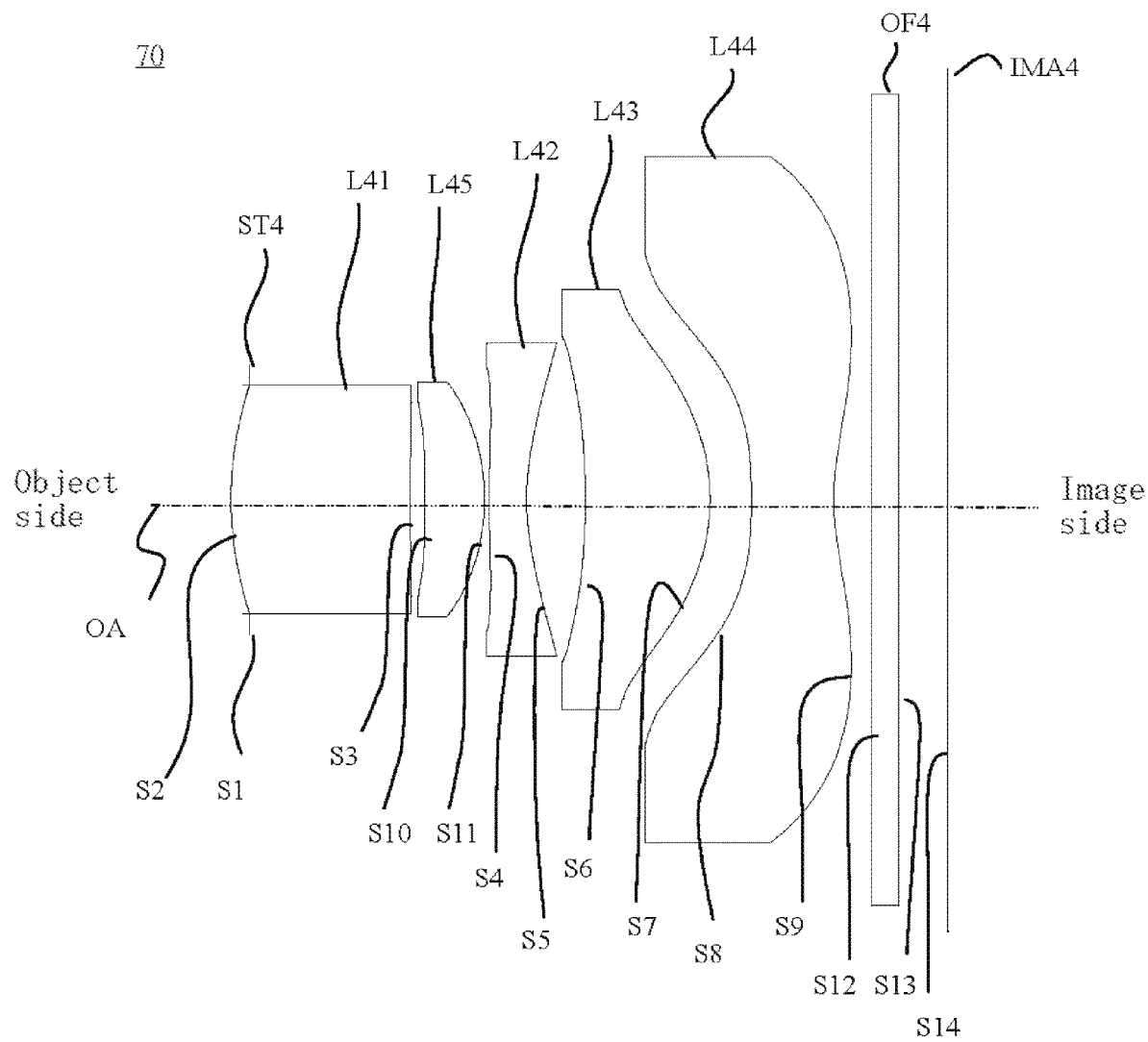
FIG. 13 is a lens layout diagram of a lens assembly in accordance with a sixth embodiment of the invention.

FIG. 13 is a lens layout diagram of a lens assembly in accordance with a sixth embodiment of the invention. As shown in FIG. 13, a lens assembly 70 in order from an object side to an image side along an optical axis OA includes a stop ST4, a first lens L41, a fifth lens L45, a second lens L42, a third lens L43, a fourth lens L44, an optical filter OF4 and a imaging plane IMA4.

The first lens L41 is with positive refractive power. The first lens L41 is a meniscus lens, an object side surface S2 thereof is a convex surface, and an image side surface S3 thereof is a concave surface. The first lens L41 is made of glass.

The fifth lens L45 is with positive refractive power. The fifth lens L45 is a meniscus lens, an object side surface S10 thereof is a concave surface, and an image side surface S11 thereof is a convex surface. The fifth lens L45 is made of plastic.

The second lens L42 is with negative refractive power. The second lens L42 is a meniscus lens, an object side surface S4 thereof is a convex surface, and an image side surface S5 thereof is a concave surface. The second lens L42 is made of plastic.

The third lens L43 is with positive refractive power. The third lens L43 is a meniscus lens, an object side surface S6 thereof is a concave surface, and an image side surface S7 thereof is a convex surface. The third lens L43 is made of plastic.

The fourth lens L44 is with negative refractive power. The fourth lens L44 is a biconcave lens, an object side surface S8 thereof is a concave surface, and an image side surface S9 thereof is a concave surface and has an inflection point. The fourth lens L44 is made of plastic.

An object side surface S12 and an image side surface S13 of the optical filter OF4 are flat surfaces.

It is understood that the cross section of the first lens L41 is not limited to be in the shape of circle. It can be in other shapes, e.g. in shape of non-circle, polygon, polygon with sides arranged symmetrically to the optical axis, bottle, or oak barrel.

At least one of the first lens L41, the fifth lens L45, the second lens L42, the third lens L43 and the fourth lens L44 has an aspherical surface. The definition of the sag value z of the aspherical surface is similar to that of the third embodiment, and therefore the descriptions thereof are omitted.

When the lens assembly 70 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L41 are smaller than 2.2 mm, the length at which the first lens L41 is protruded from the lens minor diameter portion or from the lens barrel is greater than or equals 0.8 mm, and the lens assembly 70 still has good optical performance.

Table 7 shows the parameters of each lens of the lens assembly 70 of FIG. 13. In Table 7, the effective focal length EFL of the lens assembly 70 is about 4.02 mm, the aperture value of the lens assembly 70 is 2.2, the total length TTL of the lens assembly 70 is about 5.6 mm, the view angle of the lens assembly 70 is about 76.3 degrees, the optical effective diameter L1D of the object side surface S2 of the first lens L41 is about 1.83 mm, the thickness L1T of the first lens L41 along the optical axis is about 1.4 mm, the thickness L5T of the fifth lens L45 along the optical axis is about 0.465 mm, the thickness L2T of the second lens L42 along the optical axis is about 0.291 mm, the sum of thicknesses of the lenses ALT is about 3.767 mm, the focal length of the first lens L41 is about 5.59 mm, the focal length of the fifth lens L45 is about 3.53 mm, the focal length of the second lens L42 is about −4.33 mm, the focal length of the third lens L43 is about 3.08 mm, the focal length of the fourth lens L44 is about −2.02 mm, the length G1 at which the first lens L41 is protruded is about 1.41 mm, the maximal outer diameter B of the lens major diameter portion is about 6.6 mm, the maximal outer diameter C of the minor diameter portion 211b of the lens barrel 211 is about 2.0 mm, and the thickness of the wall of the cover 212 is 0.09 mm.

TABLE 7

| Surface Number | Radius of Curvature (mm) | Distance (mm) | Nd | Vd | Remark |
|---|---|---|---|---|---|
| S0 | ∞ | 500 | | | The object side |
| S1 | ∞ | −0.144 | | | The stop |
| S2 | 2.774 | 1.400 | 1.60 | 66.9 | The first lens |
| S3 | 12.987 | 0.116 | | | |
| S10 | −21.463 | 0.465 | 1.54 | 56.1 | The fifth lens |
| S11 | −1.764 | 0.035 | | | |
| S4 | 5.409 | 0.291 | 1.67 | 19.2 | The second lens |
| S5 | 1.847 | 0.463 | | | |
| S6 | −6.622 | 0.972 | 1.67 | 19.2 | The third lens |
| S7 | −1.666 | 0.322 | | | |
| S8 | −5.504 | 0.639 | 1.67 | 19.2 | The fourth lens |
| S9 | 1.877 | 0.300 | | | |
| S12 | | 0.210 | 1.516 | 64.198 | The optical filter |
| S13 | | 0.386 | | | |
| S14 | | 0.000 | | | The imaging plane |

Table 8 shows that the optical specifications of the aspheric surface of each lens in the lens assembly 70 shown in FIG. 13, wherein k is a conic constant, and A-G are aspheric coefficients.

TABLE 8

| Surface Number | k | A | B | C | D | E | F | G |
|---|---|---|---|---|---|---|---|---|
| S2 | 1.47E+00 | −1.59E−02 | −9.81E−02 | 3.86E−01 | −9.05E−01 | 1.16E+00 | −7.77E−01 | 2.10E−01 |
| S3 | −2.13E+01 | −1.83E−03 | −1.05E−01 | 9.49E−02 | 3.11E−01 | −8.29E−01 | 1.16E+00 | −5.28E−01 |
| S10 | 0.00E+00 | −6.03E−02 | −3.67E−01 | 1.01E+00 | −2.15E+00 | 3.44E+00 | −2.73E+00 | 8.58E−01 |
| S11 | 4.49E+00 | −1.10E−02 | 4.19E−03 | 2.20E−01 | −8.64E−01 | 1.52E+00 | −1.22E+00 | 3.24E−01 |
| S4 | 0.00E+00 | −2.86E−01 | 6.62E−01 | −1.41E+00 | 2.27E+00 | −2.31E+00 | 1.27E+00 | −2.95E−01 |
| S5 | −1.50E+05 | 1.18E−03 | −3.20E−02 | 6.68E−02 | −3.47E−02 | −1.91E−02 | 2.15E−02 | −5.10E−03 |

TABLE 8-continued

| Surface Number | k | A | B | C | D | E | F | G |
|---|---|---|---|---|---|---|---|---|
| S6 | 0.00E+00 | −3.64E−02 | 4.96E−02 | −1.17E−01 | 1.82E−01 | −1.54E−01 | 6.84E−02 | −1.29E−02 |
| S7 | −1.45E+01 | −2.17E−03 | 5.86E−02 | −6.63E−02 | 4.37E−02 | −1.59E−02 | 3.56E−03 | −3.91E−04 |
| S8 | −2.99E+01 | −2.23E−01 | 1.51E−01 | −6.16E−02 | 9.54E−03 | 2.90E−03 | −1.22E−03 | 1.20E−04 |
| S9 | −1.72E+01 | −8.82E−03 | 4.23E−02 | −1.36E−02 | 2.67E−03 | −3.15E−04 | 2.08E−05 | −5.98E−07 |

In the sixth embodiment, the cross section of the first lens L41 is in the shape of circle, and the optical effective diameter L1D of the object side surface S2 of the first lens L41 equals the maximal outer diameter A of the first portion of the first lens L41. By calculation, it is obtained that A/B=1.83/6.6=0.2772 satisfying the condition (1), and C/B=2.2/6.6=0.3030 satisfying the condition (6). From Tables 7 and 8, it is obtained that L1D/L1T=1.83/1.4=1.307, f1/L1T=5.59/1.4=3.99, EFL/L1T=4.02/1.4=2.87, EFL/L1D=4.02/1.83=2.20, L1D+L1T=1.83+1.4=3.23 mm, (EFL+TTL)/L1T=(4.02+5.6)/1.4=6.87, ALT/L1T=3.767/1.4=2.69, G1×f1=1.4×5.59=7.88 mm², L1T−L5T−L2T=1.4−0.465−0.921=0.644 mm. It is found that the lens assembly 70 can meet the requirements of the conditions (7)-(15).

Figure 14A:
FIG. 14A is a field curvature diagram of the lens assembly of FIG. 13.
Figure 14B:
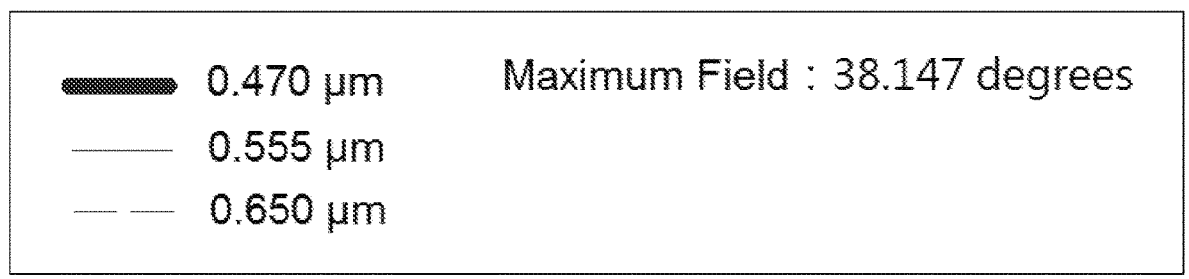
FIG. 14B is a distortion diagram of the lens assembly of FIG. 13.
Figure 14B:
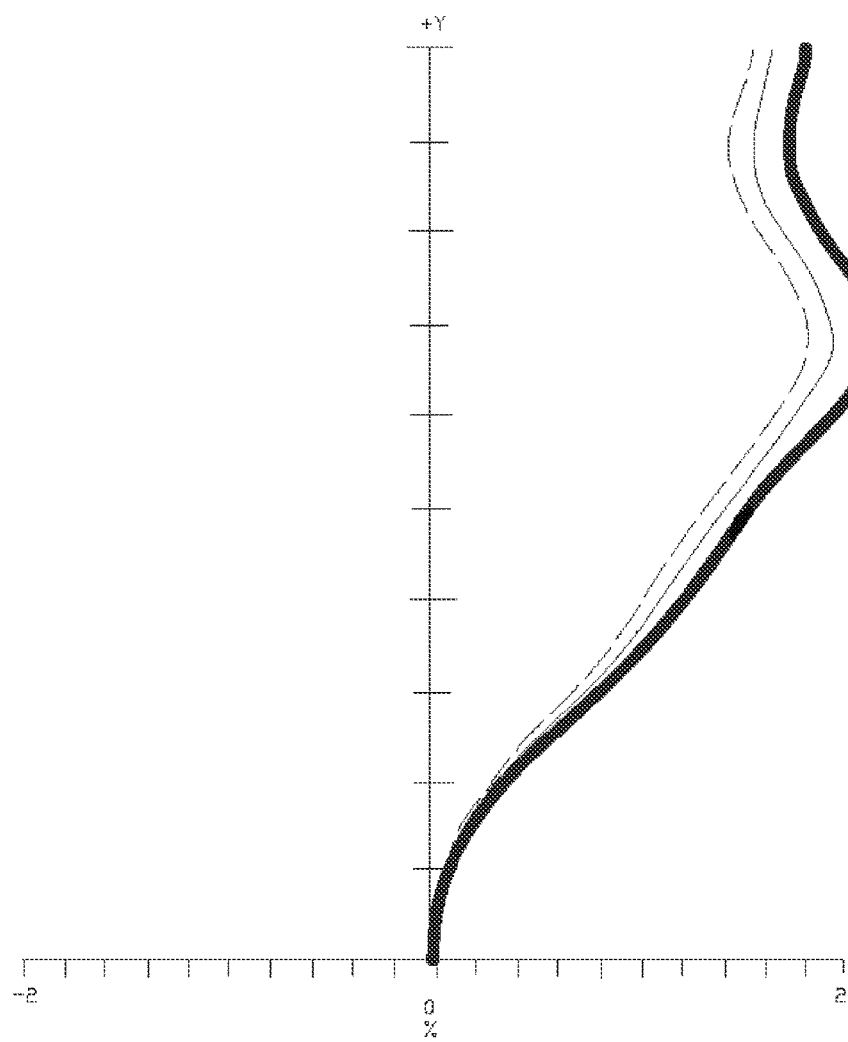

It can be seen from FIGS. 14A-14B that the lens assembly 70 also meets the requirements of optical performance. FIG. 14A is a field curvature diagram of the lens assembly 70 of FIG. 13. FIG. 14B is a distortion diagram of the lens assembly 70 of FIG. 13. It can be seen from FIG. 14A that the field curvature of the lens assembly 70 ranges from −0.03 mm to 0.07 mm. It can be seen from FIG. 14B that the distortion of the lens assembly 70 ranges from 0% to 2.1%. Moreover, according to the result of experiment, a modulation transfer function of the lens assembly 70 ranges from 0.29 to 1.0. It is obvious that the field curvature and the distortion of the lens assembly 70 can be corrected effectively, and the resolution the lens assembly 70 can meet the requirements. Therefore, the lens assembly 70 is capable of good optical performance.

Figure 15:
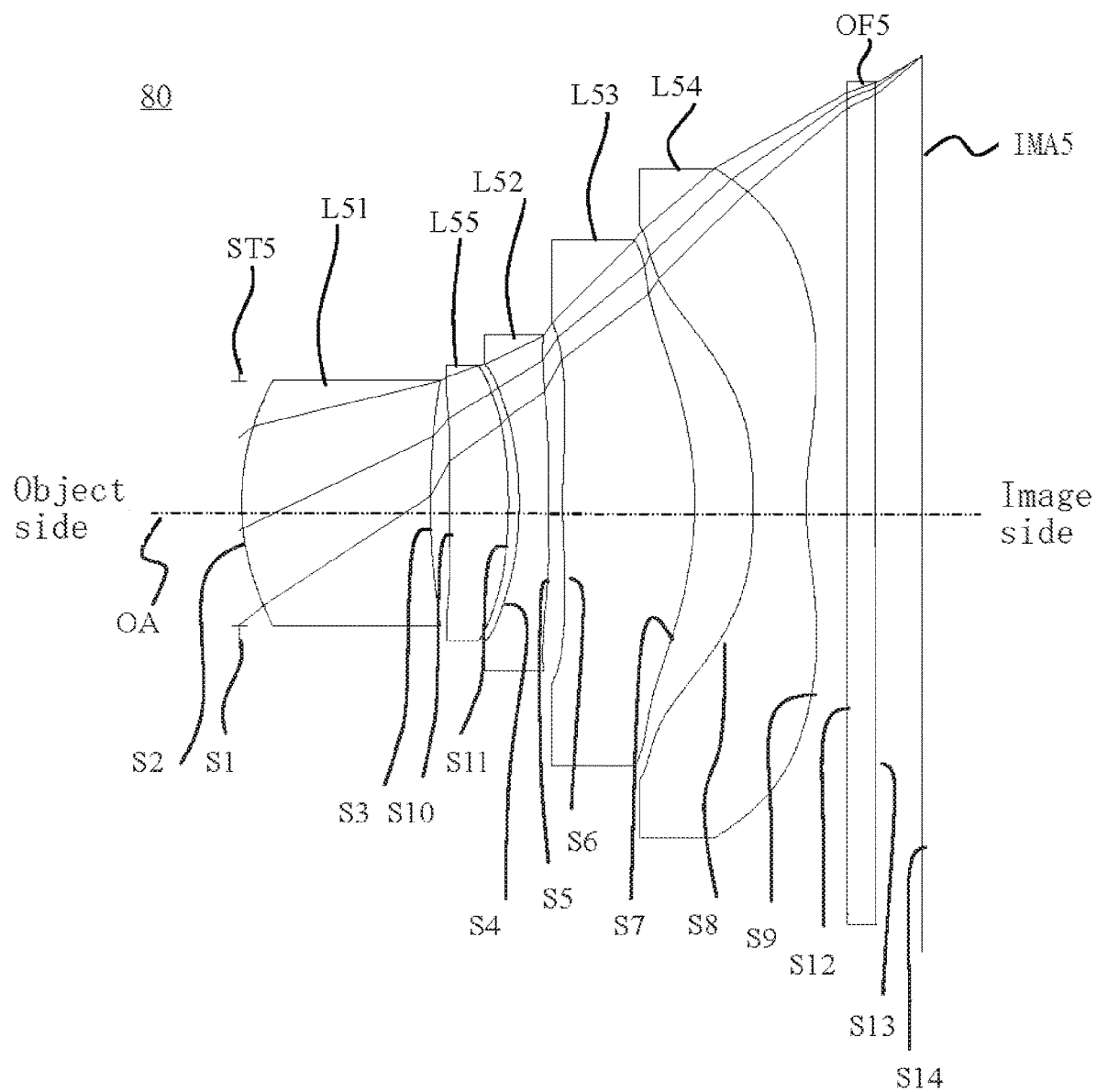
FIG. 15 is a lens layout diagram of a lens assembly in accordance with a seventh embodiment of the invention.

FIG. 15 is a lens layout diagram of a lens assembly in accordance with a seventh embodiment of the invention. As shown in FIG. 15, a lens assembly 80 in order from an object side to an image side along an optical axis OA includes a stop ST5, a first lens L51, a fifth lens L55, a second lens L52, a third lens L53, a fourth lens L54, an optical filter OF5 and a imaging plane IMA5.

The first lens L51 is with positive refractive power. The first lens L51 is a meniscus lens, an object side surface S2 thereof is a convex surface, and an image side surface S3 thereof is a concave surface. The first lens L51 is made of glass.

The fifth lens L55 is with positive refractive power. The fifth lens L55 is a meniscus lens, an object side surface S10 thereof is a concave surface, and an image side surface S11 thereof is a convex surface. The fifth lens L55 is made of plastic.

The second lens L52 is with negative refractive power. The second lens L52 is a biconcave lens, an object side surface S4 thereof is a concave surface, and an image side surface S5 thereof is a concave surface. The second lens L52 is made of plastic.

The third lens L53 is with positive refractive power. The third lens L53 is a biconvex lens, an object side surface S6 thereof is a convex surface, and an image side surface S7 thereof is a convex surface. The third lens L53 is made of plastic.

The fourth lens L54 is with negative refractive power. The fourth lens L54 is a biconcave lens, an object side surface S8 thereof is a concave surface, and an image side surface S9 thereof is a concave surface and has an inflection point. The fourth lens L54 is made of plastic.

An object side surface S12 and an image side surface S13 of the optical filter OF5 are flat surfaces.

It is understood that the cross section of the first lens L51 is not limited to be in the shape of circle. It can be in other shapes, e.g. in shape of non-circle, polygon, polygon with sides arranged symmetrically to the optical axis, bottle, or oak barrel.

At least one of the first lens L51, the fifth lens L55, the second lens L52, the third lens L53 and the fourth lens L54 has an aspherical surface. The definition of the sag value z of the aspherical surface is similar to that of the third embodiment, and therefore the descriptions thereof are omitted.

When the lens assembly 80 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L51 are smaller than 2.2 mm, the length at which the first lens L51 is protruded from the lens minor diameter portion or from the lens barrel is greater than or equals 0.8 mm, and the lens assembly 80 still has good optical performance.

Table 9 shows the parameters of each lens of the lens assembly 80 of FIG. 15. In Table 9, the effective focal length EFL of the lens assembly 80 is about 3.983 mm, the aperture value of the lens assembly 80 is 2.25, the total length TTL of the lens assembly 80 is about 5 mm, the view angle of the lens assembly 80 is about 77 degrees, the optical effective diameter L1D of the object side surface S2 of the first lens L51 is about 1.784 mm, the thickness L1T of the first lens L51 along the optical axis is about 1.385 mm, the thickness L5T of the fifth lens L45 along the optical axis is about 0.427 mm, the thickness L2T of the second lens L42 along the optical axis is about 0.22 mm, the sum of thicknesses of the lenses ALT is about 3.388 mm, the focal length of the first lens L51 is about 4.01 mm, the focal length of the fifth lens L55 is about 6.71 mm, the focal length of the second lens L52 is about −3.64 mm, the focal length of the third lens L53 is about 2.69 mm, the focal length of the fourth lens L54 is about −2.06 mm, the length G1 at which the first lens L51 is protruded is about 1.48 mm, the maximal outer diameter B of the lens major diameter portion is about 6.6 mm, the maximal outer diameter C of the minor diameter portion 211b of the lens barrel 211 is about 2.0 mm, and the thickness of the wall of the cover 212 is 0.1 mm.

TABLE 9

| Surface Number | Radius of Curvature (mm) | Distance (mm) | Nd | Vd | Remark |
|---|---|---|---|---|---|
| S0 | — | 500 | | | The object side |
| S1 | ∞ | 0.015 | | | The stop |
| S2 | 1.820 | 1.385 | 1.60 | 66.9 | The first lens |

TABLE 9-continued

| Surface Number | Radius of Curvature (mm) | Distance (mm) | Nd | Vd | Remark |
|---|---|---|---|---|---|
| S3 | 5.359 | 0.144 | | | |
| S10 | −75.134 | 0.427 | 1.53 | 55.8 | The fifth lens |
| S11 | −3.403 | 0.078 | | | |
| S4 | −2.553 | 0.220 | 1.67 | 19.2 | The second lens |
| S5 | 58.990 | 0.103 | | | |
| S6 | 5.724 | 0.967 | 1.67 | 19.2 | The third lens |
| S7 | −2.456 | 0.429 | | | |
| S8 | −3.734 | 0.389 | 1.67 | 19.2 | The fourth lens |
| S9 | 2.283 | 0.300 | | | |
| S12 | ∞ | 0.210 | 1.516 | 64.198 | The optical filter |
| S13 | ∞ | 0.338 | | | |
| S14 | ∞ | 0.000 | | | The imaging plane |

Table 10 shows that the optical specifications of the aspheric surface of each lens of the lens assembly 80 of FIG. 15, wherein k is a conic constant, and A-G are aspheric coefficients.

TABLE 10

| Surface Number | k | A | B | C | D | E | F | G |
|---|---|---|---|---|---|---|---|---|
| S2 | 1.47E+00 | −3.72E−02 | −8.60E−03 | 9.02E−02 | −5.72E−01 | 1.25E+00 | −1.21E+00 | 1.18E−01 |
| S3 | −2.13E+01 | 1.73E−03 | −2.30E−02 | −6.23E−02 | 3.39E−01 | −6.07E−01 | 4.66E−01 | 1.44E−01 |
| S10 | 0.00E+00 | −2.92E−02 | −1.95E−01 | 7.56E−01 | −2.06E+00 | 3.34E+00 | −2.57E+00 | 6.41E−01 |
| S11 | 4.49E+00 | −7.49E−04 | −1.31E−01 | 2.23E−01 | −7.66E−01 | 1.56E+00 | −1.17E+00 | 2.58E−01 |
| S4 | 0.00E+00 | −6.40E−02 | 2.98E−01 | −1.17E+00 | 2.36E+00 | −2.41E+00 | 1.23E+00 | −3.18E−01 |
| S5 | −1.50E+05 | −1.40E−02 | 9.77E−02 | 3.21E−02 | −2.55E−02 | −2.41E−02 | 1.74E−02 | −1.24E−03 |
| S6 | 0.00E+00 | −1.39E−01 | 9.20E−02 | −1.21E−01 | 1.74E−01 | −1.47E−01 | 6.28E−02 | −1.10E−02 |
| S7 | −1.45E+01 | −4.84E−03 | 4.17E−02 | −5.25E−02 | 4.26E−02 | −1.71E−02 | 3.54E−03 | −3.49E−04 |
| S8 | −2.99E+01 | −2.45E−01 | 1.31E−01 | −4.77E−02 | 9.01 E−03 | 2.31E−03 | −1.31E−03 | 1.55E−04 |
| S9 | −1.72E+01 | −1.04E−02 | 4.73E−02 | −1.48E−02 | 2.86E−03 | −3.39E−04 | 2.45E−05 | −7.82E−07 |

Figure 16A:
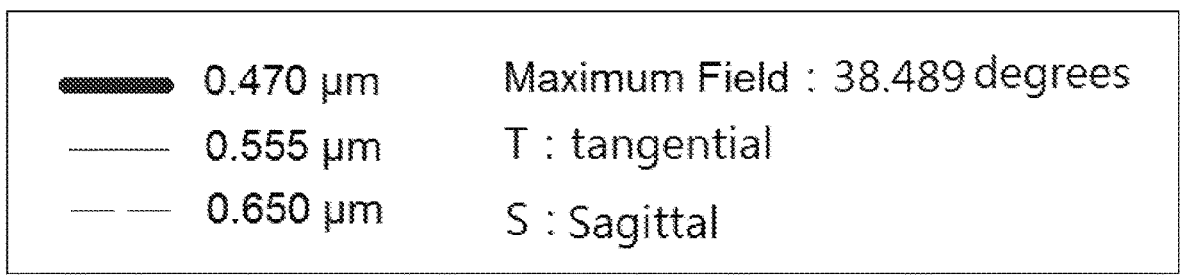
FIG. 16A is a field curvature diagram of the lens assembly of FIG. 15.
Figure 16A:
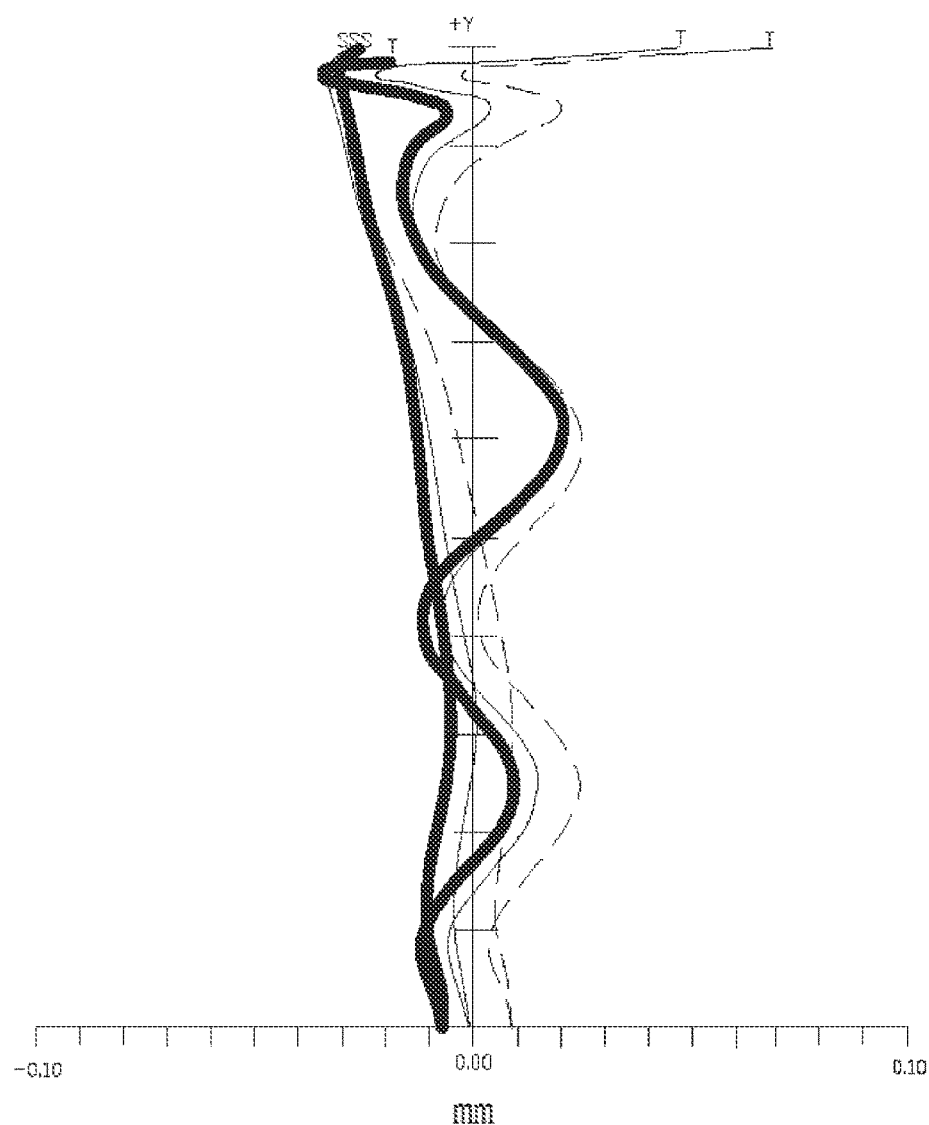
Figure 16B:
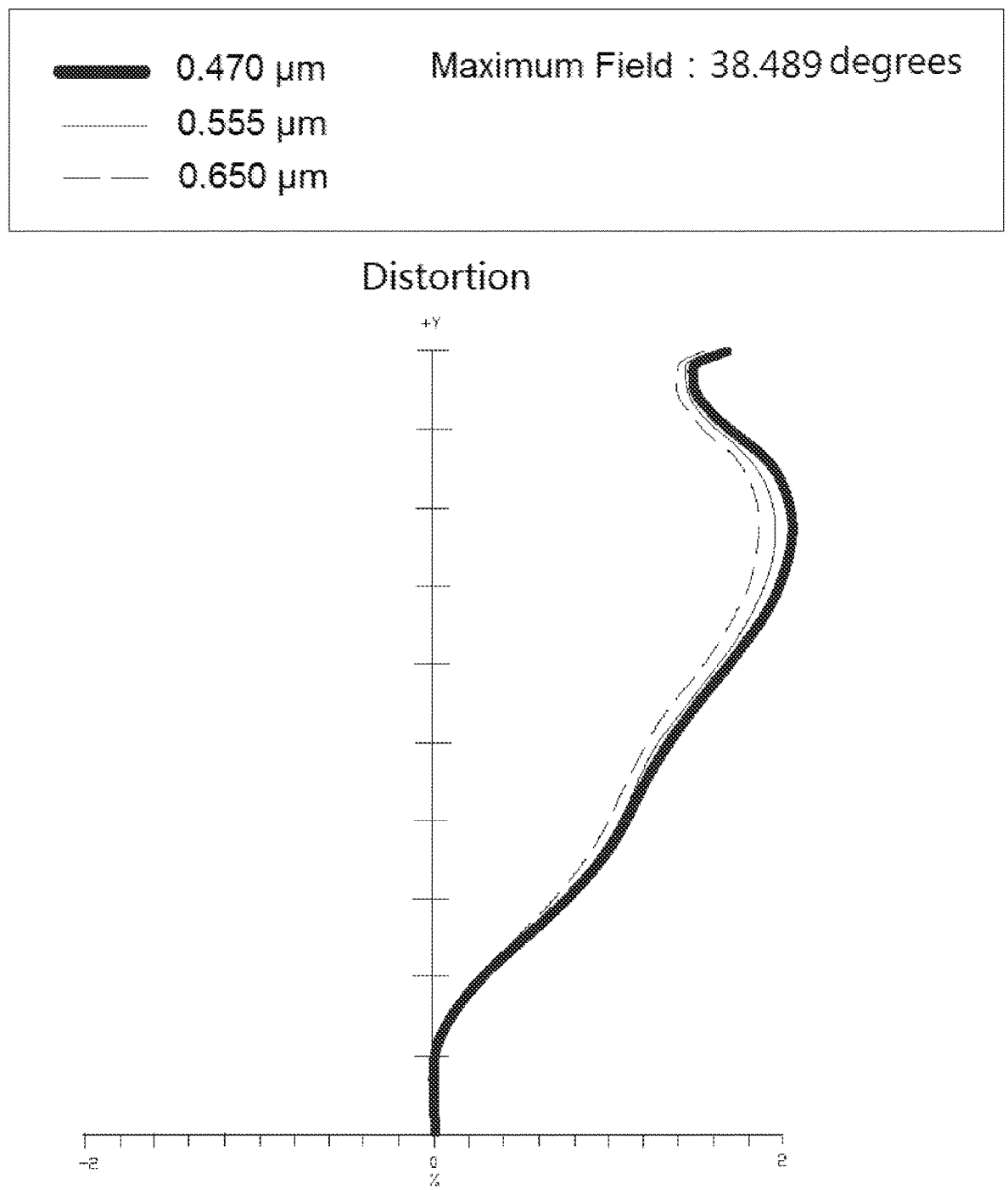
FIG. 16B is a distortion diagram of the lens assembly of FIG. 15.

In the seventh embodiment, the cross section of the first lens L51 is in the shape of circle, and the optical effective diameter L1D of the object side surface S2 of the first lens L51 equals the maximal outer diameter A of the first portion of the first lens L51. By calculation, it is obtained that A/B=1.784/6.6=0.2703 satisfying the condition (1), and C/B=2.0/6.6=0.3030 satisfying the condition (6). From Tables 9 and 10, it can be obtained that L1D/L1T=1.784/1.385=1.288, f1/L1T=4.01/1.385=2.90, EFL/L1T=3.983/1.385=2.88, EFL/L1D=3.983/1.784=2.23, L1D+L1T=1.784+1.385=3.169 mm. (EFL+TTL)/L1T=(3.983+5)/1.385=6.49, ALT/L1T=3.388/1.385=2.45, G1×f1=1.48× 4.01=5.93 mm², L1T−L5T−L2T=1.385−0.427−0.22=0.738 mm. It is found that the lens assembly 80 can meet the requirements of the conditions (7)-(15). It can be seen from FIGS. 16A-16B that the lens assembly 80 also meets the requirements of optical performance. FIG. 16A is a field curvature diagram of the lens assembly 80 of FIG. 15. FIG. 16B is a distortion diagram of the lens assembly 80 of FIG. 15. It can be seen from FIG. 16A that the field curvature of the lens assembly 80 ranges from −0.04 mm to 0.07 mm. It can be seen from FIG. 16B that the distortion of the lens assembly 80 ranges from 0% to 2.1%. Moreover, according to the result of experiment, a modulation transfer function of the lens assembly 80 ranges from 0.18 to 1.0. It is obvious that the field curvature and the distortion of the lens assembly 80 can be corrected effectively, and the resolution of the lens assembly 80 can meet the requirements. Therefore, the lens assembly 80 is capable of good optical performance.

Comparing to the prior art, the lens assembly of the invention is provided with characteristics of a decreased thickness and an increased view angle, and still has a good optical performance.

Figure 17:
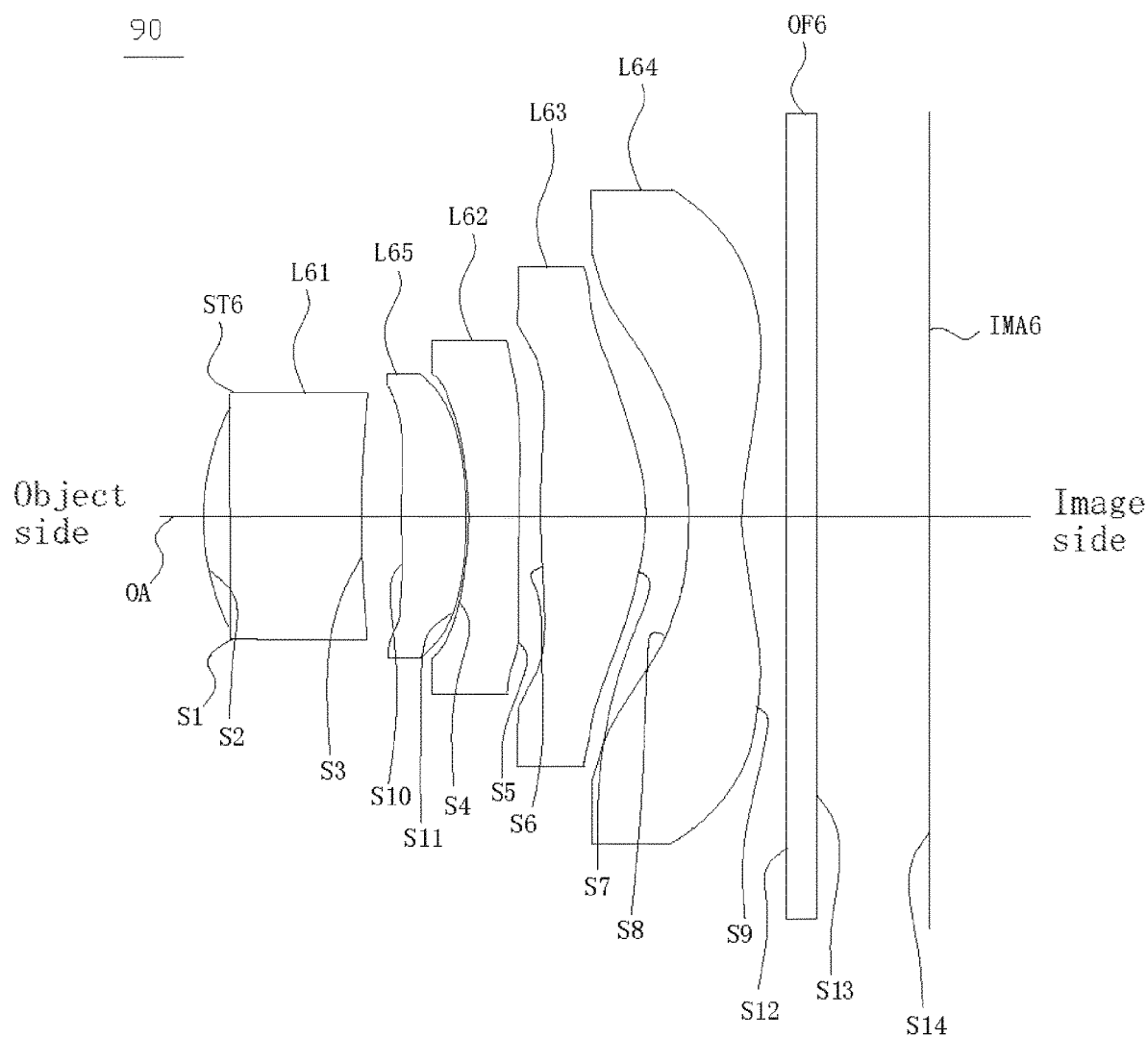
FIG. 17 is a lens layout diagram of a lens assembly in accordance with an eighth embodiment of the invention.

FIG. 17 is a lens layout diagram of a lens assembly in accordance with an eighth embodiment of the invention. As shown in FIG. 17, a lens assembly 90 in order from an object side to an image side along an optical axis OA includes a stop ST6, a first lens L61, a fifth lens L65, a second lens L62, a third lens L63, a fourth lens L64, an optical filter OF6 and a imaging plane IMA6.

The first lens L61 is with positive refractive power. The first lens L61 is a meniscus lens, an object side surface S2 thereof is a convex surface, and an image side surface S3 thereof is a concave surface. The first lens L61 is made of glass.

The fifth lens L65 is with positive refractive power. The fifth lens L65 is a biconvex lens, an object side surface S10 thereof is a convex surface, and an image side surface S11 thereof is a convex surface. The fifth lens L65 is made of plastic.

The second lens L62 is with negative refractive power. The second lens L62 is a biconcave lens, an object side surface S4 thereof is a concave surface, and an image side surface S5 thereof is a concave surface. The second lens L62 is made of plastic.

The third lens L63 is with positive refractive power. The third lens L63 is a biconvex lens, an object side surface S6 thereof is a convex surface, and an image side surface S7 thereof is a convex surface. The third lens L63 is made of plastic.

The fourth lens L64 is with negative refractive power. The fourth lens L64 is a biconcave lens, an object side surface S8 thereof is a concave surface, and an image side surface S9 thereof is a concave surface and has an inflection point. The fourth lens L64 is made of plastic.

An object side surface S12 and an image side surface S13 of the optical filter OF6 are flat surfaces.

It is understood that the cross section of the first lens L61 is not limited to be in the shape of circle. It can be in other shapes, e.g. in shape of non-circle, polygon, polygon with sides arranged symmetrically to the optical axis, bottle, or oak barrel.

At least one of the first lens L61, the fifth lens L65, the second lens L62, the third lens L63 and the fourth lens L64 has an aspherical surface. The definition of the sag value z of the aspherical surface is similar to that of the third embodiment, and therefore the descriptions thereof are omitted.

When the lens assembly 90 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L61 are smaller than 2.2 mm, the length at which the first lens L61 is protruded from the lens minor diameter portion or from the lens barrel is greater than or equals 0.8 mm, and the lens assembly 90 still has good optical performance.

Table 11 shows the parameters of each lens of the lens assembly 90 of FIG. 17. In Table 11, the effective focal length EFL of the lens assembly 90 is about 3.45 mm, the aperture value of the lens assembly 90 is 2.25, the total length TTL of the lens assembly 90 is about 4.546 mm, the view angle of the lens assembly 90 is about 78 degrees, the optical effective diameter L1D of the object side surface S2 of the first lens L61 is about 1.55 mm, the thickness L1T of the first lens L61 along the optical axis is about 1.065 mm, the thickness L5T of the fifth lens L65 along the optical axis is about 0.428 mm, the thickness L2T of the second lens L62 along the optical axis is about 0.338 mm, the sum of thicknesses of the lenses ALT is about 2.90 mm, the focal length of the first lens L61 is about 4.09 mm, the focal length of the fifth lens L65 is about 4.48 mm, the focal length of the second lens L62 is about −2.77 mm, the focal length of the third lens L63 is about 1.83 mm, the focal length of the fourth lens L64 is about −1.66 mm, the length G1 at which the first lens L61 is protruded is about 1.105 mm, and the maximal outer diameter B of the lens major diameter portion is about 5.9 mm.

TABLE 11

| Surface Number | Radius of Curvature (mm) | Distance (mm) | Nd | Vd | Remark |
|---|---|---|---|---|---|
| S0 | — | 500 | | | The object side |
| S1 | ∞ | −0.175627 | | | The stop |
| S2 | 1.764407 | 1.065253 | 1.5904 | 66.9 | The first lens |
| S3 | 5.028407 | 0.272688 | | | |
| S10 | 9.522752 | 0.427766 | 1.5315 | 55.8 | The fifth lens |
| S11 | −3.13579 | 0.021414 | | | |
| S4 | −2.364 | 0.338239 | 1.6713 | 19.2 | The second lens |
| S5 | 9.578715 | 0.143325 | | | |
| S6 | 4.23 | 0.708138 | 1.6447 | 22.5 | Tire third lens |
| S7 | −1.54438 | 0.292012 | | | |
| S8 | −2.71561 | 0.362251 | 1.6150 | 25.9 | The fourth lens |
| S9 | 1.733555 | 0.3 | | | |
| S12 | ∞ | 0.21 | 1.5168 | 64.2 | The optical filter |
| S13 | ∞ | 0.40563 | | | |
| S14 | ∞ | 0 | | | The imaging plane |

Table 12 shows that the optical specifications of the aspheric surface of each lens of the lens assembly 90 of FIG. 17, wherein k is a conic constant, and A-G are aspheric coefficients.

TABLE 12

| Surface Number | k | A | B | C | D | E | F | G |
|---|---|---|---|---|---|---|---|---|
| S2 | 0.964716 | −0.041117648 | 0.029079164 | 0.035976542 | −0.541510195 | 1.279243875 | −1.264761651 | 0.139850643 |
| S3 | −55.226 | 0.005109967 | −0.031419818 | −0.084067093 | 0.238663385 | −0.51912314 | 0.565443582 | −0.015631141 |
| S10 | 0 | −0.134949369 | −0.227472697 | 0.708664253 | −2.105689975 | 3.316757271 | −2.557306264 | 0.57262316 |
| S11 | 6.769274 | 0.033552519 | −0.23966185 | 0.216312122 | −0.703045423 | 1.524083758 | −1.243314812 | 0.210386852 |
| S4 | 0 | 0.01820815 | 0.299360287 | −1.264239696 | 2.34337216 | −2.369330703 | 1.236610162 | −0.366374771 |
| S5 | −616.226 | −0.113484508 | 0.075685837 | −0.007669224 | −0.029349706 | −0.007908454 | 0.021866447 | −0.005118289 |
| S6 | 0 | −0.146197667 | 0.072895912 | −0.131536813 | 0.173120575 | −0.144937437 | 0.060441229 | −0.010591004 |
| S7 | −8.40102 | −0.037125671 | 0.046733978 | −0.05478831 | 0.043111392 | −0.017163239 | 0.003513871 | −0.000347659 |
| S8 | −18.3345 | −0.200721948 | 0.115782646 | −0.044023393 | 0.008915045 | 0.00216852 | −0.001324889 | 0.000158646 |
| S9 | −14.2865 | −0.088189723 | 0.040872542 | −0.014493191 | 0.002992714 | −0.000382481 | 2.87333E−05 | −3.818E−07 |

Figure 18A:
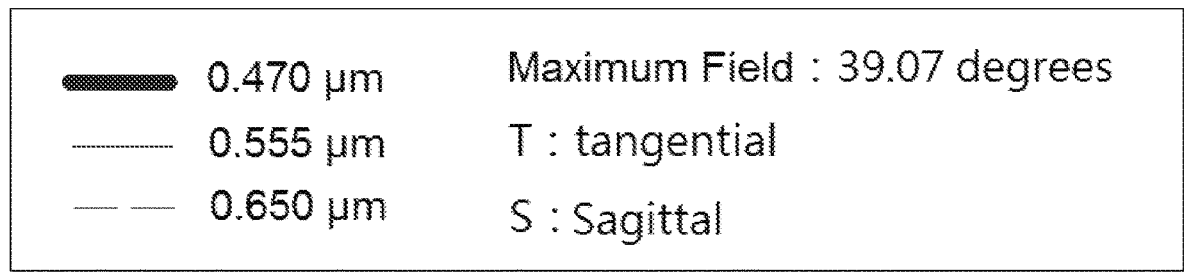
FIG. 18A is a field curvature diagram of the lens assembly of FIG. 17.
Figure 18A:
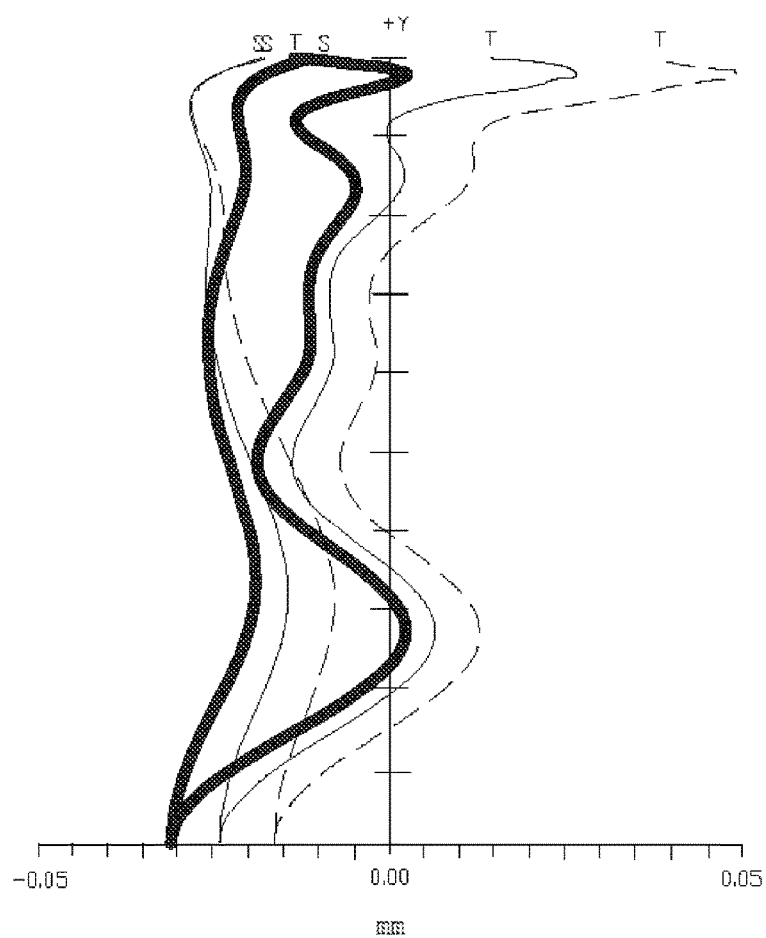
Figure 18B:
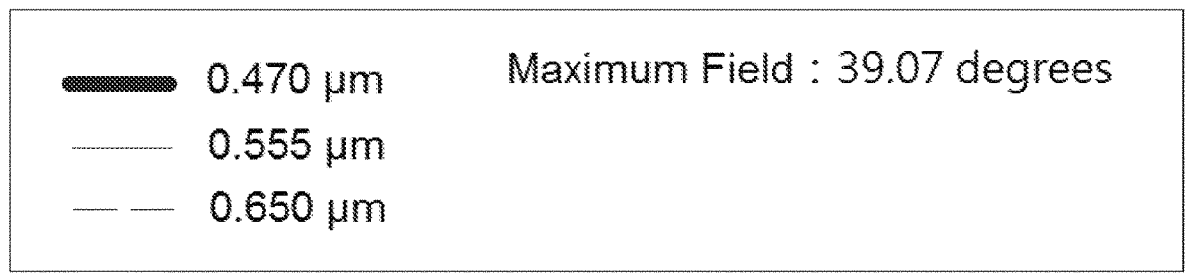
FIG. 18B is a distortion diagram of the lens assembly of FIG. 17.
Figure 18B:
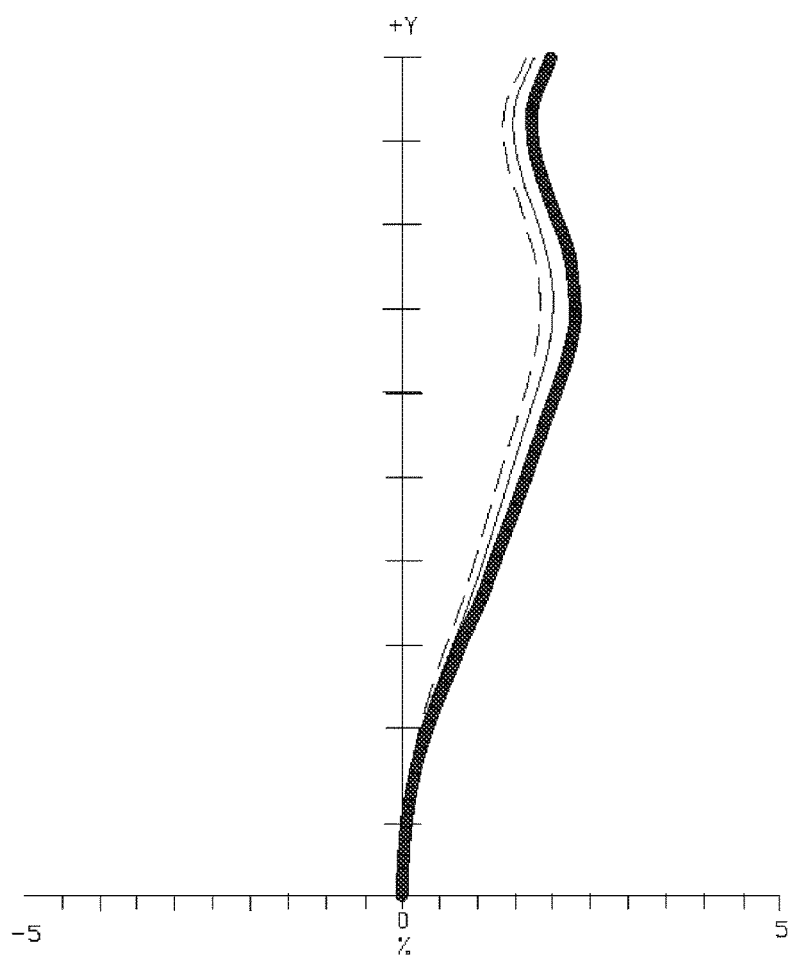

In the eighth embodiment, the cross section of the first lens L61 is in the shape of circle, and the optical effective diameter L1D of the object side surface S2 of the first lens L61 equals the maximal outer diameter A of the first portion of the first lens L61. By calculation, A/B=1.55/5.9=0.2627 satisfying the condition (1). From Tables 11 and 12, it can be obtained that L1D/L1T=1.55/1.065=1.46, f1/L1T=4.09/1.065=3.84, EFL/L1T=3.45/1.065=3.24, EFL/L1D=3.45/1.55=2.23, L1D+L1T=1.55+1.065=2.615 mm, (EFL+TTL)/L1T=(3.45+4.546)/1.065=7.51, ALT/L1T=2.90/1.065=2.72, G1×f1=1.105×4.09=4.52 mm², L1T−L5T−L2T=1.065−0.428−0.338=0.299 mm. It is found that the lens assembly 90 can meet the requirements of the conditions (7)-(15). It can be seen from FIGS. 18A-18B that the lens assembly 90 also meets the requirements of optical performance. FIG. 18A is a field curvature diagram of the lens assembly 90 of FIG. 17. FIG. 18B is a distortion diagram of the lens assembly 90 of FIG. 17. It can be seen from FIG. 18A that the field curvature of the lens assembly 90 ranges from −0.035 mm to 0.05 mm. It can be seen from FIG. 18B that the distortion of the lens assembly 90 ranges from 0% to 2.2%. Moreover, according to the result of experiment, a modulation transfer function of the lens assembly 90 ranges from 0.4 to 1.0. It is obvious that the field curvature and the distortion of the lens assembly 90 can be corrected effectively, and the resolution the lens assembly 90 can meet the requirements. Therefore, the lens assembly 90 is capable of good optical performance.

Figure 19:
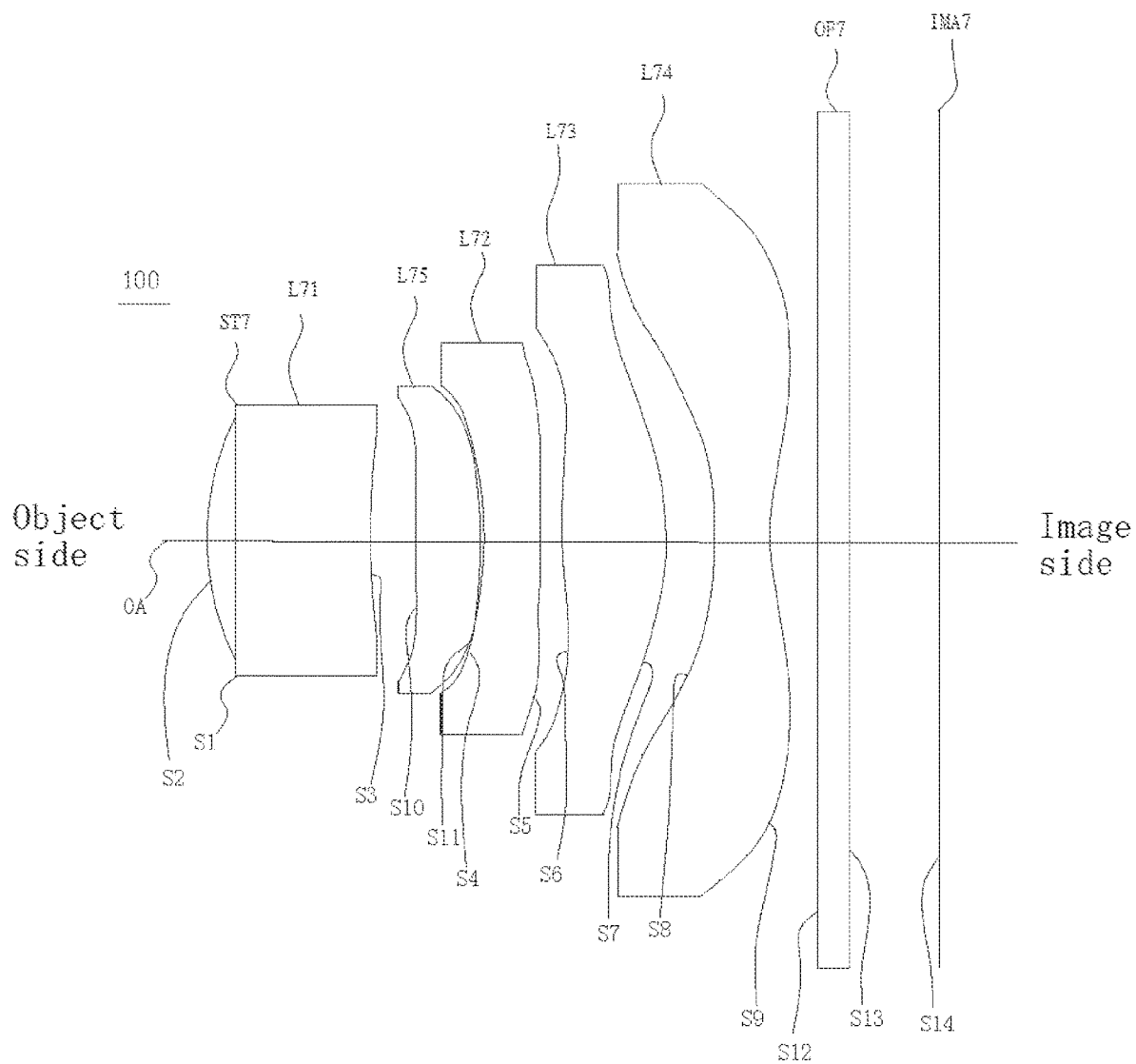
FIG. 19 is a lens layout diagram of a lens assembly in accordance with a ninth embodiment of the invention.

FIG. 19 is a lens layout diagram of a lens assembly in accordance with a ninth embodiment of the invention. As shown in FIG. 19, a lens assembly 100 in order from an object side to an image side along an optical axis OA includes a stop ST7, a first lens L71, a fifth lens L75, a second lens L72, a third lens L73, a fourth lens L74, an optical filter OF7 and a imaging plane IMA7.

The first lens L71 is with positive refractive power. The first lens L71 is a meniscus lens, an object side surface S2 thereof is a convex surface, and an image side surface S3 thereof is a concave surface. The first lens L71 is made of glass.

The fifth lens L75 is with positive refractive power. The fifth lens L75 is a biconvex lens, an object side surface S10 thereof is a convex surface, and an image side surface S11 thereof is a convex surface. The fifth lens L75 is made of plastic.

The second lens L72 is with negative refractive power. The second lens L72 is a biconcave lens, an object side surface S4 thereof is a concave surface, and an image side surface S5 thereof is a concave surface. The second lens L72 is made of plastic.

The third lens L73 is with positive refractive power. The third lens L73 is a biconvex lens, an object side surface S6 thereof is a convex surface, and an image side surface S7 thereof is a convex surface. The third lens L73 is made of plastic.

The fourth lens L74 is with negative refractive power. The fourth lens L74 is a biconcave lens, an object side surface S8 thereof is a concave surface, and an image side surface S9 thereof is a concave surface and has an inflection point. The fourth lens L74 is made of plastic.

An object side surface S12 and an image side surface S13 of the optical filter OF7 are flat surfaces.

It is understood that the cross section of the first lens L71 is not limited to be in the shape of circle. It can be in other shapes, e.g. in shape of non-circle, polygon, polygon with sides arranged symmetrically to the optical axis, bottle, or oak barrel.

At least one of the first lens L71, the fifth lens L75, the second lens L72, the third lens L73 and the fourth lens L74 has an aspherical surface. The definition of the sag value z of the aspherical surface is similar to that of the third embodiment, and therefore the descriptions thereof are omitted.

When the lens assembly 100 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L71 are smaller than 2.2 mm, the length at which the first lens L71 is protruded from the lens minor diameter portion or from the lens barrel is greater than or equals 0.8 mm, and the lens assembly 100 still has good optical performance.

Table 13 shows the parameters of each lens of the lens assembly 100 of FIG. 19. In Table 13, the effective focal length EFL of the lens assembly 100 is about 3.45 mm, the aperture value of the lens assembly 100 is 2.25, the total length TTL of the lens assembly 100 is about 4.57 mm, the view angle of the lens assembly 100 is about 78.38 degrees, the optical effective diameter L1D of the object side surface S2 of the first lens L71 is about 1.55 mm, the thickness L1T of the first lens L71 along the optical axis is about 1.275 mm, the thickness L5T of the fifth lens L65 along the optical axis is about 0.430 mm, the thickness L2T of the second lens L62 along the optical axis is about 0.258 mm, the sum of thicknesses of the lenses ALT is about 3.05 mm, the focal length of the first lens L71 is about 4.343 mm, the focal length of the fifth lens L75 is about 4.434 mm the focal length of the second lens L72 is about −3.182 mm, the focal length of the third lens L73 is about 2.155 mm, the focal length of the fourth lens L74 is about −1.829 mm, the length G1 in which the first lens L71 is protruded is about 1.3428 mm, and the maximal outer diameter B of the lens major diameter portion is about 5.9 mm.

TABLE 13

| Surface Number | Radius of Curvature (mm) | Distance (mm) | Nd | Vd | Remark |
|---|---|---|---|---|---|
| S0 | — | 500 | | | The object side |
| S1 | ∞ | −0.17221 | | | The stop |
| S2 | 1.800023 | 1.274958 | 1.59042 | 66.9 | The first lens |
| S3 | 4.421588 | 0.195205 | | | |
| S10 | 7.663085 | 0.429562 | 1.531481 | 55.8 | The fifth lens |
| S11 | −3.35214 | 0.031946 | | 0 | |
| S4 | −2.95988 | 0.258092 | 1.671339 | 19.2 | The second lens |
| S5 | 8.219356 | 0.154073 | | 0 | |
| S6 | 4.433492 | 0.722087 | 1.644749 | 22.5 | The third lens |
| S7 | −1.91637 | 0.310384 | | 0 | |
| S3 | −4.47173 | 0.362251 | 1.61502 | 25.9 | The fourth lens |
| S9 | 1.563356 | 0.3 | | 0 | |
| S12 | ∞ | 0.21 | 1.516798 | 64.2 | The optical filter |
| S13 | ∞ | 0.305291 | | | |
| S14 | ∞ | 0 | | | The imaging plane |

Table 14 shows that the optical specifications of the aspheric surface of each lens in the lens assembly 100 shown in FIG. 19, wherein k is a conic constant, and A-G are aspheric coefficients.

TABLE 14

| Surface Number | k | A | B | C | D | E | F | G |
|---|---|---|---|---|---|---|---|---|
| S2 | 1.215623 | −0.039387014 | 0.003454212 | 0.072590112 | −0.554181572 | 1.250504293 | −1.231265762 | 0.174761783 |
| S3 | −27.3572 | 0.015363742 | −0.02931512 | −0.086830766 | 0.249872242 | −0.53371481 | 0.533670931 | 0.003516924 |
| S10 | 0 | −0.081783277 | −0.217643078 | 0.740649181 | −2.094703294 | 3.323197488 | −2.557261674 | 0.543585977 |
| S11 | 6.075828 | 0.039480239 | −0.236598298 | 0.230857745 | −0.6868211 | 1.536090508 | −1.23146985 | 0.230458847 |
| S4 | 0 | −0.000901719 | 0.284199167 | −1.268436648 | 2.359535538 | −2.346180209 | 1.247779525 | −0.375203669 |
| S5 | −608.651 | −0.084593945 | 0.069907828 | −0.009804009 | −0.029486863 | −0.007653198 | 0.022408661 | −0.00503141 |
| S6 | 0 | −0.13928755 | 0.078575126 | −0.126439447 | 0.174395945 | −0.144218309 | 0.060245508 | −0.011025856 |
| S7 | −14.1523 | −0.041845929 | 0.044980077 | −0.054900631 | 0.043206884 | −0.017129642 | 0.003516982 | −0.000351296 |
| S8 | −34.7825 | −0.200443142 | 0.113128034 | −0.044285473 | 0.008951894 | 0.002186159 | −0.001321382 | 0.000159041 |
| S9 | −11.8424 | −0.089511336 | 0.041896648 | −0.014443492 | 0.002972364 | −0.000384722 | 2.85946E−05 | −3.088E−07 |

Figure 20A:
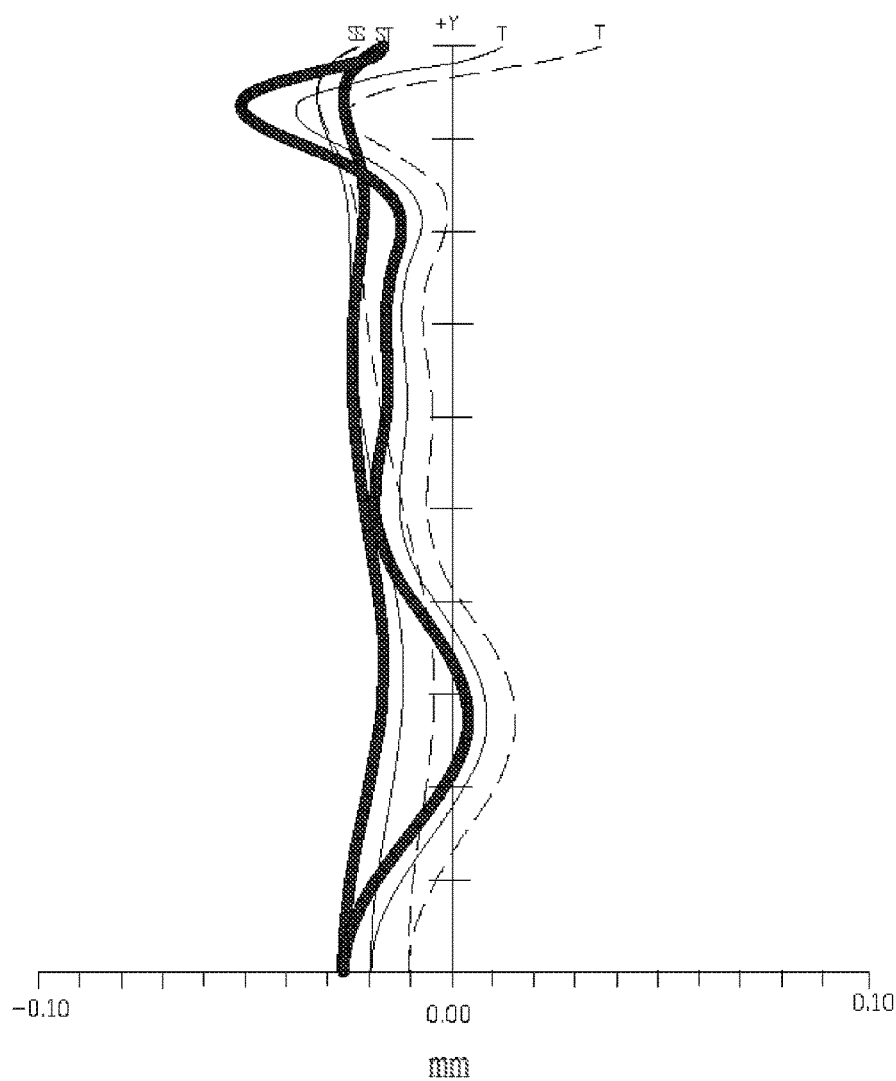
FIG. 20A is a field curvature diagram of the lens assembly of FIG. 19.
Figure 20B:
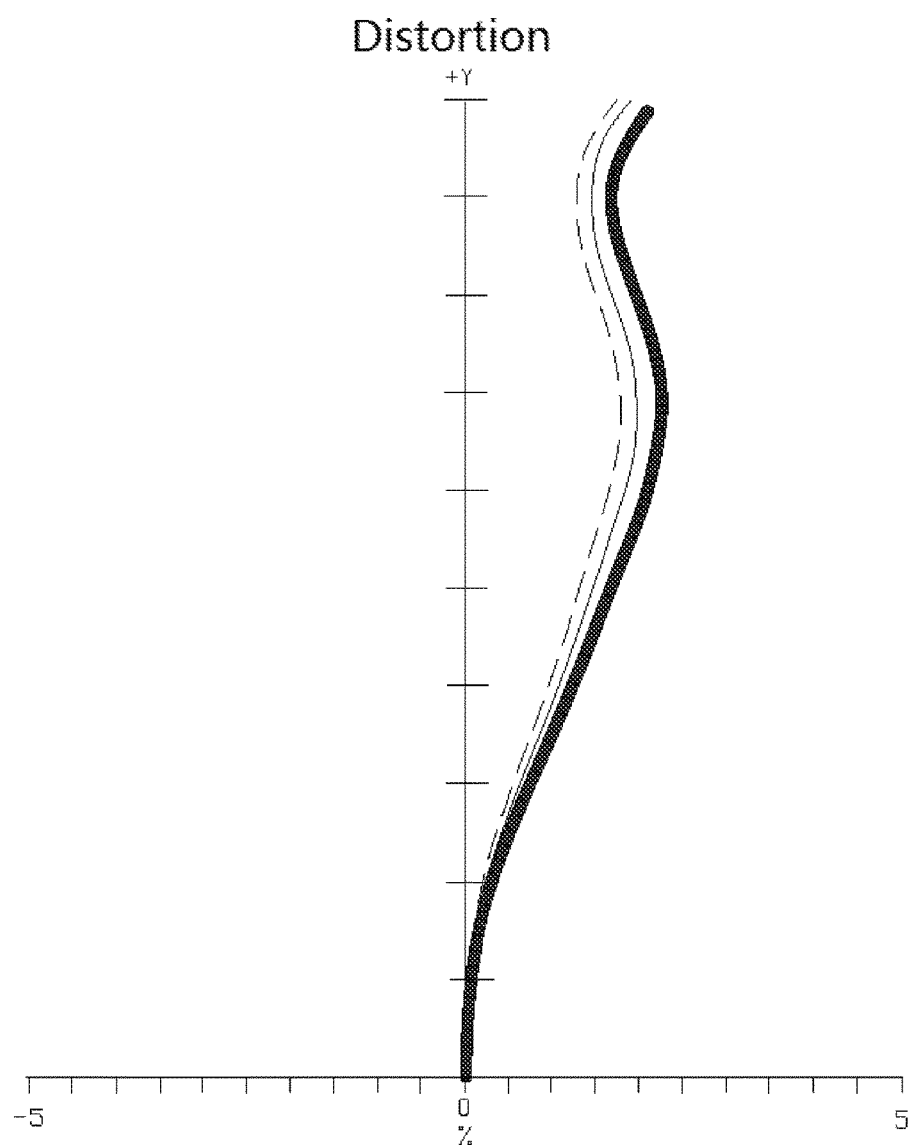
FIG. 20B is a distortion diagram of the lens assembly of FIG. 19.

In the ninth embodiment, the cross section of the first lens L71 is in the shape of circle, and the optical effective diameter L1D of the object side surface S2 of the first lens L71 equals the maximal outer diameter A of the first portion of the first lens L71. By calculation, it is obtained that A/B=1.55/5.9=0.2627 satisfying the condition (1). From Tables 13 and 14, it is obtained that L1D/L1T=1.55/1.275=1.22, f1/L1T=4.343/1.275=3.41, EFL/L1T=3.45/1.275=2.71, EFL/L1D=3.45/1.55=2.23, L1D+L1T=1.55+1.274=2.825 mm, (EFL+TTL)/L1T=(3.45+4.57)/1.274=6.30, ALT/L1T=3.05/1.274=2.39, G1×f1=1.3428×4.343=5.83 mm$^2$, L1T−L5T−L2T=1.275−0.430−0.258=0.587 mm. It is found that the lens assembly 100 can meet the requirements of the conditions (7)-(15). It can be seen from FIGS. 20A-20B that the lens assembly 100 also meets the requirements of optical performance. FIG. 20A is a field curvature diagram of the lens assembly 100 of FIG. 19. FIG. 20B is a distortion diagram of the lens assembly 100 of FIG. 19. It can be seen from FIG. 12A that the field curvature of the lens assembly 100 ranges from −0.05 mm to 0.04 mm. It can be seen from FIG. 12B that the distortion of the lens assembly 100 ranges from 0% to 2.5%. Moreover, according to the result of experiment, a modulation transfer function of the lens assembly 100 ranges from 0.45 to 1.0. It is obvious that the field curvature and the distortion of the lens assembly 100 can be corrected effectively, and the resolution the lens assembly 100 can meet the requirements. Therefore, the lens assembly 100 is capable of good optical performance.

Comparing to the prior art, the lens assembly of the invention is provided with characteristics of a decreased thickness and an increased view angle, and still has a good optical performance.

Figure 21:
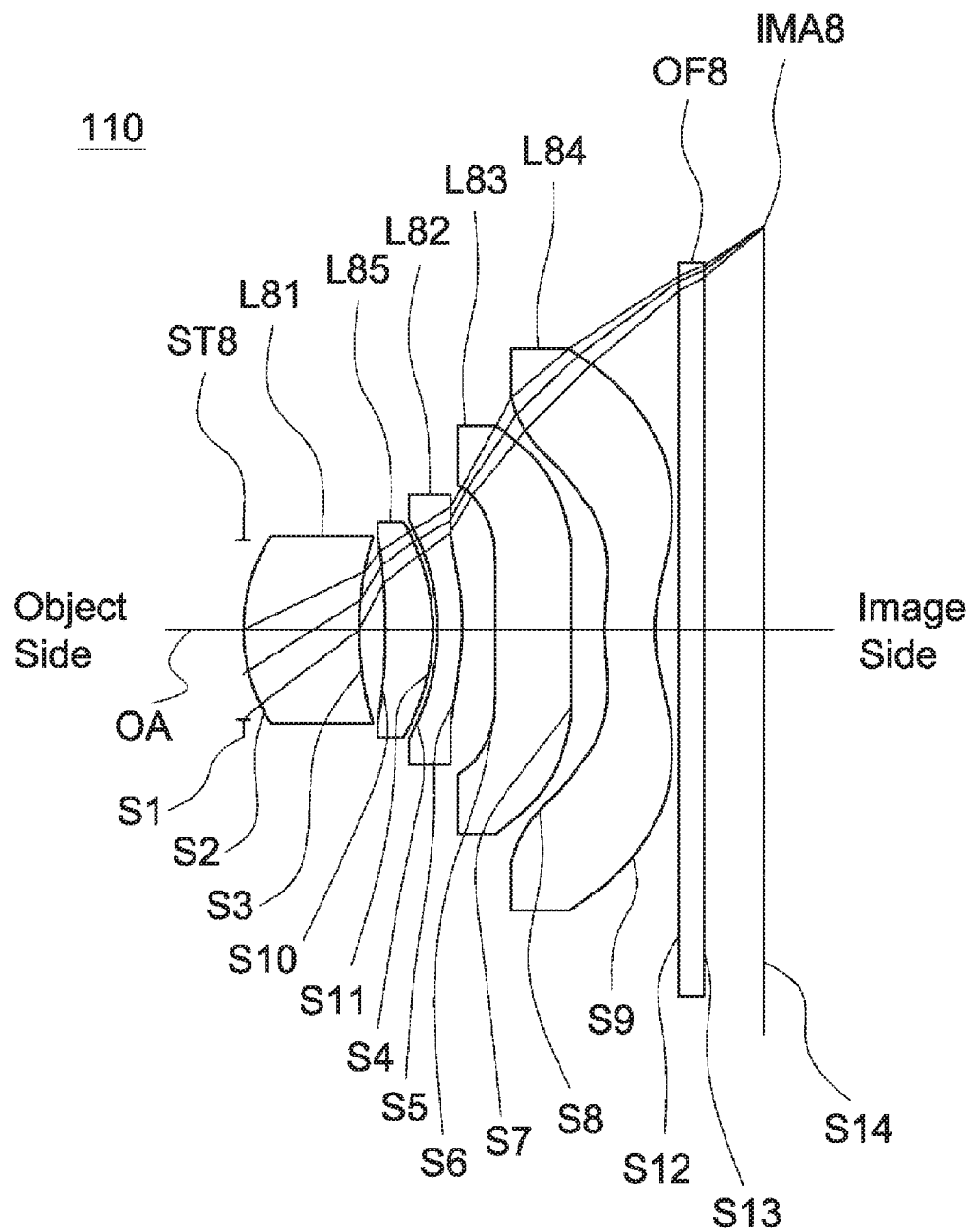
FIG. 21 is a lens layout diagram of a lens assembly in accordance with a tenth embodiment of the invention.

FIG. 21 is a lens layout diagram of a lens assembly in accordance with a tenth embodiment of the invention. As shown in FIG. 21, a lens assembly 110 in order from an object side to an image side along an optical axis OA includes a stop ST8, a first lens L81, a fifth lens L85, a second lens L82, a third lens L83, a fourth lens L84, an optical filter OF8 and a imaging plane IMA8.

The first lens L81 is with positive refractive power. The first lens L81 is a meniscus lens, an object side surface S2 thereof is a convex surface, and an image side surface S3 thereof is a concave surface. The first lens L81 is made of glass.

The fifth lens L85 is with positive refractive power. The fifth lens L85 is a meniscus lens, an object side surface S10 thereof is a concave surface, and an image side surface S11 thereof is a convex surface. The fifth lens L85 is made of plastic.

The second lens L82 is with negative refractive power. The second lens L82 is a meniscus lens, an object side surface S4 thereof is a concave surface, and an image side surface S5 thereof is a convex surface. The second lens L82 is made of plastic.

The third lens L83 is with negative refractive power. The third lens L83 is a meniscus lens, an object side surface S6 thereof is a convex surface, and an image side surface S7 thereof is a concave surface. The third lens L83 is made of plastic.

The fourth lens L84 is with negative refractive power. The fourth lens L84 is a meniscus lens, an object side surface S8 thereof is a convex surface, and an image side surface S9 thereof is a concave surface. The fourth lens L84 is made of plastic.

An object side surface S12 and an image side surface S13 of the optical filter OF8 are flat surfaces.

It is understood that the cross section of the first lens L81 is not limited to be in the shape of circle. It can be in other shapes, e.g. in shape of non-circle, polygon, polygon with sides arranged symmetrically to the optical axis, bottle, or oak barrel.

At least one of the first lens L81, the fifth lens L85, the second lens L82, the third lens L83 and the fourth lens L84 has an aspherical surface. The sag value z of the aspherical surface is expressed by the following equation:

$$z=ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20}$$

wherein c is the curvature of the surface, h is the distance between the optical axis and a point on the lens surface in a direction vertical to the optical axis, k is the conic coefficient, and A to I are the aspheric coefficients.

When the lens assembly 110 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L81 are smaller than 2 mm, the length at which the first lens L81 is protruded from the lens minor diameter portion or from the lens barrel is greater than or equals 0.8 mm, and the lens assembly 110 still has good optical performance.

Table 15 shows the parameters of each lens of the lens assembly 110 of FIG. 21. In Table 15, the effective focal length EFL of the lens assembly 110 is about 3.727 mm, the aperture value of the lens assembly 110 is 2.48, the total length TTL of the lens assembly 110 is about 4.36 mm, the view angle of the lens assembly 110 is about 80.9 degrees, the optical effective diameter L1D of the object side surface S2 of the first lens L81 is about 1.582 mm, the thickness L1T of the first lens L81 along the optical axis is about 0.981 mm, the thickness L5T of the fifth lens L85 along the optical axis is about 0.398 mm, the thickness L2T of the second lens L82 along the optical axis is about 0.213 mm, the sum of thicknesses of the lenses ALT is about 2.642 mm, the focal length of the first lens L81 is about 3.628 mm, the focal length of the fifth lens L85 is about 5.711 mm, the focal length of the second lens L82 is about −7.409 mm, the focal length of the third lens L83 is about −747.533 mm, the focal length of the fourth lens L84 is about −5.25 mm, the length G1 in which the first lens L81 is protruded is about 1.089 mm, and the maximal outer diameter B of the lens major diameter portion is about 6.764 mm.

TABLE 15

| Surface Number | Radius of Curvature (mm) | Distance (mm) | Nd | Vd | Remark |
|---|---|---|---|---|---|
| S0 | — | 350 | | | The object side |
| S1 | ∞ | 0.00E+00 | | | The stop |
| S2 | 2.364 | 0.981 | 1.51 | 70.1 | The first lens |
| S3 | 3.728 | 0.198 | | | |
| S10 | −54.988 | 0.398 | 1.54 | 56.1 | The fifth lens |
| S11 | −2.912 | 0.043 | | | |
| S4 | −1.540 | 0.213 | 1.67 | 19.2 | The second lens |
| S5 | −2.345 | 0.278 | | | |
| S6 | 17.276 | 0.629 | 1.67 | 19.2 | The third lens |
| S7 | 16.461 | 0.288 | | | |
| S8 | 2.194 | 0.421 | 1.54 | 56.1 | The fourth lens |
| S9 | 2.151 | 0.200 | | | |
| S12 | ∞ | 0.210 | 1.516 | 64.198 | The optical filter |
| S13 | ∞ | 0.501 | | | |
| S14 | ∞ | 0 | | | The imaging plane |

Table 16 shows that the optical specifications of the aspheric surface of each lens of the lens assembly 110 of FIG. 21, wherein k is a conic constant, and A-I are aspheric coefficients.

TABLE 16

| Surface Number | k<br>E | A<br>F | B<br>G | C<br>H | D<br>I |
|---|---|---|---|---|---|
| S2 | −9.935732122 | 4.54E−01 | −6.65E−01 | 9.10E−01 | −9.62E−01 |
|  | 1.51E+00 | −1.09E+00 | −4.64E+00 | 1.06E+01 | −6.29E+00 |
| S3 | 1.97E+00 | −6.46E−03 | 3.94E−01 | −2.13E+00 | 7.96E+00 |
|  | −1.74E+01 | −1.09E+00 | −4.43E+00 | −1.04E+01 | 7.74E+00 |
| S10 | 4.40E+03 | −8.50E−02 | −1.15E−01 | 8.55E−01 | −2.80E+00 |
|  | 3.22E+00 | 2.91E+00 | −1.18E+01 | 1.01E+01 | −1.03E+00 |
| S11 | 4.79E+00 | −3.05E−01 | 8.81E−01 | −1.53E+00 | 1.21E+00 |
|  | −6.64E−01 | 3.17E−01 | 6.66E−01 | −1.46E+00 | 8.71E−01 |
| S4 | 2.81E−01 | 2.72E−02 | 4.97E−01 | −3.59E−01 | −1.43E+00 |
|  | 2.63E+00 | 1.20E+00 | −7.81E+00 | 8.60E+00 | −3.34E+00 |
| S5 | 2.54E+00 | 1.44E−01 | −1.18E+00 | 3.65E−02 | −6.39E−02 |
|  | 1.81E−01 | −1.47E−01 | 2.03E−02 | −1.70E−03 | 8.00E−03 |
| S6 | −5.79E+00 | −1.05E−01 | −7.24E−02 | 1.46E−01 | −1.48E−01 |
|  | 1.88E−03 | 7.22E−02 | −3.26E−02 | 5.63E−03 | −2.45E−03 |
| S7 | −1.95E+03 | −1.32E−01 | 8.57E−02 | −3.20E−02 | −1.37E−02 |
|  | 1.36E−02 | −4.36E−03 | 1.40E−03 | −4.93E−04 | 7.20E−05 |
| S3 | −2.33E+00 | −6.38E−01 | 4.59E−0I | −1.73E−01 | 4.25E−03 |
|  | 2.21E−02 | −7.44E−03 | 8.07E−04 | 1.50E−05 | −5.87E−06 |
| S9 | −5.49E+00 | −2.69E−01 | 2.09E−01 | −1.12E−01 | 3.83E−02 |
|  | −8.08E−03 | 9.80E−04 | −5.65E−05 | 3.00E−07 | 7.71E−08 |

In the tenth embodiment, the cross section of the first lens L81 is in the shape of circle, and the optical effective diameter L1D of the object side surface S2 of the first lens L81 equals the maximal outer diameter A of the first portion of the first lens L81. By calculation, it is obtained that A/B=1.582/6.764=0.234 satisfying the condition (1). From Tables 15 and 16, it is obtained that L1D/L1T=1.582/0.981=1.61, f1/L1T=3.628/0.981=3.70, EFL/L1T=3.727/0.981=3.80, EFL/L1D=3.727/1.582=2.36, L1D+L1T=1.582+0.981=2.563 mm, (EFL+TTL)/L1T=(3.727+4.36)/0.981=8.24, ALT/L1T=2.642/0.981=2.69, G1×f1=1.089×3.628=3.95 mm$^2$, L1T−L5T−L2T=0.981− 0.398−0.213=0.37 mm. It is found that the lens assembly 110 can meet the requirements of the conditions (7)-(14). The field curvature and the distortion of the lens assembly 110 can be corrected effectively, and the resolution the lens assembly 110 can meet the requirements. Therefore, the lens assembly 110 is capable of good optical performance.

Comparing to the prior art, the lens assembly of the invention is provided with characteristics of a decreased thickness and an increased view angle, and still has a good optical performance.

Figure 22:
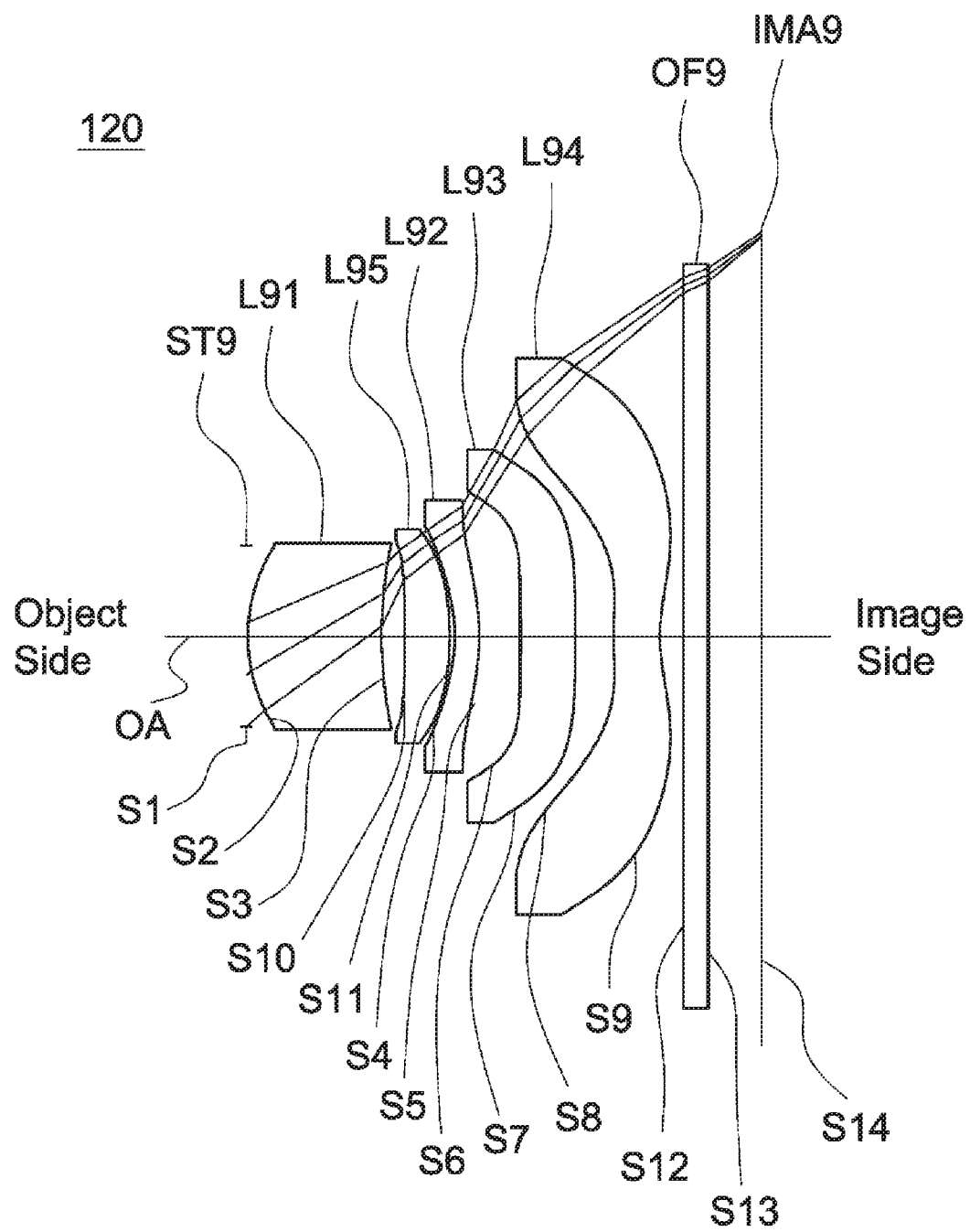
FIG. 22 is a lens layout diagram of a lens assembly in accordance with an eleventh embodiment of the invention.

FIG. 22 is a lens layout diagram of a lens assembly in accordance with an eleventh embodiment of the invention. As shown in FIG. 22, a lens assembly 120 in order from an object side to an image side along an optical axis OA includes a stop ST9, a first lens L91, a fifth lens L95, a second lens L92, a third lens L93, a fourth lens L94, an optical filter OF9 and a imaging plane IMA9.

The first lens L91 is with positive refractive power. The first lens L91 is a meniscus lens, an object side surface S2 thereof is a convex surface, and an image side surface S3 thereof is a concave surface. The first lens L91 is made of glass.

The fifth lens L95 is with positive refractive power. The fifth lens L95 is a meniscus lens, an object side surface S10 thereof is a concave surface, and an image side surface S11 thereof is a convex surface. The fifth lens L95 is made of plastic.

The second lens L92 is with negative refractive power. The second lens L92 is a meniscus lens, an object side surface S4 thereof is a concave surface, and an image side surface S5 thereof is a convex surface. The second lens L92 is made of plastic.

The third lens L93 is with positive refractive power. The third lens L93 is a biconvex lens, an object side surface S6 thereof is a convex surface, and an image side surface S7 thereof is a convex surface. The third lens L93 is made of plastic.

The fourth lens L94 is with negative refractive power. The fourth lens L94 is a meniscus lens, an object side surface S8 thereof is a convex surface, and an image side surface S9 thereof is a concave surface. The fourth lens L94 is made of plastic.

An object side surface S12 and an image side surface S13 of the optical filter OF9 are flat surfaces.

It is understood that the cross section of the first lens L91 is not limited to be in the shape of circle. It can be in other shapes, e.g. in shape of non-circle.

At least one of the first lens L91, the fifth lens L95, the second lens L92, the third lens L93 and the fourth lens L94 has an aspherical surface. The definition of the sag value z of the aspherical surface is similar to that of the tenth embodiment, and therefore the descriptions thereof are omitted.

When the lens assembly 120 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L91 are smaller than 2 mm, the length at which the first lens L91 is protruded from the lens minor diameter portion or from the lens barrel is greater than or equals 0.8 mm, and the lens assembly 120 still has good optical performance.

Table 17 shows the parameters of each lens of the lens assembly 120 of FIG. 22. In Table 17, the effective focal length EFL of the lens assembly 120 is about 3.806 mm, the aperture value of the lens assembly 120 is 2.48, the total length TTL of the lens assembly 120 is about 4.368 mm, the view angle of the lens assembly 120 is about 80.1 degrees, the optical effective diameter L1D of the object side surface S2 of the first lens L91 is about 1.54 mm, the thickness L1T of the first lens L91 along the optical axis is about 1.135 mm, the thickness L5T of the fifth lens L95 along the optical axis is about 0.38 mm, the thickness L2T of the second lens L92 along the optical axis is about 0.21 mm, the sum of thicknesses of the lenses ALT is about 2.579 mm, the focal length of the first lens L91 is about 3.709 mm, the focal length of the fifth lens L95 is about 5.548 mm, the focal length of the second lens L92 is about −11.072 mm, the focal length of the third lens L93 is about 116.946 mm, the focal length of the fourth lens L94 is about −3.667 mm, the length G1 in which the first lens L91 is protruded is about 1.215 mm, and the maximal outer diameter B of the lens major diameter portion is about 6.932 mm.

TABLE 17

| Surface Number | Radius of Curvature (mm) | Distance (mm) | Nd | Vd | Remark |
|---|---|---|---|---|---|
| S0 | — | 500 | | | The object side |
| S1 | ∞ | 1.50E−02 | | | The stop |
| S2 | 2.427 | 1.135 | 1.52 | 70.1 | The first lens |
| S3 | 4.014 | 0.196 | | | |
| S10 | −19.095 | 0.380 | 1.54 | 56.0 | The fifth lens |
| S11 | −2.632 | 0.042 | | | |
| S4 | −1.479 | 0.208 | 1.67 | 19.2 | The second lens |
| S5 | −1.947 | 0.350 | | | |
| S6 | 365.215 | 0.465 | 1.67 | 19.2 | The third lens |
| S7 | −101.139 | 0.327 | | | |
| S8 | 4.753 | 0.389 | 1.54 | 56.0 | The fourth lens |
| S9 | 2.368 | 0.200 | | | |
| S12 | ∞ | 0.210 | 1.516 | 64.198 | The optical filter |
| S13 | ∞ | 0.452 | | | |
| S14 | ∞ | 0 | | | The imaging plane |

Table 18 shows that the optical specifications of the aspheric surface of each lens of the lens assembly 120 of FIG. 22, wherein k is a conic constant, and A-I are aspheric coefficients.

TABLE 18

| Surface Number | k E | A F | B G | C H | D I |
|---|---|---|---|---|---|
| S2 | −9.571284015 | 4.95E−01 | −7.31E−01 | 8.59E−01 | −8.10E−01 |
| | 1.67E+00 | −1.10E+00 | −5.34E+00 | 1.04E+01 | −5.33E+00 |
| S3 | 0.00E+00 | 3.72E−03 | 3.75E−01 | −2.12E+00 | 7.97E+00 |
| | −1.74E+01 | −1.10E+00 | −4.52E+00 | −1.17E+01 | 8.53E+00 |
| S10 | 0.00E+00 | −7.50E−02 | −8.26E−02 | 7.24E−01 | −2.77E+00 |
| | 3.31E+00 | 3.32E+00 | −1.19E+01 | 9.84E+00 | −2.01E+00 |
| S11 | 6.07E+00 | −2.86E−01 | 8.29E−01 | −1.46E+00 | 1.25E+00 |
| | −6.33E−01 | 4.11E−01 | 7.36E−01 | −1.49E+00 | 4.66E−01 |
| S4 | 0.00E+00 | −3.46E−02 | 4.96E−01 | −3.43E−01 | −1.33E+00 |
| | 2.71E+00 | 1.17E+00 | −7.92E+00 | 8.47E+00 | −3.20E+00 |
| S5 | 1.55E+00 | 9.40E−02 | −2.73E−03 | 3.93E−02 | −7.56E−02 |
| | 1.76E−01 | −1.36E−01 | 3.10E−02 | −5.80E−03 | 5.68E−03 |
| S6 | −4.66E+39 | −5.74E−02 | −1.10E−01 | 1.59E−01 | −1.41E−01 |
| | 1.76E−03 | 7.02E−02 | −3.55E−02 | 3.72E−03 | 2.06E−04 |
| S7 | 3.17E+03 | −1.06E−01 | 7.12E−02 | −3.00E−02 | −1.30E−02 |
| | 1.35E−02 | −4.44E−03 | 1.41E−03 | −4.82E−04 | 6.85E−05 |
| S8 | −4.65E+01 | −6.28E−01 | 4.56E−01 | −1.74E−01 | 4.30E−03 |
| | 2.22E−02 | −7.44E−03 | 8.07E−04 | 1.43E−05 | −5.81E−06 |
| S9 | −9.17E+00 | −2.68E−01 | 2.07E−01 | −1.12E−01 | 3.83E−02 |
| | −8.08E−03 | 9.79E−04 | −5.67E−05 | 3.56E−07 | 7.66E−08 |

In the eleventh embodiment, the cross section of the first lens L91 is in the shape of circle, and the optical effective diameter L1D of the object side surface S2 of the first lens L91 equals the maximal outer diameter A of the first portion of the first lens L91. By calculation, A/B=1.54/6.932=0.222 satisfying the condition (1). From Tables 17 and 18, it is obtained that L1D/L1T=1.54/1.135=1.36, f1/L1T=3.709/1.135=3.27, EFL/L1T=3.806/1.135=3.35, EFL/L1D=3.806/1.54=2.47, L1D+L1T=1.54+1.135=2.675 mm, (EFL+TTL)/L1T=(3.806+4.368)/1.135=7.20, ALT/L1T=2.579/1.135=2.27, G1×f1=1.215×3.709=4.51 mm$^2$, L1T−L5T−L2T=1.135−0.38−0.21=0.545 mm. It is found that the lens assembly 120 can meet the requirements of the conditions (7)-(15). The field curvature and the distortion of the lens assembly 120 can be corrected effectively, and the resolution the lens assembly 120 can meet the requirements. Therefore, the lens assembly 120 is capable of good optical performance.

In a twelfth embodiment of the invention, the lens layout and optical path diagram is omitted, and a lens assembly 130 in order from an object side to an image side along an optical axis OA includes a stop ST10, a first lens 101, a fifth lens L105, a second lens L102, a third lens L103, a fourth lens L104, an optical filter OF10 and a imaging plane IMA10.

The first lens L101 is with positive refractive power. The first lens L101 is a meniscus lens, an object side surface S2 thereof is a convex surface, and an image side surface S3 thereof is a concave surface. The first lens L101 is made of glass.

The fifth lens L105 is with positive refractive power. The fifth lens L105 is a meniscus lens, an object side surface S10 thereof is a concave surface, and an image side surface S11 thereof is a convex surface. The fifth lens L105 is made of plastic.

The second lens L102 is with negative refractive power. The second lens L102 is a meniscus lens, an object side surface S4 thereof is a concave surface, and an image side surface S5 thereof is a convex surface. The second lens L102 is made of plastic.

The third lens L103 is with positive refractive power. The third lens L103 is a biconvex lens, an object side surface S6 thereof is a convex surface, and an image side surface S7 thereof is a convex surface. The third lens L103 is made of plastic.

The fourth lens L104 is with negative refractive power. The fourth lens L104 is a meniscus lens, an object side surface S8 thereof is a convex surface, and an image side surface S9 thereof is a concave surface. The fourth lens L104 is made of plastic.

An object side surface S12 and an image side surface S13 of the optical filter OF10 are flat surfaces.

It is understood that the cross section of the first lens L101 is not limited to be in the shape of circle. It can be in other shapes, e.g. in shape of non-circle.

At least one of the first lens L101, the fifth lens L105, the second lens L102, the third lens L103 and the fourth lens L104 has an aspherical surface. The definition of the sag value z of the aspherical surface is similar to that of the tenth embodiment, and therefore the descriptions thereof are omitted.

When the lens assembly 130 satisfies the condition (15): 0.29 mm<L1T−L5T−L2T<0.89 mm and at least one of the conditions (7)-(14), it is ensured that both of the outer diameter of the lens minor diameter portion and the optical effective diameter of the first lens L101 are smaller than 2 mm, the length at which the first lens L101 is protruded from the lens minor diameter portion or from the lens barrel is greater than or equals 0.8 mm, and the lens assembly 130 still has good optical performance.

Table 19 shows the parameters of each lens in the lens assembly 130. In Table 19, the effective focal length EFL of the lens assembly 130 is about 3.614 mm, the aperture value of the lens assembly 130 is 2.45, the total length TTL of the lens assembly 130 is about 4.371 mm, the view angle of the lens assembly 130 is about 81 degrees, the optical effective diameter L1D of the object side surface S2 of the first lens L101 is about 1.48 mm, the thickness L1T of the first lens L101 along the optical axis is about 1.135 mm, the thickness L5T of the fifth lens L105 along the optical axis is about 0.336 mm, the thickness L2T of the second lens L102 along the optical axis is about 0.201 mm, the sum of thicknesses of the lenses ALT is about 2.656 mm, the focal length of the first lens L101 is about 3.555 mm, the focal length of the fifth lens L105 is about 5.932 mm, the focal length of the second lens L102 is about −9.121 mm, the focal length of the third lens L103 is about 38.529 mm, the focal length of the fourth lens L104 is about −4.164 mm, the length G1 in which the first lens L101 is protruded is about 1.197 mm, and the maximal outer diameter B of the lens major diameter portion is about 6.764 mm.

TABLE 19

| Surface Number | Radius of Curvature (mm) | Distance (mm) | Nd | Vd | Remark |
|---|---|---|---|---|---|
| S0 | — | 350 | | | The object side |
| S1 | ∞ | 1.50E−02 | | | The stop |
| S2 | 2.437 | 1.135 | 1.52 | 70.1 | The first lens |
| S3 | 4.745 | 0.191 | | | |
| S10 | −15.507 | 0.336 | 1.53 | 56.0 | The fifth lens |
| S11 | −2.699 | 0.066 | | | |
| S4 | −1.413 | 0.201 | 1.67 | 19.2 | The second lens |
| S5 | −1.936 | 0.209 | | | |
| S6 | 51.536 | 0.586 | 1.67 | 19.2 | The third lens |
| S7 | −52.659 | 0.320 | | | |
| S8 | 2.675 | 0.398 | 1.53 | 56.0 | The fourth lens |
| S9 | 2.164 | 0.200 | | | |
| S12 | ∞ | 0.210 | 1.516 | 64.198 | The optical filter |
| S13 | ∞ | 0.492 | | | |
| S14 | ∞ | 0.012 | | | The imaging plane |

Table 20 shows that the optical specifications of the aspheric surface of each lens in the lens assembly 130, wherein k is a conic constant, and A-I are aspheric coefficients.

TABLE 20

| Surface Number | k<br>E | A<br>F | B<br>G | C<br>H | D<br>I |
|---|---|---|---|---|---|
| S2 | 7.40E−01<br>1.45E+00 | 4.20E−01<br>−7.96E−01 | −6.43E−01<br>−4.53E+00 | 9.13E−01<br>9.81E+00 | −1.05E+00<br>−5.75E+00 |
| S3 | 8.45E−01<br>−1.70E+01 | −2.79E−02<br>−7.96E−01 | 4.52E−01<br>−5.43E+00 | −2.44E+00<br>−9.13E+00 | 8.13E+00<br>7.07E+00 |

TABLE 20-continued

| Surface Number | k<br>E | A<br>F | B<br>G | C<br>H | D<br>I |
|---|---|---|---|---|---|
| S10 | 8.55E−01 | −8.65E−02 | −2.06E−01 | 1.25E+00 | −3.15E+00 |
|  | 2.55E+00 | 3.31E+00 | −1.11E+01 | 1.05E+01 | −2.65E+00 |
| S11 | 9.15E−01 | −2.70E−01 | 9.47E−01 | −1.60E+00 | 1.27E+00 |
|  | −6.83E−01 | 1.32E−01 | 6.65E−01 | −9.94E−01 | 7.36E−01 |
| S4 | 9.35E−01 | 8.80E−02 | 4.96E−01 | −4.25E−01 | −1.51E+00 |
|  | 2.64E+00 | 1.44E+00 | −7.73E+00 | 8.19E+00 | −3.13E+00 |
| S5 | 1.14E+00 | 2.09E−01 | −6.86E−02 | 1.1 IE−02 | −2.02E−02 |
|  | 2.14E−01 | −1.53E−01 | −9.65E−04 | −1.06E−02 | 1.87E−02 |
| S6 | 1.20E+00 | −5.95E−02 | −1.59E−01 | 1.99E−01 | −1.46E−01 |
|  | −1.70E−02 | 6.41E−02 | −2.29E−02 | 1.64E−02 | −9.46E−03 |
| S7 | 1.71E+00 | −1.14E−01 | 7.32E−02 | −3.01E−02 | −1.36E−02 |
|  | 1.37E−02 | −4.25E−03 | 1.39E−03 | −5.26E−04 | 7.86E−05 |
| S8 | 2.01E+00 | −6.25E−01 | 4.63E−01 | −1.74E−01 | 3.90E−03 |
|  | 2.20E−02 | −7.44E−03 | 8.14E−04 | 1.60E−05 | −6.18E−06 |
| S9 | 2.33E+00 | −2.62E−01 | 2.03E−01 | −1.10E−01 | 3.82E−02 |
|  | −8.11E−03 | 9.78E−04 | −5.60E−05 | 4.73E−07 | 6.16E−08 |

In the twelfth embodiment, the cross section of the first lens L101 is in the shape of circle, and the optical effective diameter L1D of the object side surface S2 of the first lens L101 equals the maximal outer diameter A of the first portion of the first lens L101. By calculation, it is obtained that A/B=1.48/6.764=0.219 satisfying the condition (1). From Tables 19 and 20, it can be obtained that L1D/L1T=1.48/1.135=1.30, f1/L1T=3.555/1.135=3.13, EFL/L1T=3.614/1.135=3.18, EFL/L1D=3.614/1.48=2.44, L1D+L1T=1.48+1.135=2.615 mm, (EFL+TTL)/L1T=(3.614+4.371)/1.135=7.04, ALT/L1T=2.656/1.135=2.34, G1×f1=1.197×3.555=4.26 mm², L1T−L5T−L2T=1.135−0.336−0.201=0.598 mm. It is found that the lens assembly 130 can meet the requirements of the conditions (7)-(15). The field curvature and the distortion of the lens assembly 130 can be corrected effectively, and the resolution the lens assembly 130 can meet the requirements. Therefore, the lens assembly 130 is capable of good optical performance.

What is claimed is:

1. A lens assembly comprising:
   a lens body comprising a lens barrel;
   a plurality of lenses comprising a first lens, a second lens, a third lens and a fourth lens, wherein the first lens is closest to an object side;
   wherein the first lens, the second lens, the third lens and the fourth lens are fixed in the lens body in order from the object side to an image side along an optical axis;
   wherein the first lens comprises an object side surface and an image side surface, the object side surface is protruded along the optical axis, the first lens in a cross section is higher at a middle than at both sides so that the first lens is protruded at the middle towards the object side to form a pillar;
   wherein the first lens further comprises a first portion close to the object side and a second portion close to the image side, and a diameter of the first portion is smaller than a diameter of the second portion so that a step is formed between the first portion and the second portion;
   wherein the lens barrel comprises an end surface facing the object side and the end surface is provided with a first lens fixing hole;
   wherein the first lens further comprises an optical effective diameter portion and a part of the optical effective diameter portion is projected from the first lens fixing hole;
   wherein the lens assembly further comprises a lens minor diameter portion close to the object side and a lens major diameter portion close to the image side, the lens minor diameter portion is different to the lens major diameter portion in diameter, and the lens assembly satisfies: 0<A/B<0.3, where A is a maximal outer diameter of the first portion of the first lens, and B is a maximal outer diameter of the lens major diameter portion of the lens assembly.

2. The lens assembly as claimed in claim 1, wherein the first lens further comprises an edge portion for the first lens to be supported and fixed, and the lens assembly satisfies: 0.19≤A/B≤0.28, where A is the maximal outer diameter of the first portion of the first lens, and B is the maximal outer diameter of the lens major diameter portion of the lens assembly.

3. The lens assembly as claimed in claim 2, wherein the lens barrel comprises a major diameter portion close to the image side and a minor diameter portion close to the object side, a stepped surface is formed between the major diameter portion and the minor diameter portion, the lens minor diameter portion is formed by the minor diameter portion of the lens barrel, and the lens major diameter portion is formed by the major diameter portion of the lens barrel.

4. The lens assembly as claimed in claim 3, wherein the edge portion of the first lens is fixed in the major diameter portion of the lens barrel, and the optical effective diameter portion is inside the minor diameter portion of the lens barrel.

5. The lens assembly as claimed in claim 2, wherein the edge portion is fixed in the lens barrel.

6. The lens assembly as claimed in claim 5, wherein the lens minor diameter portion is formed by the part of the optical effective diameter portion of the first lens, the lens major diameter portion is formed by the lens barrel, and an edge of the object side surface of the first lens is provided with a stop structure of the lens assembly.

7. The lens assembly as claimed in claim 1, further comprising a cover connected to an object end of the lens barrel, wherein the cover has an opening and forms a stop structure in front of the object side surface of the first lens.

8. The lens assembly as claimed in claim 7, wherein the object side surface of the first lens is flushed or is lower than an object side surface of the cover, the lens barrel and the cover are integrally formed as a continuous-unity piece, and the opening of the cover is in a shape of circle, polygon, non-circle, or polygon with sides arranged symmetrically to the optical axis.

9. The lens assembly as claimed in claim 8, wherein the first lens further comprises an edge portion for the first lens to be supported and fixed, and the lens assembly satisfies: 0.19≤A/B≤0.28, where A is the maximal outer diameter of the first portion of the first lens, and B is the maximal outer diameter of the lens major diameter portion of the lens assembly.

10. The lens assembly as claimed in claim 1, wherein the lens assembly further satisfies at least one of following conditions:

$0<A\leq2.2$ mm;

$h\geq0.8$ mm;

$0.8>h/H\geq0.22$; and $0<S1/S2<0.25$, where h is a thickness of the lens minor diameter portion along the optical axis, H is a thickness of the lens assembly along the optical axis, S1 is an area of a cross section of the lens minor diameter portion, and S2 is an area of a cross section of the lens major diameter portion.

11. The lens assembly as claimed in claim 10, wherein:
the lens minor diameter portion is in a shape of circle, polygon, non-circle, or polygon with sides arranged symmetrically to the optical axis;
the lens major diameter portion is in a shape of circle, polygon, non-circle, or polygon with sides arranged symmetrically to the optical axis.

12. The lens assembly as claimed in claim 1, wherein the object side surface of the first lens is convex surface, f1 is a focal length of the first lens, L1D is an optical effective diameter of the object side surface of the first lens, L1T is a distance from the object side surface of the first lens to the image side surface of the first lens along the optical axis, EFL is an effective focal length of the lens assembly, TTL is a distance from the object side surface of the first lens to an imaging plane along the optical axis, ALT is a sum of thicknesses of the lenses along the optical axis, C is a maximal outer diameter of the lens minor diameter portion, and the lens assembly further satisfies at least one of the following conditions:

$0<f1/L1T<5$;

$0.8<L1D/L1T<1.7$;

$1<EFL/L1T<4$;

$1.9<EFL/L1D<2.6$;

$2$ mm$<(L1D+L1T)<5$ mm;

$3<(EFL+TTL)/L1T<9$;

$1.5<ALT/L1T<3.5$; and $0<C/B\leq0.38$.

13. The lens assembly as claimed in claim 1, further comprising a fifth lens with positive refractive power, wherein the fifth lens is disposed between the first lens and the second lens, the object side surface of the first lens is convex surface, the second lens comprises an object side surface and an image side surface, the fifth lens comprises an object side surface and an image side surface, the image side surface of the fifth lens is convex surface.

14. The lens assembly as claimed in claim 1, wherein the object side surface of the first lens is convex surface, the third lens comprises an object side surface and an image side surface, the fourth lens comprises an object side surface and an image side surface, the third lens is with positive refractive power, the image side surface of the third lens is convex surface, and the image side surface of the fourth lens is concave surface.

15. A lens assembly comprising:
a lens body comprising a lens barrel;
a plurality of lenses comprising a first lens, a fifth lens, a second lens, a third lens and a fourth lens, wherein the first lens is closest to an object side;
wherein the first lens, the fifth lens, the second lens, the third lens and the fourth lens are fixed in the lens body in order from the object side to an image side along an optical axis;
wherein the first lens comprises an object side surface and an image side surface, the object side surface is protruded along the optical axis, the first lens in a cross section is higher at a middle than at both sides so that the first lens is protruded at the middle towards the object side to form a pillar;
wherein the first lens further comprises a first portion close to the object side and a second portion close to the image side, and a diameter of the first portion is smaller than a diameter of the second portion so that a step is formed between the first portion and the second portion;
wherein the second lens comprises an object side surface and an image side surface;
wherein the fifth lens comprises an object side surface and an image side surface;
wherein the lens assembly further comprises a lens minor diameter portion close to the object side and a lens major diameter portion close to the image side, the lens minor diameter portion is different to the lens major diameter portion in diameter, and the lens assembly satisfies following conditions: 0.29 mm$<$L1T$-$L5T$-$L2T$<$0.89 mm; 0$<$A/B$<$0.3, wherein L1T is a distance from the object side surface of the first lens to the image side surface of the first lens along the optical axis, L2T is a distance from the object side surface of the second lens to the image side surface of the second lens along the optical axis, L5T is a distance from the object side surface of the fifth lens to the image side surface of the fifth lens along the optical axis, A is a maximal outer diameter of the first portion of the first lens, and B is a maximal outer diameter of the lens major diameter portion of the lens assembly.

16. A lens assembly comprising:
a lens body comprising a lens barrel;
a plurality of lenses comprising a first lens, a fifth lens, a second lens, a third lens and a fourth lens, all of which are fixed in the lens body in order from an object side to an image side along an optical axis;
wherein the first lens is with positive refractive power and comprises an object side surface and an image side surface;
wherein the second lens is with negative refractive power and comprises an object side surface and an image side surface;
wherein the third lens is with refractive power;
wherein the fourth lens is with negative refractive power;
wherein the fifth lens comprises an object side surface and an image side surface;

wherein the lens assembly satisfies following conditions: 2.5 mm² <G1×f1< 8 mm²; 0.29 mm<L1T−L5T−L2T<0.89 mm, where f1 is a focal length of the first lens, G1 is a distance along the optical axis from a central point of the object side surface of the first lens to an edge of an effective diameter of the image side surface of the first lens, L1T is a distance from the object side surface of the first lens to the image side surface of the first lens along the optical axis, L2T is a distance from the object side surface of the second lens to the image side surface of the second lens along the optical axis, L5T is a distance from the object side surface of the fifth lens to the image side surface of the fifth lens along the optical axis;

wherein the lens assembly further comprises a lens minor diameter portion close to the object side and a lens major diameter portion close to the image side, and the lens minor diameter portion is different to the lens major diameter portion in diameter.

17. The lens assembly as claimed in claim 16, wherein:
the lens minor diameter portion is in a shape of circle, polygon, non-circle, or polygon with sides arranged symmetrically to the optical axis;
the lens major diameter portion is in a shape of circle, polygon, non-circle, or polygon with sides arranged symmetrically to the optical axis; and
the lens assembly further satisfies one of the following conditions:

$0<A\leq 2.2$ mm;

$h\geq 0.8$ mm;

$0.8>h/H\geq 0.22$; and $0<S1/S2<0.25$, where h is a thickness of the lens minor diameter portion along the optical axis, H is a thickness of the lens assembly along the optical axis, S1 is an area of a cross section of the lens minor diameter portion, and S2 is an area of a cross section of the lens major diameter portion.

18. The lens assembly as claimed in claim 16, wherein the object side surface of the first lens is convex surface, f1 is a focal length of the first lens, L1D is an optical effective diameter of the object side surface of the first lens, L1T is a distance from the object side surface of the first lens to the image side surface of the first lens along the optical axis, EFL is an effective focal length of the lens assembly, TTL is a distance from the object side surface of the first lens to an imaging plane along the optical axis, ALT is a sum of thicknesses of the lenses along the optical axis, C is a maximal outer diameter of the lens minor diameter portion, and the lens assembly further satisfies at least one of following conditions:

$0<f1/L1T<5$;

$0.8<L1D/L1T<1.7$;

$1<EFL/L1T<4$;

$1.9<EFL/L1D<2.6$;

$2$ mm$<(L1D+L1T)<5$ mm;

$3<(EFL+TTL)/L1T<9$;

$1.5<ALT/L1T<3.5$; and $0<C/B\leq 0.38$.

19. The lens assembly as claimed in claim 16, wherein the fifth lens is with positive refractive power, the object side surface of the first lens is convex surface, and the image side surface of the fifth lens is convex surface.

20. The lens assembly as claimed in claim 16, wherein the object side surface of the first lens is convex surface, the third lens comprises an object side surface and an image side surface, the fourth lens comprises an object side surface and an image side surface, the third lens is with positive refractive power, the image side surface of the third lens is convex surface, and the image side surface of the fourth lens is concave surface.

* * * * *